(12) United States Patent
Yoshikawa et al.

(10) Patent No.: US 11,131,079 B2
(45) Date of Patent: Sep. 28, 2021

(54) WORK VEHICLE AND WORK VEHICLE MONITORING SYSTEM

(71) Applicant: KOMATSU LTD., Tokyo (JP)

(72) Inventors: Takeshi Yoshikawa, Hakusan (JP); Hiroaki Takeshima, Komatsu (JP); Yoshito Komatsu, Komatsu (JP)

(73) Assignee: KOMATSU LTD., Tokyo (JP)

( * ) Notice: Subject to any disclaimer, the term of this patent is extended or adjusted under 35 U.S.C. 154(b) by 73 days.

(21) Appl. No.: 16/808,591

(22) Filed: Mar. 4, 2020

(65) Prior Publication Data

US 2020/0199847 A1 Jun. 25, 2020

Related U.S. Application Data

(62) Division of application No. 15/545,509, filed as application No. PCT/JP2016/055945 on Feb. 26, 2016, now Pat. No. 10,619,329.

(30) Foreign Application Priority Data

Mar. 19, 2015 (JP) .............................. JP2015-056198
Mar. 19, 2015 (JP) .............................. JP2015-056199
Mar. 19, 2015 (JP) .............................. JP2015-056200

(51) Int. Cl.
*E02F 9/20* (2006.01)
*F16D 48/02* (2006.01)
(Continued)

(52) U.S. Cl.
CPC .......... *E02F 9/2087* (2013.01); *B62D 11/003* (2013.01); *B62D 11/08* (2013.01);
(Continued)

(58) Field of Classification Search
CPC ... E02F 9/2087; E02F 9/02; E02F 9/20; E02F 9/267; E02F 9/7604; B62D 11/003;
(Continued)

(56) References Cited

U.S. PATENT DOCUMENTS 2,580,381 A * 12/1951 Banker .................. B62D 11/08
475/27
3,144,107 A * 8/1964 Davies .................. B62D 11/12
192/13 R (Continued)

FOREIGN PATENT DOCUMENTS

JP 64-16477 A 1/1989
JP 3-59559 U 6/1991

(Continued)

OTHER PUBLICATIONS

The International Search Report for the corresponding international application No. PCT/JP2016/055945, dated May 17, 2016.

*Primary Examiner* — Jacob D Knutson
(74) *Attorney, Agent, or Firm* — Global IP Counselors, LLP

(57) ABSTRACT

A work vehicle monitoring system includes a work vehicle and a monitoring device provided on an exterior of the work vehicle. The work vehicle includes a steering clutch, a rotary member having a first hydraulic fluid supply channel, a drive unit, a support member having a second hydraulic fluid supply channel, a sealing ring disposed between the first hydraulic fluid supply channel and the second hydraulic fluid supply channel, a controller that controls a pressure of a hydraulic fluid inside the first hydraulic fluid supply channel and the second hydraulic fluid supply channel, and an external output component that outputs data related to the pressure, a rotational speed, and a time. The monitoring device accepts the data from the external output component and outputs maintenance information about the sealing ring when a predicted wear amount of the sealing ring obtained from the determination basis data exceeds a specific threshold.

15 Claims, 29 Drawing Sheets

(51) Int. Cl.
*E02F 9/26* (2006.01)
*G07C 5/00* (2006.01)
*G07C 5/08* (2006.01)
*B62D 11/00* (2006.01)
*B62D 11/08* (2006.01)
*E02F 9/02* (2006.01)
*F16D 48/06* (2006.01)
*E02F 3/76* (2006.01)

(52) U.S. Cl.
CPC ............. *E02F 9/02* (2013.01); *E02F 9/20* (2013.01); *E02F 9/267* (2013.01); *F16D 48/02* (2013.01); *F16D 48/066* (2013.01); *E02F 3/7604* (2013.01); F16D 2500/1026 (2013.01); F16D 2500/10412 (2013.01); F16D 2500/1112 (2013.01); F16D 2500/3024 (2013.01); F16D 2500/3067 (2013.01); F16D 2500/30806 (2013.01); F16D 2500/30816 (2013.01); F16D 2500/3108 (2013.01); F16D 2500/5118 (2013.01); F16D 2500/7041 (2013.01); F16D 2500/70406 (2013.01); G07C 5/006 (2013.01); G07C 5/0808 (2013.01)

(58) Field of Classification Search
CPC ....... B62D 11/08; F16D 48/02; F16D 48/066; F16D 2500/1026; F16D 2500/10412; F16D 2500/1112; F16D 2500/3024; F16D 2500/3067; F16D 2500/30806; F16D 2500/30816; F16D 2500/3108; F16D 2500/5118; F16D 2500/70406; G07C 5/006; G07C 5/0808

See application file for complete search history.

(56) References Cited

U.S. PATENT DOCUMENTS

| | | | | |
|---|---|---|---|---|
| 4,407,328 | A | * | 10/1983 | Shore .................... B62D 11/08 137/596.14 |
| 4,467,900 | A | * | 8/1984 | Shore ...................... F16D 67/04 192/13 R |
| 5,407,024 | A | * | 4/1995 | Watson ................ B60K 17/342 180/248 |
| 2004/0020700 | A1 | * | 2/2004 | Watson ................ B60K 28/165 180/247 |
| 2014/0196961 | A1 | | 7/2014 | Yoshikawa et al. |
| 2015/0217805 | A1 | | 8/2015 | Koshikawa et al. |

FOREIGN PATENT DOCUMENTS

| | | |
|---|---|---|
| JP | 4-27674 A | 1/1992 |
| JP | 5-97052 A | 4/1993 |
| JP | 2003-40133 A | 2/2003 |
| JP | 2013-231324 A | 11/2013 |
| JP | 2013-231486 A | 11/2013 |

\* cited by examiner

WORK VEHICLE AND WORK VEHICLE MONITORING SYSTEM

CROSS-REFERENCE TO RELATED APPLICATIONS

This application is a divisional application of U.S. patent application Ser. No. 15/545,509, which is a U.S. national stage application of International Application No. PCT/JP2016/055945, filed on Feb. 26, 2016. The U.S. national stage application claimed priority under 35 U.S.C. § 119(a) to Japanese Patent Application Nos. 2015-056198, filed in Japan on Mar. 19, 2015, 2015-056199 filed in Japan on Mar. 19, 2015, and 2015-056200, filed in Japan on Mar. 19, 2015, the entire contents of which are hereby incorporated herein by reference.

BACKGROUND

Field of the Invention

The present invention relates to a work vehicle, a monitoring system for a work vehicle, and a tracked work vehicle.

Description of the Related Art

With a work vehicle that moves on crawler belts, such as a bulldozer, the power of the engine is transmitted through a transmission to the left and right drive wheels, and the left and right crawler belts are driven by these drive wheels. A bulldozer such as this is provided with steering clutches and steering brakes corresponding to the left and right drive wheels. Left and right turns are executed by hydraulically controlling the left and right steering clutches and steering brakes (see Japanese Laid-Open Patent Application 2013-231324, for example).

With the steering clutches and steering brakes in Japanese Laid-Open Patent Application 2013-231324, a low hydraulic pressure state results in an engaged state, while a state in which the hydraulic pressure is equal to or greater than a specific level results in a disengaged state.

SUMMARY

Problem to be Solved by the Invention

With a steering clutch, rotary members on both sides connected to the clutch rotate during vehicle travel. Therefore, hydraulic fluid must be supplied to the clutch through at least one of the rotary members. That is, a hydraulic fluid supply channel has to be provided for supplying hydraulic fluid to the rotary member from a support member that supports the rotary member. In this case, it is necessary to provide a sealing ring to prevent the hydraulic fluid from seeping out at the connected part of the hydraulic fluid supply channel between the support member and the rotary member.

The steering clutch in Japanese Laid-Open Patent Application 2013-231324 has a mechanism such as a spring for pressing on a clutch plate during engagement, and this results in a complicated clutch structure. Accordingly, there is a need for a more compact clutch that can apply pressure by hydraulics alone. With a clutch such as this, it is disengaged when no hydraulic pressure is being exerted and engaged when hydraulic pressure is exerted. Therefore, when a clutch such as this is used, something must be done to keep the PV value of the sealing ring from reaching the maximum permissible value.

This specification discloses a work vehicle having a steering clutch that is engaged in a state in which hydraulic pressure is being exerted, and a work vehicle with which the PV value of the sealing ring will not reach the maximum permissible value.

Means for Solving Problem

The work vehicle monitoring system according to a first mode includes a work vehicle and a monitoring device. The monitoring device is provided on an exterior of the work vehicle and configured to input information from the work vehicle. The work vehicle includes an engine, a transmission, a steering clutch, a rotary member, a drive unit, a support member, a sealing ring, a rotational speed sensor, a controller, and an external output component.

The transmission is arranged to change a speed of rotary motion of the engine. The steering clutch transmits or cuts off power from the transmission. The steering clutch is engaged when it is supplied with hydraulic fluid. The rotary member has a first hydraulic fluid supply channel arranged to supply the hydraulic fluid to the steering clutch. The rotary member is rotated by power from the transmission when the steering clutch is engaged. The drive unit is driven by the rotary member. The support member has a second hydraulic fluid supply channel arranged to supply the hydraulic fluid to the first hydraulic fluid supply channel. The support member rotatably supports the rotary member. The sealing ring is disposed between the rotary member and the support member. The sealing ring is mounted adjacent to a connected part between the first hydraulic fluid supply channel and the second hydraulic fluid supply channel. The rotational speed sensor senses a rotational speed of the rotary member. The controller decides the pressure of the hydraulic fluid inside the first hydraulic fluid supply channel and the second hydraulic fluid supply channel and performs control so that the pressure of the hydraulic fluid becomes the decided pressure. The external output component outputs determination basis data related to the decided pressure, the rotational speed, and a time when the pressure is controlled by the decided pressure while the rotary member is rotating. The external output component outputs the determination basis data in a format that can be inputted by the monitoring device. The monitoring device includes an output component that outputs maintenance information about the sealing ring when a predicted wear amount of the sealing ring obtained from the determination basis data exceeds a specific threshold.

In the work vehicle monitoring system according to the first mode, the monitoring device is preferably a computer. In the work vehicle monitoring system according to the first mode, the monitoring device preferably includes a monitor for displaying information and a keyboard for entering the determination basis data outputted by the external output component.

In the work vehicle according to the first mode, the determination basis data is preferably a value obtained by integration of a product of the decided pressure and the rotational speed at a same time as the decided pressure. The external output component outputs the determination basis data to a communication line or to a removable storage medium that can be written to by the work vehicle and that can be read by the monitoring device.

In the work vehicle according to the first mode, the controller preferably performs control to set the pressure to a specific first pressure when the rotational speed measured by the rotational speed sensor is no more than a specific rotational speed threshold, and performs control to reduce the pressure from the first pressure so that a product of the rotational speed and the pressure of the hydraulic fluid will not exceed a specific upper limit when the rotational speed measured by the rotational speed sensor is greater than a specific rotational speed threshold.

In the work vehicle according to the first mode, the controller preferably performs control to set the pressure of the hydraulic fluid to be the quotient of dividing a first product, which is a product of the first pressure and the rotational speed threshold, by the rotational speed when the rotational speed is greater than the rotational speed threshold.

In the work vehicle according to the first mode, the sealing ring preferably seals a gap between the rotary member and the support member, and the connected part is preferably formed by the gap sealed by the sealing ring.

A work vehicle according to a second mode is configured to output information to an external monitoring device. The work vehicle comprises an engine, a transmission, a steering clutch, a rotary member, a drive unit, a support member, a sealing ring, a rotational speed sensor, a controller, and an external output component. The transmission is arranged to change a speed of rotary motion of the engine. The steering clutch that transmits or cuts off power from the transmission, the steering clutch being engaged when supplied with hydraulic fluid. A rotary member having a first hydraulic fluid supply channel arranged to supply the hydraulic fluid to the steering clutch. The rotary member is rotated by power from the transmission when the steering clutch is engaged. The drive unit is driven by the rotary member. The support member has a second hydraulic fluid supply channel arranged to supply the hydraulic fluid to the first hydraulic fluid supply channel. The support member rotatably supports the rotary member. The sealing ring is disposed between the rotary member and the support member. The sealing ring is mounted adjacent to a connected part between the first hydraulic fluid supply channel and the second hydraulic fluid supply channel.

The rotational speed sensor senses a rotational speed of the rotary member. The controller decides a pressure of the hydraulic fluid inside the first hydraulic fluid supply channel and the second hydraulic fluid supply channel and performs control so that the pressure of the hydraulic fluid becomes the decided pressure. The external output component outputs determination basis data related to the decided pressure, the rotational speed, and a time when the pressure is controlled by the decided pressure while the rotary member is rotating, in a format that can be inputted by the monitoring device.

In the work vehicle according to the second mode, the determination basis data is preferably a value obtained by integration of a product of the decided pressure and the rotational speed at a same time as the decided pressure. The external output component outputs the determination basis data to a communication line or to a removable storage medium that can be written to by the work vehicle and that can be read by the monitoring device.

In the work vehicle according to the second mode, the controller preferably performs control to set the pressure to a specific first pressure when the rotational speed measured by the rotational speed sensor is no more than a specific rotational speed threshold, and performs control to reduce the pressure from the first pressure so that a product of the rotational speed and the pressure of the hydraulic fluid will not exceed a specific upper limit when the rotational speed measured by the rotational speed sensor is greater than a specific rotational speed threshold.

In the work vehicle according to the second mode, the controller preferably performs control to set the pressure of the hydraulic fluid to be the quotient of dividing a first product, which is a product of the first pressure and the rotational speed threshold, by the rotational speed when the rotational speed is greater than the rotational speed threshold.

In the work vehicle according to the second mode, the sealing ring preferably seals a gap between the rotary member and the support member, and the connected part is preferably formed by the gap sealed by the sealing ring.

Effects of the Invention

With the work vehicle monitoring system according to the first mode, the work vehicle decides the pressure of the hydraulic fluid inside the hydraulic fluid supply channels, and outputs determination basis data related to the decided pressure, the rotational speed, and the time controlled by the decided pressure while the rotary member is rotating, in a format that can be inputted by the monitoring device. The monitoring device outputs maintenance information about the sealing ring based on the predicted wear amount of the sealing ring obtained from the determination basis data. Thus, a worker is properly notified about replacement of the sealing ring and so forth according to the usage state of the sealing ring.

With the work vehicle monitoring system according to the second mode, the work vehicle decides the pressure of the hydraulic fluid inside the hydraulic fluid supply channels, and outputs determination basis data related to the decided pressure, the rotational speed, and the time controlled by the decided pressure while the rotary member is rotating, in a format that can be inputted by an external monitoring device. Thus, a worker monitoring remotely can be properly notified about replacement of the sealing ring and so forth according to the usage state of the sealing ring.

DETAILED DESCRIPTION OF EMBODIMENT(S)

(A)

First Embodiment

Figure 1:
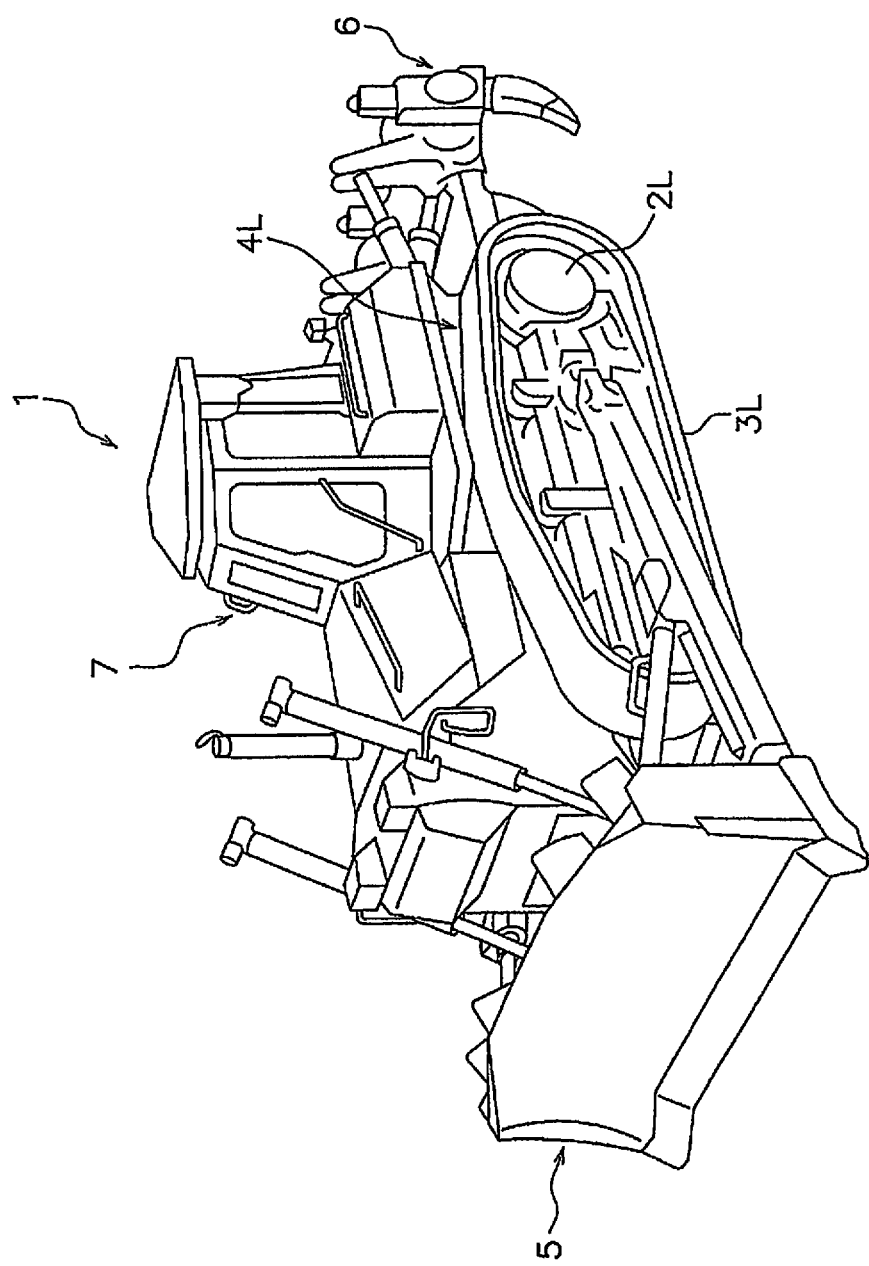
FIG. 1 is an oblique view of a bulldozer in an embodiment.
Figure 2:
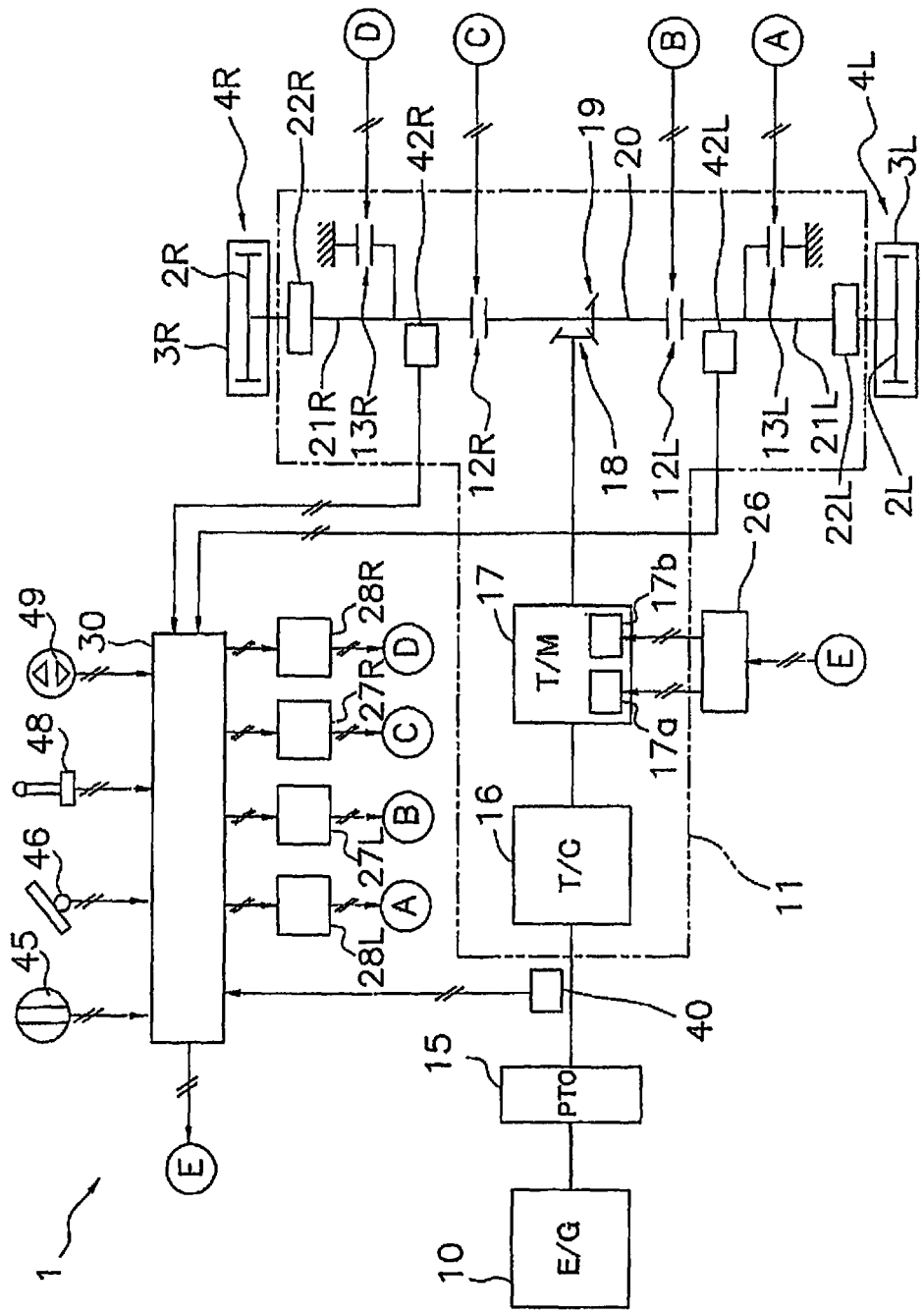
FIG. 2 shows the simplified configuration of the bulldozer shown in FIG. 1.

FIG. 1 shows a bulldozer 1, which is an example of a work vehicle. As shown in FIGS. 1 and 2, the bulldozer 1 includes left and right drive units 4L and 4R respectively having sprockets 2L and 2R and crawler belts 3L and 3R, a blade 5 provided at the front of the vehicle, and a ripper device 6 provided at the rear of the vehicle. This bulldozer 1 can perform work such as dozing with the blade 5 or work such as crushing or excavation with the ripper device 6.

The bulldozer 1 further includes a cab 7 above the left and right drive units 4L and 4R. The cab 7 is equipped with a seat in which the operator sits, various kinds of control lever, a vehicle speed setting switch, pedals, gauges, and so forth. In the following description, the "forward and backward direction" means the forward and backward direction of the bulldozer 1. The forward and backward direction means the forward and backward direction as seen by the operator seated in the cab 7. The left and right direction or "to the side" refers to the vehicle width direction of the bulldozer 1. The left and right direction, the vehicle width direction, and "to the side" all refer to the left and right directions as seen by the above-mentioned operator.

Configuration of Power Transmission System

As shown in FIG. 2, this bulldozer 1 includes an engine 10 and a power transmission device 11 that transmits power from the engine 10 to the left and right drive units 4L and 4R. The power transmission device 11 includes left and right steering clutches 12L and 12R, left and right steering brakes 13L and 13R, a torque converter 16, and a transmission 17.

The power from the engine 10 is transmitted to a power takeoff 15. The power takeoff 15 sends part of the power from the engine 10 to hydraulic pumps or the like that generate power for the blade 5 and the ripper device 6 and sends the rest of the power to the torque converter 16. The torque converter 16 transmits power through a fluid. The output shaft of the torque converter 16 is linked to the input shaft of the transmission 17, and power is transmitted from the torque converter 16 to the transmission 17.

The transmission 17 changes the speed of the rotary motion of the engine. The transmission 17 is provided with a clutch 17a for switching between forward and reverse, and a plurality of shifting clutches 17b. The clutches 17a and 17b are hydraulic clutches that can be hydraulically switched between engaged and disengaged states. The supply and discharge of hydraulic fluid to and from the clutches 17a and 17b are controlled by a transmission control valve 26. The power outputted from the transmission 17 is transmitted through a first bevel gear 18 and a second bevel gear 19 to a lateral shaft 20.

The power transmitted to the lateral shaft 20 goes through the left steering clutch 12L, a left output shaft 21L, and a left final reduction gear 22L and is transmitted to the left sprocket 2L. Also, the power transmitted to the lateral shaft 20 goes through the right steering clutch 12R, a right output shaft 21R, and a right final reduction gear 22R and is transmitted to the right sprocket 2R. The crawler belts 3L and 3R are wound around the sprockets 2L and 2R. Therefore, when the sprockets are rotationally driven, the crawler belts 3L and 3R are driven, and this propels the bulldozer 1.

The bulldozer 1 includes left and right rotational speed sensors 42L and 42R that sense the rotational speed of the left and right output shafts 21L and 21R, for the purpose of sensing the vehicle speed of the bulldozer 1, etc. In the following description, for the sake of convenience, the sprockets 2L and 2R may also be called drive wheels.

The left and right steering clutches 12L and 12R are disposed between the transmission 17 and the sprockets 2L and 2R, respectively, and are hydraulic clutches that can be hydraulically switched between engaged and disengaged states. The supply and discharge of hydraulic fluid to and from the steering clutches 12L and 12R are controlled by steering clutch pressure control valves 27L and 27R.

Here, if the left steering clutch 12L is in its engaged state, power from the second bevel gear 19 is transmitted to the left sprocket 2L. If the left steering clutch 12L is in its disengaged state, power from the second bevel gear 19 is cut off by the left steering clutch 12L and is not transmitted to the left sprocket 2L. If the right steering clutch 12R is in its engaged state, power from the second bevel gear 19 is transmitted to the right sprocket 2R If the right steering clutch 12R is in its disengaged state, power from the second bevel gear 19 is cut off by the right steering clutch 12R and is not transmitted to the right sprocket 2R.

The left and right steering brakes 13L and 13R are disposed between the left and right steering clutches 12L and 12R and the sprockets 2L and 2R, respectively, and are hydraulic brakes that can be hydraulically switched between a braking state and a non-braking state. The supply and discharge of hydraulic fluid to and from the left and right steering brakes 13L and 13R are controlled by brake pressure control valves 28L and 28R.

The output rotation of the left steering clutch 12L, that is, the rotation of the left sprocket 2L, can be braked by putting the left steering brake 13L in a braking state. The output rotation of the right steering clutch 12R, that is, the rotation of the right sprocket 2R, can be braked by putting the right steering brake 13R in a braking state.

With the above configuration, in a state in which the left steering clutch 12L is disengaged and the left steering brake 13L is braking, if the right steering clutch 12R is engaged and the right sprocket 2R is rotationally driven, the bulldozer 1 will turn to the left. Conversely, in a state in which the right steering clutch 12R is disengaged and the right steering brake 13R is braking, if the left steering clutch 12L is engaged and the left sprocket 2L is rotationally driven, the bulldozer 1 will turn to the right.

Configuration Around Steering Clutches

Figure 3:
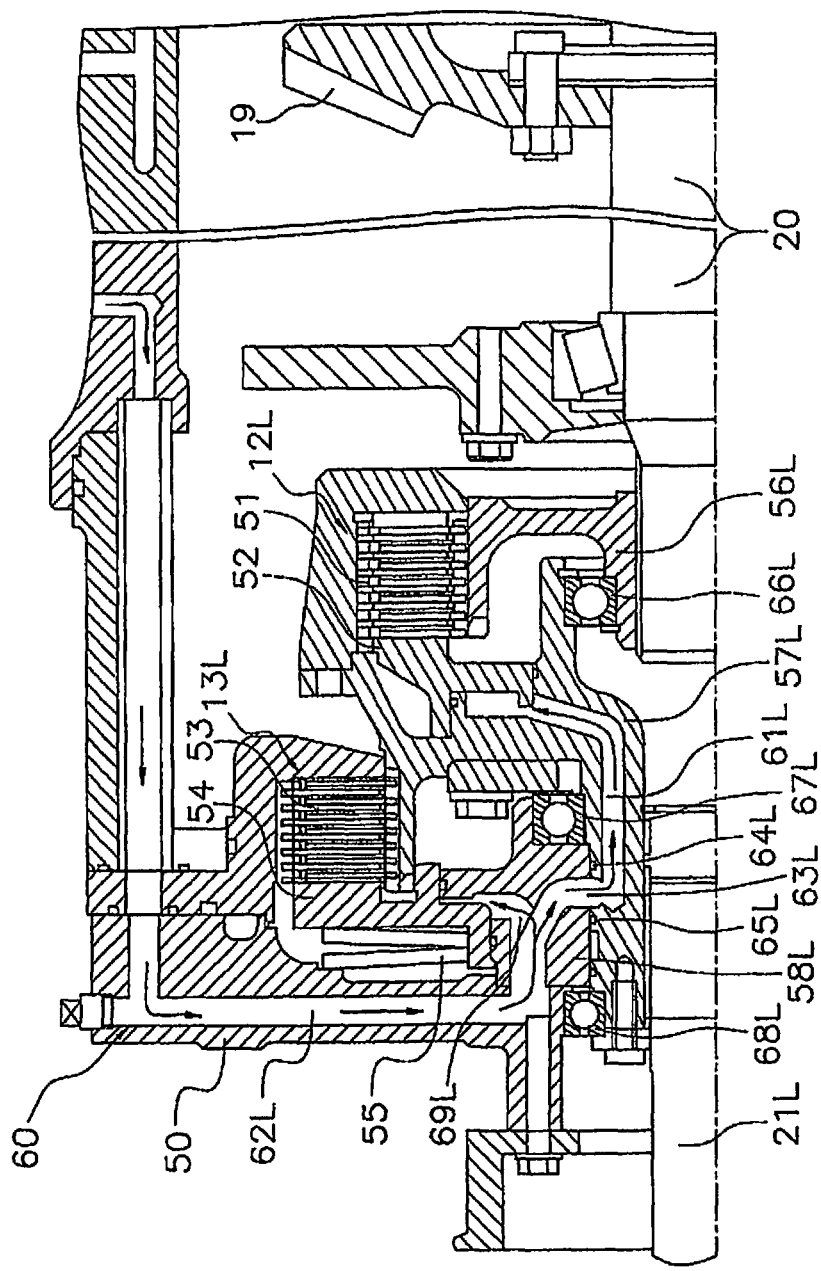
FIG. 3 is a detail view of the area around the left steering brake and the left steering clutch.

Referring to FIG. 3, a first left rotary member 56L is linked to one side of the left steering clutch 12L, and a second left rotary member 57L is linked to the other side. That is, the power transmission device 11 includes the first left rotary member 56L and the second left rotary member 57L.

The first left rotary member 56L is engaged by spline mating with the lateral shaft 20. The first left rotary member 56L rotates integrally with the second bevel gear 19 and the lateral shaft 20. The second left rotary member 57L is engaged by spline mating with the left output shaft 21L linked to the left final reduction gear 22L. Therefore, the left drive unit 4L is driven by the second left rotary member 57L. The second left rotary member 57L is rotatably supported by a first left bearing 66L disposed on the first left rotary member 56L. The power transmission device 11 includes the first left bearing 66L.

A first left support member 58L is linked to one side of the left steering brake 13L, and the second left rotary member 57L is linked to the other side. The first left support member 58L is fixed to a housing 50 of the power transmission device 11. The first left support member 58L and the housing 50 are collectively referred to here as a support member. The power transmission device 11 includes the support member.

A second left bearing 67L and a third left bearing 68L are attached on the support member. The power transmission device 11 includes the second left bearing 67L and the third left bearing 68L. The second left bearing 67L and the third left bearing 68L rotatably support the second left rotary member 57L and the left output shaft 21L. Consequently, the support member rotatably supports the second left rotary member 57L and the left output shaft 21L. The second left rotary member 57L and the left output shaft 21L rotate integrally.

The bulldozer 1 includes a hydraulic fluid supply channel 60 that supplies hydraulic fluid to the power transmission device 11, and more specifically to the left and right steering clutch 12L and 12R and the left and right steering brakes 13L and 13R inside the support member and the second left rotary member 57L. The hydraulic fluid supply channel 60 includes a first left hydraulic fluid supply channel 61L, a second left hydraulic fluid supply channel 62L, and a left connected part 63L. The first left hydraulic fluid supply channel 61L is formed inside the second left rotary member 57L, and connects to the left steering clutch 12L. The first left hydraulic fluid supply channel 61L supplies hydraulic fluid to the left steering clutch 12L.

The second left hydraulic fluid supply channel 62L is formed inside the support member, that is, on the outside of the second left rotary member 57L. The second left hydraulic fluid supply channel 62L supplies hydraulic fluid to the first left hydraulic fluid supply channel 61L. The left connected part 63L connects the first left hydraulic fluid supply channel 61L to the second left hydraulic fluid supply channel 62L. Also, the hydraulic fluid supply channel 60 separately includes a braking left supply channel 69L that connects to the left steering brake 13L. In FIG. 3, the braking left supply channel 69L is disposed overlapping the first left hydraulic fluid supply channel 61L, and the braking left supply channel 69L is located on the back side of the first left hydraulic fluid supply channel 61L.

The left connected part 63L is provided in a gap between the support member and the second left rotary member 57L. The power transmission device 11 includes a first left sealing ring 64L and a second left sealing ring 65L. The first left sealing ring 64L and the second left sealing ring 65L are disposed adjacent to the left connected part 63L so that hydraulic fluid will not leak out from the left connected part 63L. More specifically, the first left sealing ring 64L is mounted on the surface of the second left rotary member 57L on the side closer to the second bevel gear 19 than the left connected part 63L (on the inside of the vehicle). The second left sealing ring 65L is mounted on the surface of the second left rotary member 57L on the side closer to the left final reduction gear 22L than the left connected part 63L (on the outside of the vehicle).

The gap between the support member and the second left rotary member 57L is sealed by the first left sealing ring 64L and the second left sealing ring 65L. Therefore, the left connected part 63L is formed by the gap between the support member and the second left rotary member 57L, which is sealed by the first left sealing ring 64L and the second left sealing ring 65L. In the example in FIG. 3, the shaft diameters of the first left sealing ring 64L and the second left sealing ring 65L are equal, but this is not necessarily the case.

FIG. 3 shows only the first left rotary member 56L, the second left rotary member 57L, the first left support member 58L, the first left hydraulic fluid supply channel 61L, the second left hydraulic fluid supply channel 62L, the left connected part 63L, the braking left supply channel 69L, the first left sealing ring 64L, the second left sealing ring 65L, the first left bearing 66L, the second left bearing 67L, and the third left bearing 68L.

However, the hydraulic fluid supply channel 60 also includes a first right hydraulic fluid supply channel 61R, a second right hydraulic fluid supply channel 62R, a right connected part 63R, and a braking right supply channel 69R, which are connected to the right steering clutch 12R or the right steering brake 13R. The first right hydraulic fluid supply channel 61R, the second right hydraulic fluid supply channel 62R, the right connected part 63R, and the braking right supply channel 69R respectively have the same structure as the first left hydraulic fluid supply channel 61L, the second left hydraulic fluid supply channel 62L, the left connected part 63L, and the braking left supply channel 69L.

Also, the power transmission device 11 includes a first right rotary member 56R, a second right rotary member 57R, and a first right support member 58R, which are connected to the left steering clutch 12R or the right steering brake 13R. The first right rotary member 56R, the second right rotary member 57R, and the first right support member 58R have the same structure as the first left rotary member 56L, the second left rotary member 57L, and the first left support member 58L.

The power transmission device 11 includes a first right sealing ring 64R, a second right sealing ring 65R, a first right bearing 66R, a second right bearing 67R, and a third right bearing 68R, which are connected to the first right rotary member 56R, the second right rotary member 57R, or the first right support member 58R. The first right sealing ring 64R, the second right sealing ring 65R, the first right bearing 66R, the second right bearing 67R, and the third right bearing 68R respectively have the same structure as the first left sealing ring 64L, the second left sealing ring 65L, the first left bearing 66L, the second left bearing 67L, and the third left bearing 68L.

The left steering clutch 12L is a wet multi-plate type, and includes clutch disks 51 and a clutch piston 52. With the left steering clutch 12L, when the hydraulic pressure of the hydraulic fluid from the first left hydraulic fluid supply channel 61L is applied to the clutch piston 52, the clutch disks 51 are joined by hydraulic pressure and power is transmitted. Therefore, the left steering clutch 12L is engaged when subjected to the pressure of the hydraulic fluid supplied from the hydraulic fluid supply channel 60 to the left steering clutch 12L.

Saying that the left steering clutch 12L is engaged means that a pressure equal to or greater than a specific holding pressure, which is the pressure at which torque within the designed range can be transmitted without clutch slippage, is being supplied to the left steering clutch 12L. Here, the pressure equal to or greater than a specific holding pressure that is applied to the steering clutches 12L and 12R in the engagement of the steering clutches 12L and 12R is called the engagement pressure. Normally, when the left steering clutch 12L is engaged, the pressure of the hydraulic fluid applied to the left steering clutch 12L is a first pressure. This first pressure is included in the engagement pressure.

The pressure applied to the left steering clutch 12L (clutch pressure) rises in proportion to the hydraulic pressure supplied to the left steering clutch 12L. In FIG. 3, only the left steering clutch 12L is shown, but the right steering clutch 12R has the same structure.

The left steering brake 13L is a wet multi-plate type, and includes brake disks 53, a brake piston 54, and a plate spring 55. The left steering brake 13L is a so-called negative brake, with which the brake disks 53 are pressed and a braking state is produced by the biasing force of the plate spring 55 in a state in which the hydraulic pressure of the hydraulic fluid from the braking left supply channel 69L is not being applied to the brake piston 54.

When the hydraulic pressure of the hydraulic fluid from the braking left supply channel 69L is applied to the brake piston 54, the brake piston 54 causes the brake disks 53 to move apart against the biasing force of the plate spring. This puts the left steering brake 13L in a released state. In FIG. 3, only the left steering brake 13L is shown, but the right steering brake 13R has the same structure.

Here, when braking is produced by the left steering brake 13L, the left steering clutch 12L is released. At this point the second left rotary member 57L is stationary along with the support member. Therefore, the rotational speed of the first left sealing ring 64L and the second left sealing ring 65L is zero, and there is little hydraulic pressure applied to the first left sealing ring 64L and the second left sealing ring 65L. Therefore, the PV value of the first left sealing ring 64L and the second left sealing ring 65L falls well within the permissible usage range. The PV value is the product of the surface pressure P applied to the rotary member and the slipping velocity V. The same can be the of the right steering brake 13R.

Meanwhile, when the left steering brake 13L is released and the left steering clutch 12L is engaged, the second left rotary member 57L rotates along with the first left rotary member 56L under the power from the transmission 17. The support member, however, is stationary. Therefore, the slipping velocities V of the first left sealing ring 64L and the second left sealing ring 65L respectively correspond to the product of multiplying the shaft diameters of the first left sealing ring 64L and the second left sealing ring 65L by the circumference ratio and the rotational speed of the second left rotary member 57L.

When no slip is occurring at the left steering clutch 12L, the rotational speed of the second left rotary member 57L is equal to the rotational speed of the first left rotary member 56L. Furthermore, since the left steering clutch 12L is engaged, the surface pressure P applied to the first left sealing ring 64L and the second left sealing ring 65L is normally the above-mentioned first pressure.

When the rotational speed of the second left rotary member 57L rises, or when the clutch pressure of the left steering clutch 12L increases, there is an increase in the PV values of the first left sealing ring 64L and the second left sealing ring 65L. Therefore, the PV values of the first left sealing ring 64L and the second left sealing ring 65L must fall within the permissible usage range (a range which is equal to or less than the maximum permissible value). The same can be the of the right steering clutch 12R.

Configuration for Output Control

This bulldozer 1 has a controller 30 (see FIG. 2). The controller 30 includes a CPU or other such computation device, and a RAM, ROM, or other such memory device. The controller 30 is connected to a fuel dial 45, a decelerator pedal 46, a steering lever 48, and an upshift/downshift button 49, which are housed in the cab 7.

The fuel dial 45 is operated by the operator. A signal indicating the target engine speed, which is the amount the fuel dial 45 is turned, is inputted to the controller 30. The decelerator pedal 46 is depressed by the operator. A signal indicating the deceleration rotational speed, which is the amount the decelerator pedal 46 is depressed, is inputted to the controller 30. The controller 30 sends an engine output command to the engine 10 and controls the engine 10 so as to obtain a target engine speed corresponding to how much the fuel dial 45 is turned. The controller 30 also controls the speed of the engine 10 so that the engine speed will decrease according to how much the decelerator pedal 46 is depressed.

The steering lever 48 is used to switch the bulldozer 1 between forward and reverse movement and to switch its turning direction. The upshift/downshift button 49 is used by the operator to shift the gear of the transmission 17. The controller 30 receives a signal from the steering lever 48 or the upshift/downshift button 49 and shifts the gear of the transmission 17 and controls the pressure control valves 27L, 27R, 28L, and 28R.

Figure 4:
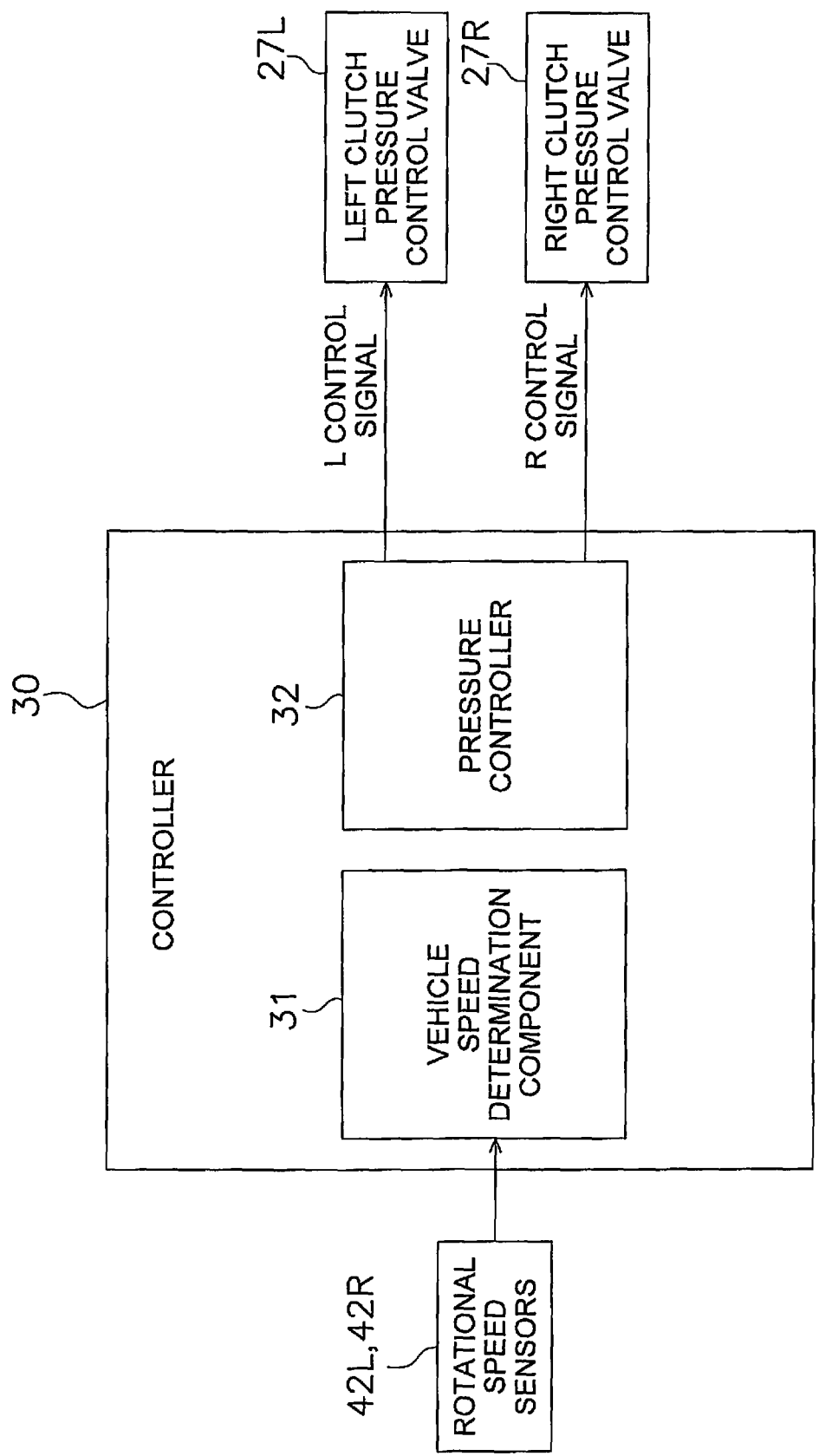
FIG. 4 is a block diagram of the controller according to the first embodiment.

FIG. 4 is a block diagram of the detailed configuration of the controller 30 according to the first embodiment. The controller 30 includes a vehicle speed determination component 31 and a pressure controller 32. Typically, programs and data for executing the various functions of the vehicle speed determination component 31 and the pressure controller 32 are stored in the memory device. When the computation device executes the program, the controller 30 executes the various functions of the vehicle speed determination component 31 and the pressure controller 32. The controller 30 may also be realized by an integrated circuit.

The vehicle speed determination component 31 determines whether or not the vehicle speed of the bulldozer 1 is equal to or greater than a specific speed. The rotational speeds of the left and right rotational speed sensors 42L and 42R (see FIG. 2) are inputted to the vehicle speed determination component 31, for example. The rotational speed measured by the left rotational speed sensor 42L corresponds to the rotational speed of the first left sealing ring 64L and the second left sealing ring 65L. The rotational speed measured by the right rotational speed sensor 42R corresponds to the rotational speed of the first right sealing ring 64R and the second right sealing ring 65R.

More specifically, when the rotational speed ΦL measured by the left rotational speed sensor 42L is greater than a specific rotational speed threshold ΦthL, or when rotational speed ΦR measured by the right rotational speed sensor 42R is greater than a specific rotational speed threshold ΦthR, the vehicle speed determination component 31 determines the vehicle speed of the bulldozer 1 to be equal to or greater than the specific speed. The rotational speed threshold ΦthL is predetermined so as to satisfy the following formula (1). The rotational speed threshold ΦthR is predetermined so as to satisfy the following formula (2).

$$\Phi thL \leq \text{Max } PVL/(DL \times P1) \quad (1)$$

Max PVL: maximum permissible PV value of first left sealing ring 64L and second left sealing ring 65L
DL: shaft diameter of first left sealing ring 64L and second left sealing ring 65L
P1: first pressure $$\Phi thR \leq \text{Max } PVR/(DR \times P1) \quad (2)$$

Max PVR: maximum permissible PV value of first right sealing ring 64R and second right sealing ring 65R
DR: shaft diameter of first right sealing ring 64R and second right sealing ring 65R
P1: first pressure When the first left sealing ring 64L, the second left sealing ring 65L, the first right sealing ring 64R, and the second right sealing ring 65R are all the same sealing ring, the right side of Formula 1 and the right side of Formula 2 are equivalent. In this case, it is preferable if ΦthL=ΦthR.

In the above description, an example is given of a case in which the maximum permissible PV values of the first left sealing ring 64L and the second left sealing ring 65L are the same as the maximum permissible PV values of the first right sealing ring 64R and the second right sealing ring 65R, and the shaft diameters of the first left sealing ring 64L and the second left sealing ring 65L are the same as the shaft diameters of the first right sealing ring 64R and the second right sealing ring 65R.

However, there are also cases when the first left sealing ring 64L and the second left sealing ring 65L have different maximum permissible PV values. Or, the first left sealing ring 64L and the second left sealing ring 65L may have different shaft diameters. In such a case, Max PVL/(DL×P1) may be calculated for each of the first left sealing ring 64L and the second left sealing ring 65L, and the rotational speed threshold ΦthL set for the first left sealing ring 64L and the second left sealing ring 65L so as to be equal to or less than the lower of the calculated values.

Similarly, there are also cases when the first right sealing ring 64R and the second right sealing ring 65R have different maximum permissible PV values. Or, the first right sealing ring 64R and the second left sealing ring second right sealing ring 65R may have different shaft diameters. In such a case, Max PVR/(DR×P1) may be calculated for each of the first right sealing ring 64R and the second right sealing ring 65R, and the rotational speed threshold ΦthR set for the first right sealing ring 64R and the second right sealing ring 65R so as to be equal to or less than the lower of the calculated values.

The pressure controller 32 decides the pressure of the hydraulic fluid in the hydraulic fluid supply channel 60 so as to keep the PV value of the left and right steering clutches 12L and 12R within the permissible usage range. More specifically, the pressure controller 32 decides the engagement pressure of the left steering clutch 12L so as to keep the PV value of the left steering clutch 12L within the permissible usage range. The pressure controller 32 then outputs a command corresponding to the decided engagement pressure to the left steering clutch pressure control valve 27L. The pressure controller 32 performs control so that the clutch pressure of the left steering clutch 12L will be the decided engagement pressure.

Similarly, the pressure controller 32 decides the engagement pressure of the right steering clutch 12R so as to keep the PV value of the right steering clutch 12R within the permissible usage range. The pressure controller 32 then outputs a command corresponding to the decided engagement pressure to the right steering clutch pressure control valve 27R. The pressure controller 32 performs control so that the clutch pressure of the right steering clutch 12R will be the decided engagement pressure. The steering clutch pressure control valves 27L and 27R receive commands from the pressure controller 32, and control the pressure of the hydraulic fluid in the hydraulic fluid supply channel 60.

More specifically, if the vehicle speed determination component 31 determines the vehicle speed of the bulldozer 1 not to be equal to or greater than a specific speed, the pressure controller 32 outputs a command to the steering clutch pressure control valves 27L and 27R to use the above-mentioned first pressure for the pressure of the hydraulic fluid in the hydraulic fluid supply channel 60. That is, the pressure controller 32 performs control so that the engagement pressure of the left and right steering clutches 12L and 12R will be the first pressure.

If the vehicle speed determination component 31 determines the vehicle speed of the bulldozer 1 to be equal to or greater than the specific speed, the pressure controller 32 outputs a command to the steering clutch pressure control valves 27L and 27R to reduce the pressure of the hydraulic fluid in the hydraulic fluid supply channel 60 from the first pressure. That is, the pressure controller 32 performs control so that the engagement pressure of the left and right steering clutches 12L and 12R will be reduced from the first pressure.

More specifically, if the vehicle speed determination component 31 determines the vehicle speed of the bulldozer 1 to be equal to or greater than the specific speed, the pressure controller 32 outputs a command to the left steering clutch pressure control valve 27L to reduce the hydraulic pressure PL so that the product of the rotational speed ΦL and the hydraulic pressure PL applied to the left steering clutch 12L will not exceed a specific upper limit UlimL. That is, the pressure controller 32 performs control so that the pressure will be reduced from the engagement pressure PL so that the product of the rotational speed ΦL and the engagement pressure PL of the left steering clutch 12L will not exceed the specific upper limit UlimL.

Similarly, if the vehicle speed determination component 31 determines the vehicle speed of the bulldozer 1 to be equal to or greater than the specific speed, the pressure controller 32 outputs a command to the right steering clutch pressure control valve 27R to reduce the hydraulic pressure PR so that the product of the rotational speed ΦR and the hydraulic pressure PR applied to the right steering clutch 12R will not exceed a specific upper limit UlimR. That is, the pressure controller 32 performs control so that the pressure will be reduced from the engagement pressure PR so that the product of the rotational speed ΦR and the engagement pressure PR of the right steering clutch 12R will not exceed the specific upper limit UlimR. These specific upper limits UlimL and UlimR are determined by Formulas 3 and 4.

$$U\lim L = \Phi thL \times P1 \quad (3)$$

ΦthL: rotational speed threshold determined so as to satisfy Formula 1
P1: first pressure $$U\lim R = \Phi thR \times P1 \quad (4)$$

ΦthR: rotational speed threshold determined so as to satisfy Formula 2
P1: first pressure These upper limits UlimL and UlimR may be called a first product. The pressure controller 32 can make use of the first product UlimL to set the target hydraulic pressure PL applied to the left steering clutch 12L as in Formula 5. Similarly, the pressure controller 32 can make use of the first product UlimR to set the target hydraulic pressure PR applied to the right steering clutch 12R as in Formula 6. The pressure controller 32 outputs commands to the steering clutch pressure control valves 27L and 27R to use the target hydraulic pressures PL and PR thus set. The pressure controller 32 controls the engagement pressure of the left and right steering clutches 12L and 12R to be the target hydraulic pressures PL and PR thus set.

$$PL = U\lim L / MAX(\Phi L, \Phi R) \quad (5)$$

MAX (ΦL, ΦR): rotational speed of the greater of ΦL and ΦR $$PR = U\lim R / MAX(\Phi L, \Phi R) \quad (6)$$

MAX (ΦL, ΦR): rotational speed of the greater of ΦL, and ΦR

If the rotational speed ΦL of the left rotational speed sensor 42L is higher than the rotational speed threshold ΦthL, the pressure controller 32 may control the engagement pressure PL of the left steering clutch 12L regardless of the rotational speed ΦR of the right rotational speed sensor 42R. Similarly, if the rotational speed ΦR of the right rotational speed sensor 42R is higher than the rotational speed threshold ΦthR, the pressure controller 32 may control the engagement pressure PR of the right steering clutch 12R regardless of the rotational speed ΦL of the left rotational speed sensor 42L.

In this case, the pressure controller 32 preferably outputs a command to the pressure control valve 27L of the left steering clutch 12L to use the pressure PL found from Formula 7 for the engagement pressure of the left steering clutch 12L. Similarly, the pressure controller 32 preferably outputs a command to the pressure control valve 27R of the right steering clutch 12R to use the pressure PR found from Formula 8 for the engagement pressure of the right steering clutch 12R.

$$PL = \begin{cases} P1 \ (VL \leq VthLのとき) \\ U\lim L / VL \ (VL > VthLのとき) \end{cases} \quad (7)$$

$$PR = \begin{cases} P1 \ (VR \leq VthRのとき) \\ U\lim R / VR \ (VR > VthRのとき) \end{cases} \quad (8)$$

Figure 5:
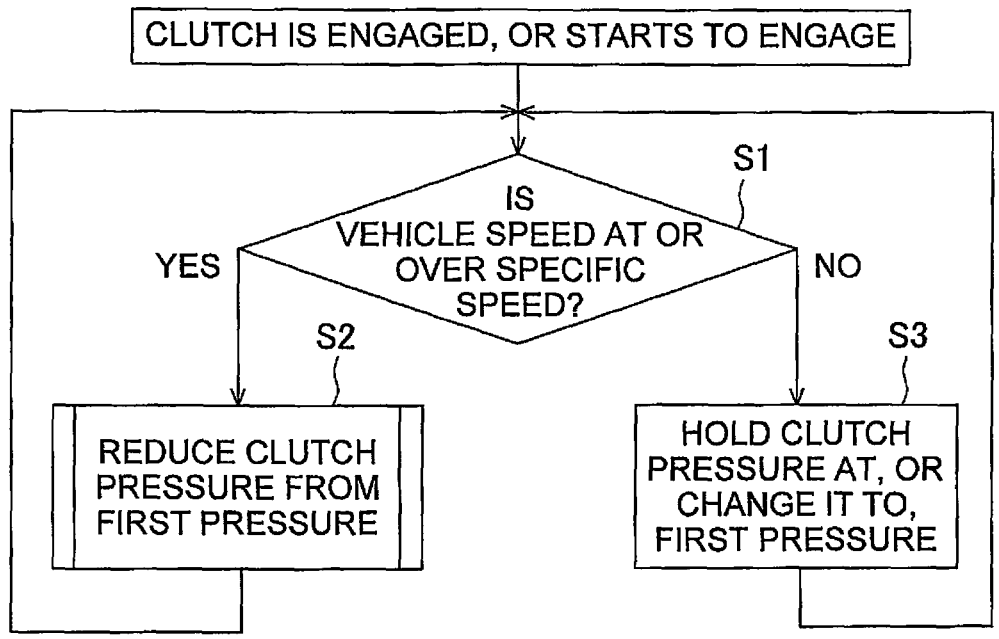
FIG. 5 is a flowchart of a method for controlling a steering clutch.
Figure 6:
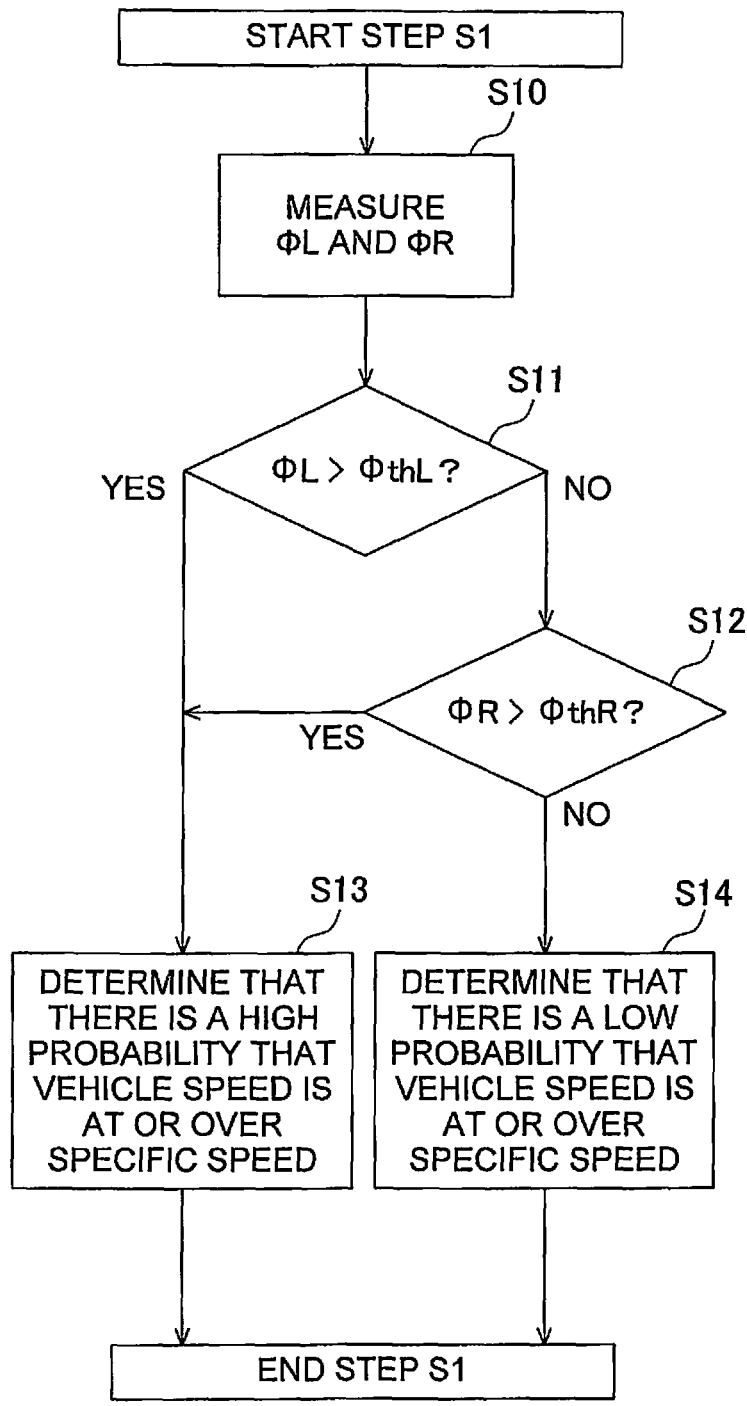
FIG. 6 is a flowchart of a method for determining vehicle speed in the first embodiment.
Figure 7:
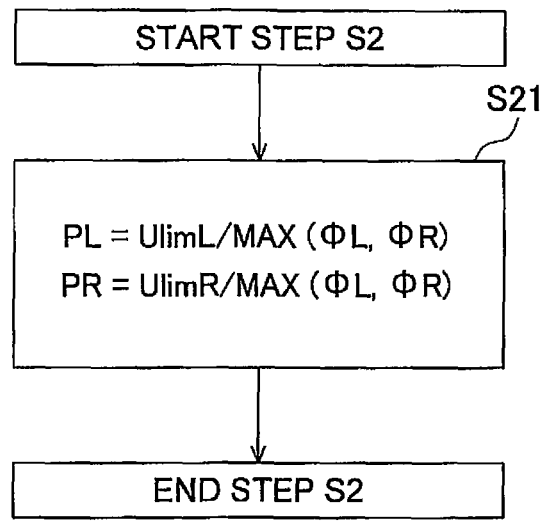
FIG. 7 is an example of a method for changing clutch pressure in the first embodiment.
Figure 8:
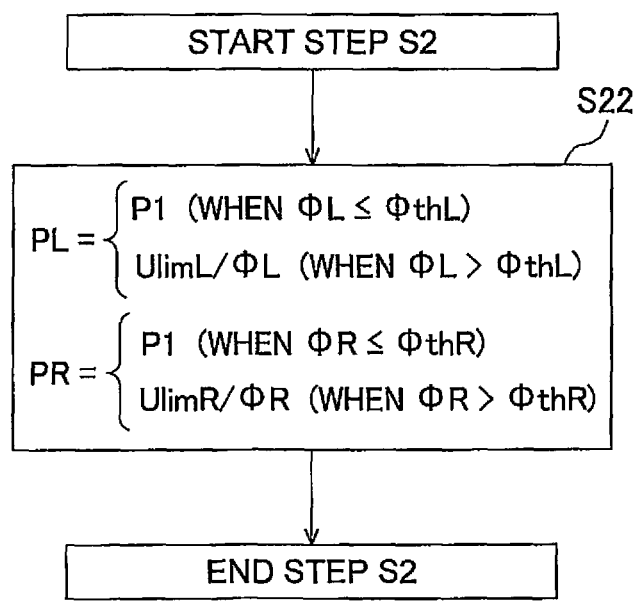
FIG. 8 is another example of a method for changing clutch pressure in the first embodiment.

Next, the method for controlling the steering clutches 12L and 12R will be described using a flowchart. FIG. 5 is a flowchart of the method for controlling the steering clutches. FIG. 6 is a flowchart of the vehicle speed determination method according to the first embodiment. FIG. 7 is an example of a method for changing the clutch pressure in the first embodiment. FIG. 8 is another example of a method for changing the clutch pressure in the first embodiment.

First, in step 1, the vehicle speed determination component 31 determines whether or not the vehicle speed is equal to or greater than a specific speed. In this step, the left rotational speed sensor 42L measures the rotational speed ΦL of the first left sealing ring 64L and the second left sealing ring 65L in step 10 in FIG. 6, and the right rotational speed sensor 42R measures the rotational speed ΦR of the first right sealing ring 64R and the second right sealing ring 65R. In step 11, the vehicle speed determination component 31 determines whether or not the rotational speed ΦL measured by the left rotational speed sensor 42L is more than a specific rotational speed threshold ΦthL.

If the rotational speed ΦL is not more than the rotational speed threshold ΦthL (No in step 11), in step 12 the vehicle speed determination component 31 determines whether or not the rotational speed ΦR measured by the right rotational speed sensor 42R is more than a specific rotational speed threshold ΦthR.

If the rotational speed ΦL is more than the rotational speed threshold ΦthL (Yes in step 11), or if the rotational speed ΦR is more than the specific rotational speed threshold ΦthR (Yes in step 12), in step 13 the vehicle speed determination component 31 determines the vehicle speed to be equal to or greater than the specific speed. If the rotational speed ΦR is not more than the rotational speed threshold ΦthR (No in step 12), in step 14 the vehicle speed determination component 31 determines the vehicle speed not to be equal to or greater than the specific speed.

If the vehicle speed determination component 31 determines the vehicle speed to be equal to or greater than the specific speed (Yes in step 1 in FIG. 5), in step 2 the pressure controller 32 reduces the engagement pressure (the pressure in the first left/right hydraulic fluid supply channels) from the above-mentioned first pressure. More specifically, when the rotational speed ΦL is more than the specific rotational speed threshold ΦthL, the pressure controller 32 reduces the engagement pressure PL so that the product of the rotational speed ΦL and the engagement pressure PL of the left steering clutch 12L will not exceed the upper limit UlimL. Also, when the rotational speed ΦR is more than the specific rotational speed threshold ΦthR, the pressure controller 32 reduces the engagement pressure PR so that the product of the rotational speed ΦR and the engagement pressure PR of the right steering clutch 12R will not exceed the upper limit UlimR.

An example of specific processing is shown in FIG. 7. In step 21, the pressure controller 32 performs control so that the engagement pressure PL of the left steering clutch 12L will be UlimL/MAX (ΦL, ΦR), and the engagement pressure PR of the right steering clutch 12R will be UlimR/MAX (ΦL, ΦR).

Another processing example is shown in FIG. 8. In step 22, when the rotational speed ΦL is equal to or less than the rotational speed threshold ΦthL, the pressure controller 32 performs control so that the engagement pressure PL will be the first pressure P1. When the rotational speed ΦL is more than the rotational speed threshold ΦthL, the pressure controller 32 performs control so that the engagement pressure PL will be UlimL/ΦL. When the rotational speed ΦR is equal to or less than the rotational speed threshold ΦthR, the pressure controller 32 performs control so that the engagement pressure PR will be the first pressure P1. When the rotational speed ΦR is more than the rotational speed threshold ΦthR, the pressure controller 32 performs control so that the engagement pressure PR will be UlimR/ΦR.

If the vehicle speed determination component 31 determines that the vehicle speed is not equal to or greater than a specific speed (No in step 1 in FIG. 5), in step 3 the pressure controller 32 performs control so that the engagement pressure (the pressure in first left/right hydraulic fluid supply channels) will be the above-mentioned first pressure.

Second Embodiment

The method for determining whether or not the vehicle speed is equal to or greater than the specific speed, and the method for changing the engagement pressure are not limited to the methods in the above embodiment, and there are other methods. In this second embodiment a controller 30a that is different from the controller 30 in the first embodiment will be described. In the second embodiment, the components other than the controller 30a are all the same as in the first embodiment, and will therefore not be described again. Also, the controller 30a is configured the same as the controller 30 in the first embodiment, except for a vehicle speed determination component 31a and a pressure controller 32a (discussed below). Therefore, description related to components that are the same as in the controller 30 will be omitted.

Figure 9:
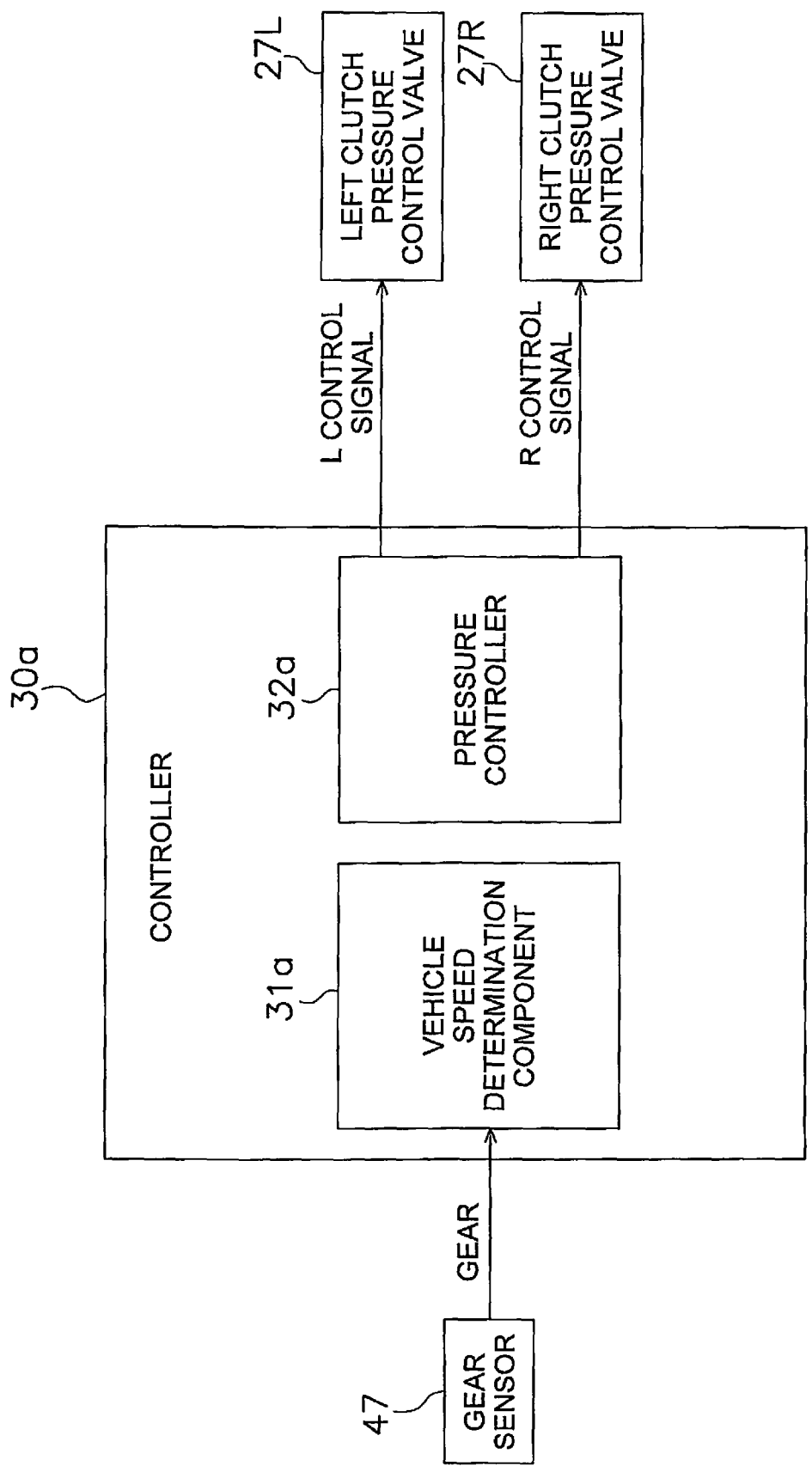
FIG. 9 is a block diagram of the controller according to a second embodiment.

FIG. 9 is a block diagram of the detailed configuration of the controller 30a according to the second embodiment. The controller 30a includes the vehicle speed determination component 31a and the pressure controller 32a. The vehicle speed determination component 31a determines whether or not the vehicle speed of the bulldozer 1 is equal to or greater than the specific speed. The gear sensed by a gear sensor 47 is also inputted to the vehicle speed determination component 31a. The gear sensor 47 is connected to the upshift/downshift button 49 and senses the gear of the power transmission device 11 set by operator input. The controller 30a may automatically shift the gear of the transmission 17. In this case, the gear sensor 47 preferably senses the gear to which the transmission 17 has been automatically shifted.

Figure 10:
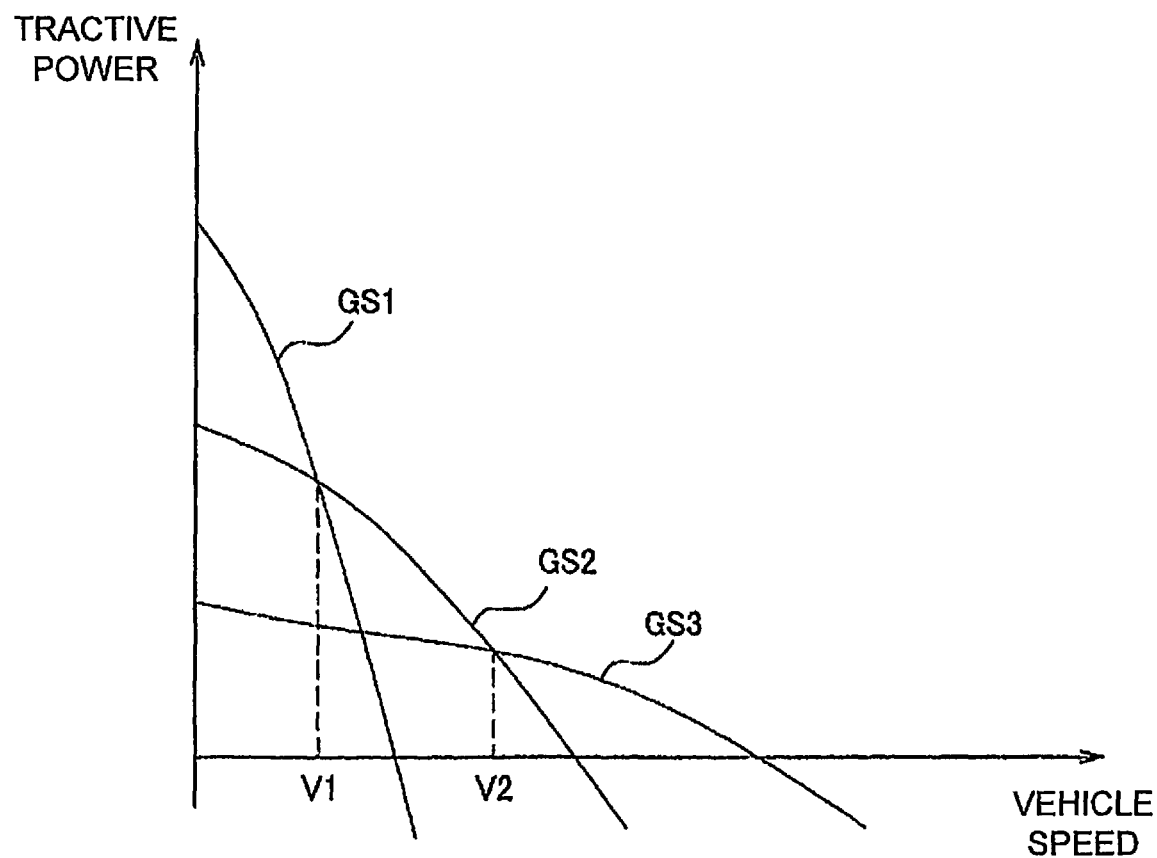
FIG. 10 is an example of a graph of bulldozer travel performance.

More specifically, when the gear sensed by the gear sensor 47 is either a first specific gear or is a gear higher than the first gear, the vehicle speed determination component 31a determines the vehicle speed of the bulldozer 1 to be equal to or greater than the specific speed. The reason for this will be explained through reference to FIG. 10. FIG. 10 is an example of a graph of the travel performance in the various gears of the bulldozer 1. GS1, GS2, and GS3 in FIG. 10 indicate the tractive power in first, second, and third gears, respectively.

The tractive power in each gear goes up or down depending on a number of conditions, such as (1) the position of the fuel dial 45 and (2) how much the decelerator pedal 46 is depressed, but these conditions are the same at GS1, GS2, and GS3. In FIG. 10, if the tractive power is negative, that means that a force is being applied to slow down the vehicle (known as engine braking).

FIG. 10 shows an example of when the bulldozer 1 has three gears. If there are four or more gears, as the gear rises to fourth and fifth, the travel performance curve for each gear varies such that the tractive power at a speed of 0 decreases, and the speed at a tractive power of 0 increases.

The number of gears of the bulldozer 1 is not limited to what is shown in FIG. 10, and may be two gears, or four or more gears.

The first specific gear here is generally the highest gear that can be set on the bulldozer 1. That is, in the example in FIG. 10, the first specific gear means third gear. When the bulldozer 1 travels under automatic gear shifts, the gear is generally shifted in order to obtain the tractive power needed for the load. The shift speed for that gear is set near the intersection of the traction curve. For instance, the shift speed from third gear to second is a vehicle speed v2. Therefore, in the case in FIG. 10, the fact that the gear is third means that there is a high probability that the vehicle speed is equal to or greater than v2.

In this case, the rotational speed ΦL of the sealing rings 64L and 65L and the rotational speed ΦR of the sealing rings 64R and 65R are higher, and there is the possibility that ΦL and ΦR will exceed the rotational speed thresholds ΦthL and ΦthR set to the ranges defined by Formulas 1 and 2, respectively. Therefore, the pressure controller 32a performs control so that when the vehicle speed determination component 31a has determined the vehicle speed of the bulldozer 1 to be equal to or greater than the specific speed, the engagement pressure of the left and right steering clutches 12L and 12R will be reduced from the first pressure.

However, the first gear may be set lower than the highest gear, and set to a gear near the highest gear. For example, in the example in FIG. 10, the first gear may be second gear. In this case, it means that there is a high possibility that the vehicle speed is equal to or greater than v1. The "first gear" is never set to actual first.

In FIG. 9, if the vehicle speed determination component 31a determines the vehicle speed of the bulldozer 1 to be equal to or greater than the specific speed, the pressure controller 32a performs control so that the engagement pressure PL of the left steering clutch 12L will be a second pressure that is lower than the above-mentioned first pressure. Similarly, if the vehicle speed determination component 31a determines the vehicle speed of the bulldozer 1 to be equal to or greater than the specific speed, the pressure controller 32a performs control so that the engagement pressure PR of the right steering clutch 12R will be the second pressure. The second pressure is included in the engagement pressure.

If the designed maximum rotational speed of the left output shaft 21L and the right output shaft 21R when the gear is the first gear or a gear higher than the first gear is set to Φ max, then the second pressure P2 will be as shown in the following Formula 9.

$$P2 \leq \text{Min}(\text{Max } PVL/(DL \times \Phi \text{ max}), \text{Max } PVR/(DR \times \Phi \text{ max})) \quad (9)$$

Max PVL: maximum permissible PV value of first left sealing ring 64L and second left sealing ring 65L
Max PVR: maximum permissible PV value of first right sealing ring 64R and second right sealing ring 65R
DL: shaft diameter of first left sealing ring 64L and second left sealing ring 65L
DR: shaft diameter of first right sealing ring 64R and second right sealing ring 65R
Min (A, B): the lesser value of A and B (however, if the first left sealing ring 64L, the second left sealing ring 65L, the first right sealing ring 64R, and the second right sealing ring 65R are all the same sealing ring, then Max PVL/(DL×Φ max)=Max PVR/(DR×Φ max))

However, it is preferable for the second pressure P2 to be as high as possible so that the left steering clutch 12L and the right steering clutch 12R will be able to transmit as much torque as possible.

Figure 11:
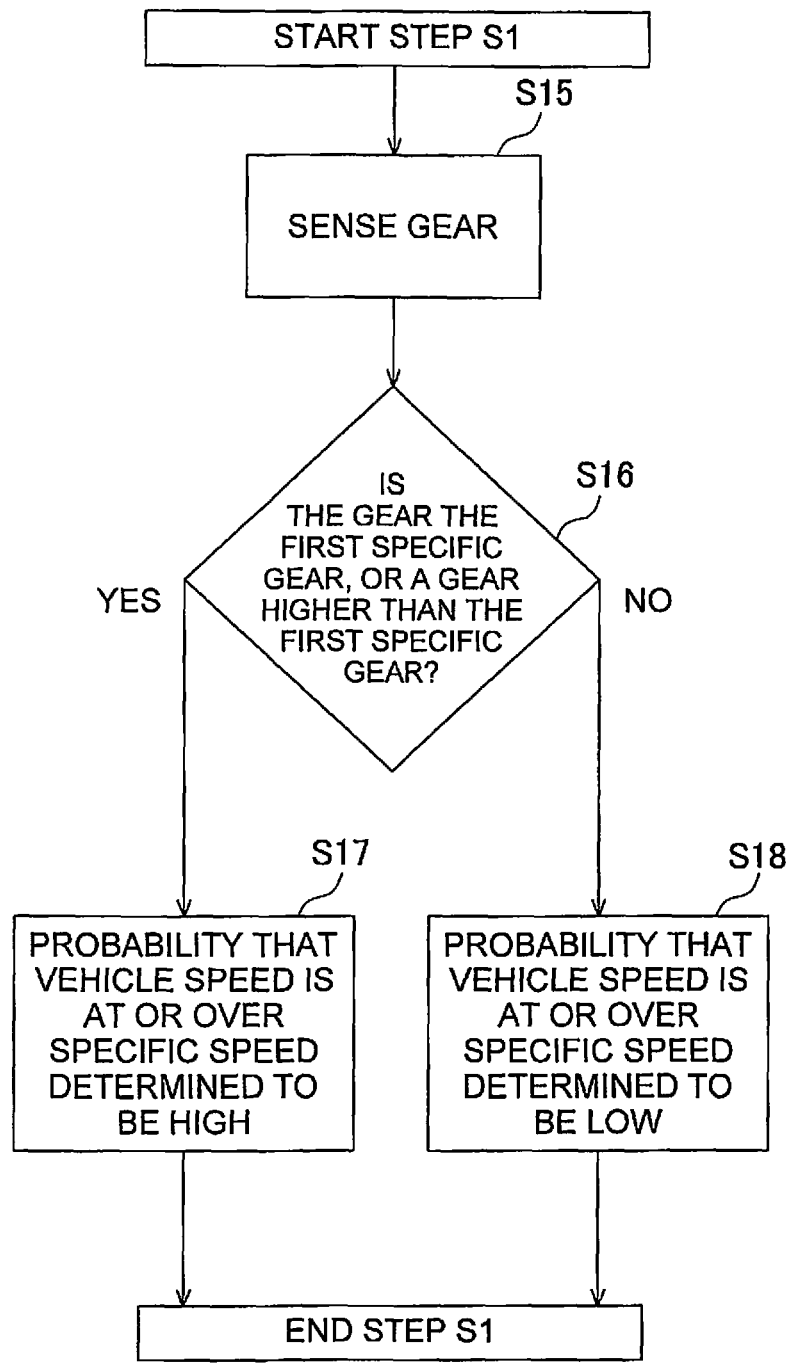
FIG. 11 is a flowchart of a method for determining vehicle speed in the second embodiment.
Figure 12:
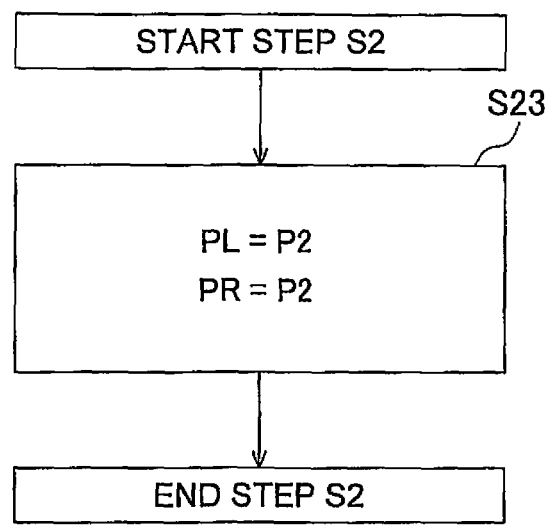
FIG. 12 is an example of a method for changing the clutch pressure in the second embodiment.

The method for controlling the steering clutches 12L and 12R will now be described through reference to a flowchart. FIG. 11 is a flowchart of a method for determining vehicle speed in the second embodiment. FIG. 12 is an example of a method for changing the clutch pressure in the second embodiment.

First, in step 15, the gear sensor 47 senses which gear the bulldozer 1 is in. In step 16, the vehicle speed determination component 31a determines whether or not the gear is the first gear, or is a gear higher than the first gear. If the gear is the first gear, or is a gear higher than the first gear (Yes in step 16), in step 17 the vehicle speed determination component 31a determines the vehicle speed of the bulldozer 1 to be equal to or greater than the specific speed. If the gear is lower than the first gear (No in step 16), in step 18 the vehicle speed determination component 31a determines the vehicle speed of the bulldozer 1 not to be equal to or greater than the specific speed.

When the vehicle speed determination component 31a determines the vehicle speed of the bulldozer 1 to be equal to or greater than the specific speed (Yes in step 1 in FIG. 5), in step 23 in FIG. 12 the pressure controller 32a performs control so that the engagement pressure PL of the left steering clutch 12L will be the above-mentioned second pressure. Similarly, the pressure controller 32a performs control so that the engagement pressure PR of the right steering clutch 12R will be the second pressure.

Features (1) With the bulldozer 1 according to the first and second embodiments, if the vehicle speed is determined to be equal to or greater than the specific speed, the pressure controllers 32 and 32a perform control so that the engagement pressure of the left and right steering clutches 12L and 12R will be reduced from the first pressure. That is, when the rotational speed of the rotary member is high, the hydraulic pressure exerted on the sealing rings 64L, 65L, 64R, and 65R is reduced. Therefore, the PV value of the sealing rings 64L, 65L, 64R, and 65R is controlled so as not to reach the maximum permissible value.

(2) In the first embodiment, the vehicle speed determination component 31 determines the vehicle speed to be equal to or greater than the specific speed when the rotational speeds $\Phi L$ and $\Phi R$ measured by the rotational speed sensors 42L and 42R are more than the specific rotational speed thresholds $\Phi thL$ and $\Phi thR$. When the rotational speeds $\Phi L$ and $\Phi R$ are more than the specific rotational speed thresholds $\Phi thL$ and $\Phi thR$, the slipping velocity of the sealing rings 64L, 65L, 64R, and 65R is high. Therefore, the PV value of the sealing rings 64L, 65L, 64R, and 65R can be effectively controlled so as not to reach the maximum permissible value.

(3) In the first embodiment, the pressure controller 32 performs control so that when the rotational speeds $\Phi L$ and $\Phi R$ measured by the rotational speed sensors 42L and 42R are more than the rotational speed thresholds $\Phi thL$ and $\Phi thR$, the engagement pressures PL and PR of the left and right steering clutches 12L and 12R are reduced so that the product of the rotational speeds $\Phi L$ and $\Phi R$ and the pressures PL and PR of the hydraulic fluid will not exceed the specific upper limits UlimL and UlimR.

More specifically, the pressure controller 32 performs control so that the quotients of dividing the first products UlimL and UlimR, which are the products of the first pressure P1 and the rotational speed thresholds $\Phi thL$ and $\Phi thR$, by the rotational speeds and $\Phi R$ will be the engagement pressures PL and PR. Therefore, the PV value of the sealing rings 64L, 65L, 64R, and 65R can be reliably controlled so as not to reach the maximum permissible value.

(4) In the second embodiment, the vehicle speed determination component 31a determines the vehicle speed to be equal to or greater than the specific speed when the gear is the first specific gear, or is higher than the first specific gear. When the bulldozer 1 travels under automatic gear shifts, the gear is generally shifted in order to obtain the tractive power needed for the load. The shift speed for that gear is set near the intersection of the traction curve. This means that there is a high probability that the vehicle speed will be equal to or greater than the lowest vehicle speed at which the tractive power in the first specific gear is the maximum. That is, it is highly probable that the vehicle speed will be equal to or greater than the specific speed. Therefore, the PV value of the sealing rings 64L, 65L, 64R, and 65R is controlled so as not to reach the maximum permissible value.

(5) In the second embodiment, the pressure controller 32a performs control so that the engagement pressure become the second pressure, which is lower than the first pressure, when the gear is either the first gear or is higher than the first gear. As a result, when the slipping velocity of the sealing rings 64L, 65L, 64R, and 65R is high, the pressure applied to the sealing rings 64L, 65L, 64R, and 65R decreases. Therefore, the PV values of the sealing rings 64L, 65L, 64R, and 65R are effectively controlled so as not to reach the maximum permissible value.

Modification Examples

The present invention is not limited to or by the above embodiments, and various modifications and variations are possible without departing from the scope of the present invention.

(a) In the above embodiments, an example was given in which two sealing rings were mounted per rotary member, but just one sealing ring, or three or more, may be mounted per rotary member.

(b) In the above embodiments, a bulldozer was used as an example of a work vehicle, but the present invention can be similarly applied to other work vehicles in which a hydraulic clutch is provided to a power transmission device.

(c) In the above embodiments, the first left hydraulic fluid supply channel 61L may be formed in the first left rotary member 56L. In this case, the second left hydraulic fluid supply channel 62L is preferably connected to the first left rotary member 56L, and the first left sealing ring 64L and the second left sealing ring 65L are mounted on the surface of the first left rotary member 56L. Also, the first right hydraulic fluid supply channel 61R may be formed in the first right rotary member 56R. In this case, the second right hydraulic fluid supply channel 62R is preferably connected to the first right rotary member 56R, and the first right sealing ring 64R and the second right sealing ring 65R are mounted on the surface of the first right rotary member 56R.

(d) Also, the first left hydraulic fluid supply channel 61L may be such that part of the supply channel is included in the left output shaft 21L or in the lateral shaft 20, and the first right hydraulic fluid supply channel 61R may be such that part of the supply channel is included in the right output shaft 21R or in the lateral shaft 20. In this case, the second left hydraulic fluid supply channel 62L may be connected to the left output shaft 21L or the lateral shaft 20, and the first left sealing ring 64L and the second left sealing ring 65L may be mounted on the surface of the left output shaft 21L or the lateral shaft 20. The second right hydraulic fluid supply channel 62R may be connected to the right output shaft 21R or the lateral shaft 20, and the first right sealing ring 64R and the second right sealing ring 65R may be mounted on the surface of the right output shaft 21R or the lateral shaft 20.

(e) In the second embodiment, a plurality of first gears may be set. These set first gears shall be termed the set gear 1, the set gear 2, . . . , the set gear i, the set gear (i+1), . . . , and the set gear N, starting from the lowest gear. The set gear (i+1) (i=1, . . . , N−1) may be one gear higher than the set gear i, or may be a number of gears higher. Here, MAX (ΦL, ΦR) in Formulas 5 and 6 can be established according to the vehicle speed range from the gear corresponding to the set gear i (i=1, . . . , N−1) to a gear one lower than the gear corresponding to the set gear (i+1) (the vehicle speed range of the gear when a shift is made so that the highest tractive power will be obtained). The values of the pressures PL and PR in Formulas 5 and 6 may then be established as the second pressure.

Also, the second pressure does not necessarily have to be constant, and may be suitably varied according to the elapsed time since the change to the first gear. This is because as time passes since the change to the first gear, there is a high probability that the vehicle speed will have increased over the vehicle speed immediately after the change to the first gear.

(B)

First Embodiment

Figure 13:
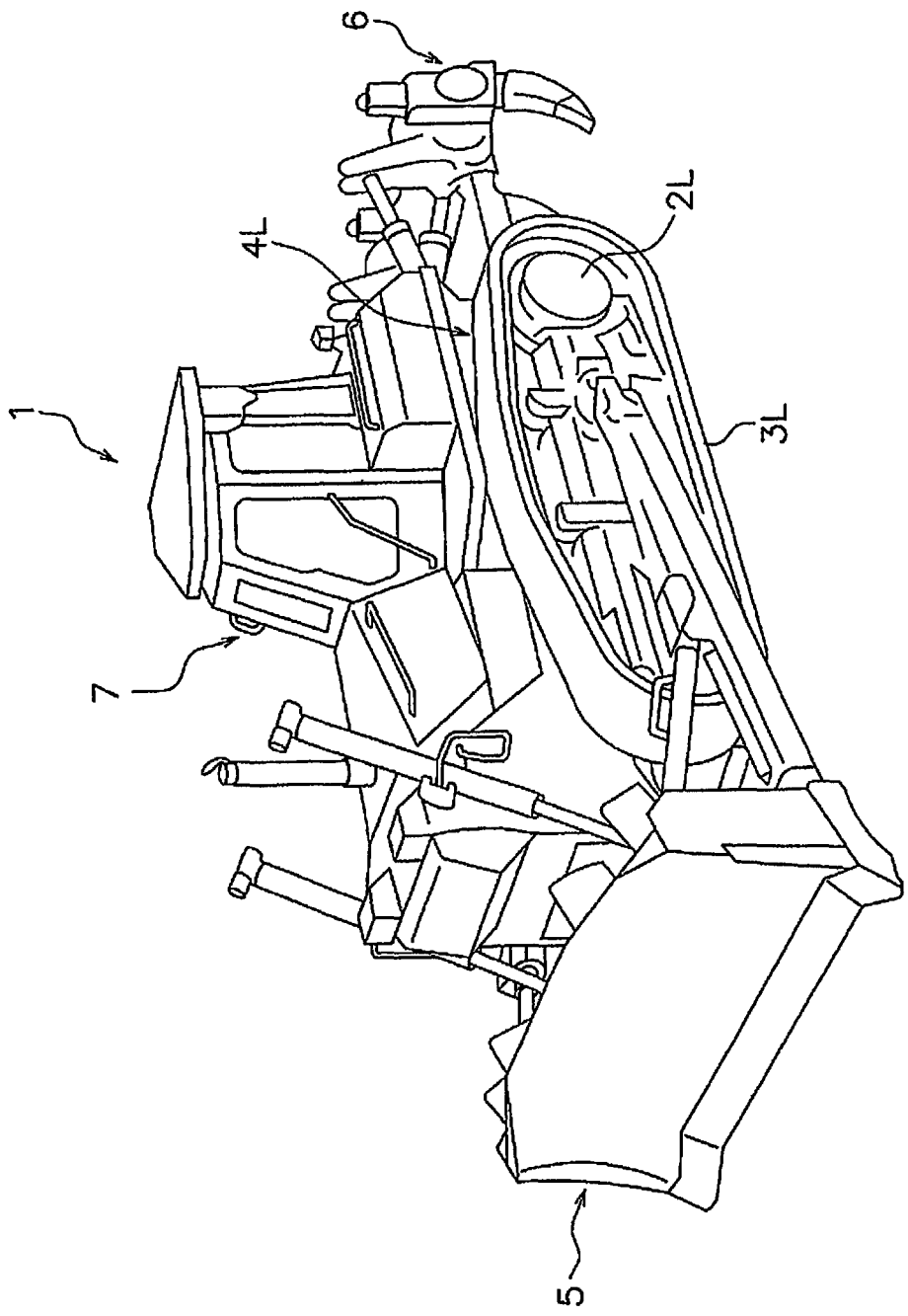
FIG. 13 is an oblique view of a bulldozer in an embodiment.
Figure 14:
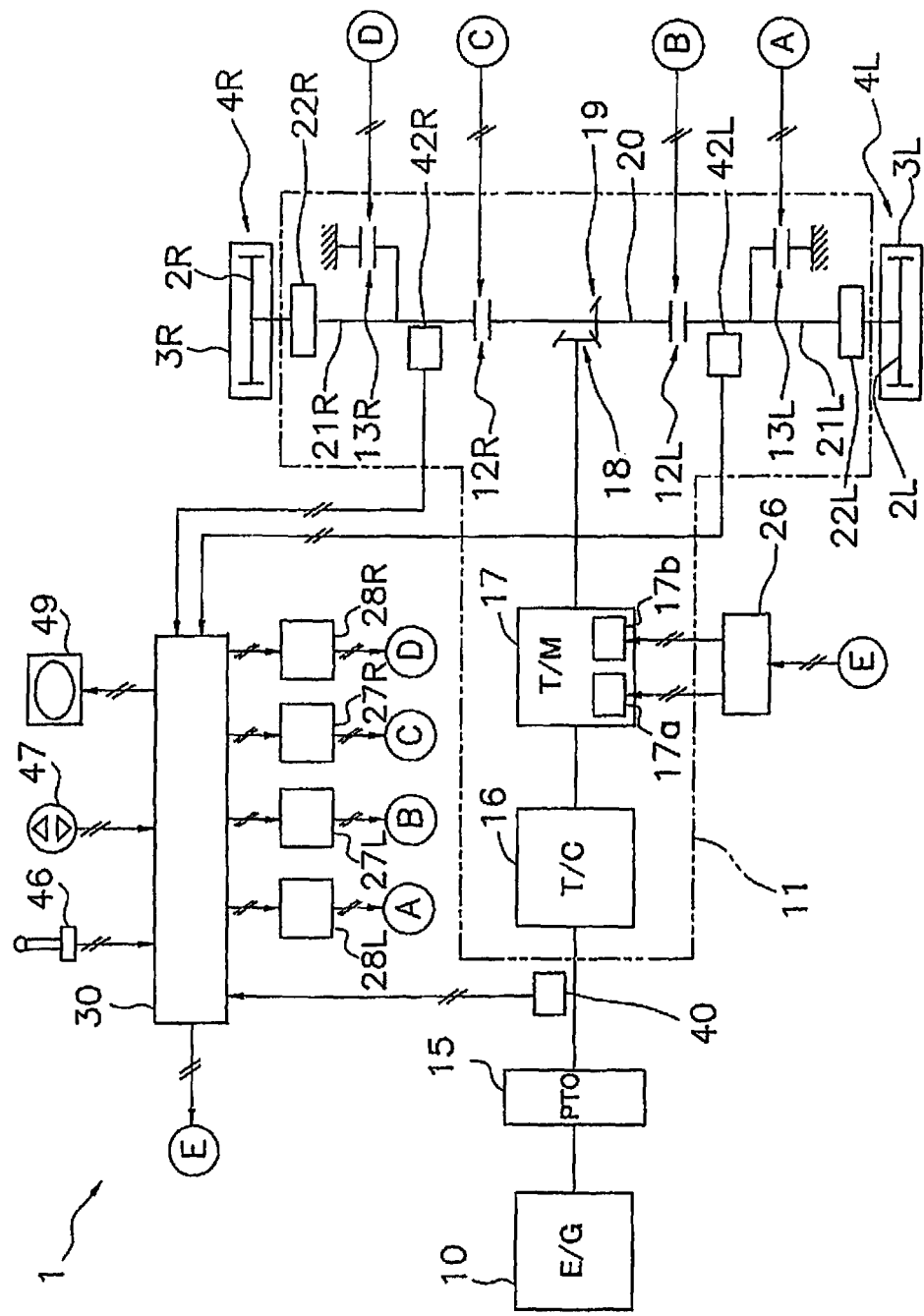
FIG. 14 shows the simplified configuration of the bulldozer shown in FIG. 13.

FIG. 13 shows a bulldozer 1, which is an example of a work vehicle. As shown in FIGS. 13 and 14, the bulldozer 1 includes left and right drive units 4L and 4R respectively having sprockets 2L and 2R and crawler belts 3L and 3R, a blade 5 provided at the front of the vehicle, and a ripper device 6 provided at the rear of the vehicle. This bulldozer 1 can perform work such as dozing with the blade 5, or work such as crushing or excavation with the ripper device 6.

The bulldozer 1 further includes a cab 7 above the left and right drive units 4L and 4R. The cab 7 is equipped with a seat in which the operator sits, various kinds of control lever, a vehicle speed setting switch, pedals, gauges, and so forth. In the following description, the "forward and backward direction" means the forward and backward direction of the bulldozer 1. The forward and backward direction means the forward and backward direction as seen by the operator seated in the cab 7. The left and right direction or "to the side" refers to the vehicle width direction of the bulldozer 1. The left and right direction, the vehicle width direction, and "to the side" all refer to the left and right directions as seen by the above-mentioned operator.

Configuration of Power Transmission System

As shown in FIG. 14, this bulldozer 1 includes an engine 10 and a power transmission device 11 that transmits power from the engine 10 to the left and right drive units 4L and 4R. The power transmission device 11 includes left and right steering clutches 12L and 12R, left and right steering brakes 13L and 13R, a torque converter 16, and a transmission 17.

The power from the engine 10 is transmitted to a power takeoff 15. The power takeoff 15 sends part of the power from the engine 10 to hydraulic pumps or the like that generate power for the blade 5 and the ripper device 6, and sends the rest of the power to the torque converter 16. The torque converter 16 transmits power through a fluid. The output shaft of the torque converter 16 is linked to the input shaft of the transmission 17, and power is transmitted from the torque converter 16 to the transmission 17.

The transmission 17 changes the speed of the rotary motion of the engine. The transmission 17 is provided with a clutch 17a for switching between forward and reverse, and a plurality of shifting clutches 17b. The clutches 17a and 17b are hydraulic clutches that can be hydraulically switched between engaged and disengaged states. The supply and discharge of hydraulic fluid to and from the clutches 17a and 17b are controlled by a transmission control valve 26. The power outputted from the transmission 17 is transmitted through a first bevel gear 18 and a second bevel gear 19 to a lateral shaft 20.

The power transmitted to the lateral shaft 20 goes through the left steering clutch 12L, a left output shaft 21L, and a left final reduction gear 22L and is transmitted to the left sprocket 2L. Also, the power transmitted to the lateral shaft 20 goes through the right steering clutch 12R, a right output shaft 21R, and a right final reduction gear 22R and is transmitted to the right sprocket 2R. The crawler belts 3L and 3R are wound around the sprockets 2L and 2R. Therefore, when the sprockets are rotationally driven, the crawler belts 3L and 3R are driven, and this propels the bulldozer 1. The bulldozer 1 further includes left and right rotational speed sensors 42L and 42R that sense the rotational speed of the left and right output shafts 21L and 21R, for the purpose of sensing the vehicle speed of the bulldozer 1, etc. In the following description, for the sake of convenience, the sprockets 2L and 2R may also be called drive wheels.

The left and right steering clutches 12L and 12R are disposed between the transmission 17 and the sprockets 2L and 2R, respectively, and are hydraulic clutches that can be hydraulically switched between engaged and disengaged states. The supply and discharge of hydraulic fluid to and from the steering clutches 12L and 12R are controlled by steering clutch pressure control valves 27L and 27R.

Here, if the left steering clutch 12L is in its engaged state, power from the second bevel gear 19 is transmitted to the left sprocket 2L. If the left steering clutch 12L is in its disengaged state, power from the second bevel gear 19 is cut off by the left steering clutch 12L and is not transmitted to the left sprocket 2L. If the right steering clutch 12R is in its engaged state, power from the second bevel gear 19 is transmitted to the right sprocket 2R. If the right steering clutch 12R is in its disengaged state, power from the second bevel gear 19 is cut off by the right steering clutch 12R and is not transmitted to the right sprocket 2R.

The left and right steering brakes 13L and 13R are disposed between the left and right steering clutches 12L and 12R and the sprockets 2L and 2R, respectively, and are hydraulic brakes that can be hydraulically switched between a braking state and a non-braking state. The supply and discharge of hydraulic fluid to and from the left and right steering brakes 13L and 13R are controlled by brake pressure control valves 28L and 28R.

The output rotation of the left steering clutch 12L, that is, the rotation of the left sprocket 2L, can be braked by putting the left steering brake 13L in a braking state. The output rotation of the right steering clutch 12R, that is, the rotation of the right sprocket 2R, can be braked by putting the right steering brake 13R in a braking state.

With the above configuration, in a state in which the left steering clutch 12L is disengaged and the left steering brake 13L is braking, if the right steering clutch 12R is engaged and the right sprocket 2R is rotationally driven, the bulldozer 1 will turn to the left. Conversely, in a state in which the right steering clutch 12R is disengaged and the right steering brake 13R is braking, if the left steering clutch 12L is engaged and the left sprocket 2L is rotationally driven, the bulldozer 1 will turn to the right.

Configuration Around Steering Clutches

Figure 15:
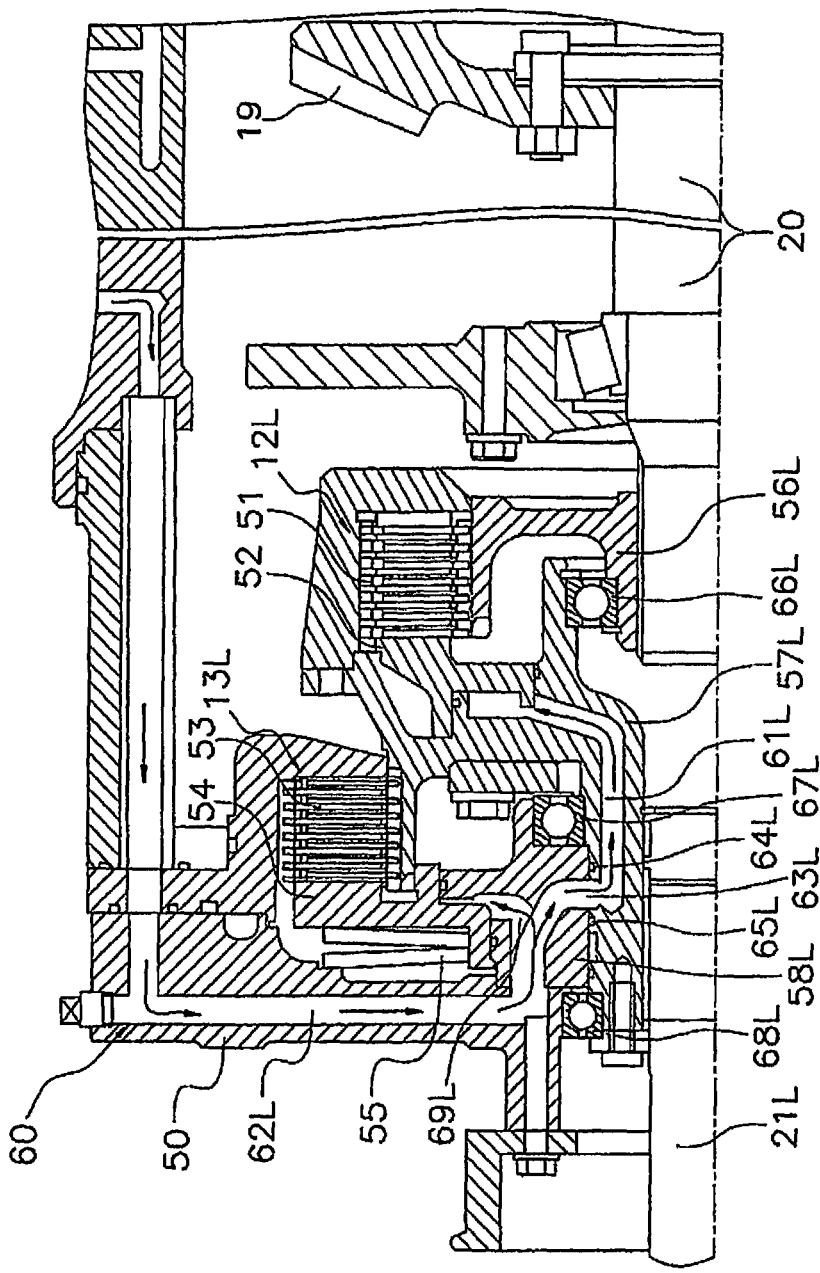
FIG. 15 is a detail view of the area around the left steering brake and the left steering clutch.

Referring to FIG. 15, a first left rotary member 56L is linked to one side of the left steering clutch 12L, and a second left rotary member 57L is linked to the other side. That is, the power transmission device 11 includes the first left rotary member 56L and the second left rotary member 57L.

The first left rotary member 56L is engaged by spline mating with the lateral shaft 20. The first left rotary member 56L rotates integrally with the second bevel gear 19 and the lateral shaft 20. The second left rotary member 57L is engaged by spline mating with the left output shaft 21L linked to the left final reduction gear 22L. Therefore, the left drive unit 4L is driven by the second left rotary member 57L. The second left rotary member 57L is rotatably supported by a first left bearing 66L disposed on the first left rotary member 56L. The power transmission device 11 includes the first left bearing 66L.

A first left support member 58L is linked to one side of the left steering brake 13L, and the second left rotary member 57L is linked to the other side. The first left support member 58L is fixed to a housing 50 of the power transmission device 11. The first left support member 58L and the housing 50 are collectively referred to here as a support member. The power transmission device 11 includes the support member.

A second left bearing 67L and a third left bearing 68L are attached on the support member. The power transmission device 11 includes the second left bearing 67L and the third left bearing 68L. The second left bearing 67L and the third left bearing 68L rotatably support the second left rotary member 57L and the left output shaft 21L. Consequently, the support member rotatably supports the second left rotary member 57L and the left output shaft 21L. The second left rotary member 57L and the left output shaft 21L rotate integrally.

The bulldozer 1 includes a hydraulic fluid supply channel 60 that supplies hydraulic fluid to the power transmission device 11, and more specifically to the left and right steering clutch 12L and 12R and the left and right steering brakes 13L and 13R inside the support member and the second left rotary member 57L. The hydraulic fluid supply channel 60 includes a first left hydraulic fluid supply channel 61L, a second left hydraulic fluid supply channel 62L, and a left connected part 63L. The first left hydraulic fluid supply channel 61L is formed inside the second left rotary member 57L, and connects to the left steering clutch 12L. The second left rotary member 57L includes the first left hydraulic fluid supply channel 61L. The first left hydraulic fluid supply channel 61L supplies hydraulic fluid to the left steering clutch 12L.

The second left hydraulic fluid supply channel 62L is formed inside the support member, that is, on the outside of the second left rotary member 57L. The second left hydraulic fluid supply channel 62L supplies hydraulic fluid to the first left hydraulic fluid supply channel 61L. The left connected part 63L connects the first left hydraulic fluid supply channel 61L to the second left hydraulic fluid supply channel 62L. Also, the hydraulic fluid supply channel 60 separately includes a braking left supply channel 69L that connects to the left steering brake 13L. In FIG. 15, the braking left supply channel 69L is disposed overlapping the first left hydraulic fluid supply channel 61L, and the braking left supply channel 69L is located on the back side of the first left hydraulic fluid supply channel 61L.

The left connected part 63L is disposed in a gap between the support member and the second left rotary member 57L. The power transmission device 11 includes a first left sealing ring 64L and a second left sealing ring 65L. The first left sealing ring 64L and the second left sealing ring 65L are mounted adjacent to the left connected part 63L so that hydraulic fluid will not leak out from the left connected part 63L. More specifically, the first left sealing ring 64L is mounted on the surface of the second left rotary member 57L on the side closer to the second bevel gear 19 than the left connected part 63L (on the inside of the vehicle). The second left sealing ring 65L is mounted on the surface of the second left rotary member 57L on the side closer to the left final reduction gear 22L than the left connected part 63L (on the outside of the vehicle).

The gap between the support member and the second left rotary member 57L is sealed by the first left sealing ring 64L and the second left sealing ring 65L. Therefore, the left connected part 63L is formed by the gap between the support member and the second left rotary member 57L, which is sealed by the first left sealing ring 64L and the second left sealing ring 65L. In the example in FIG. 15, the shaft diameters of the first left sealing ring 64L and the second left sealing ring 65L are equal, but this is not necessarily the case.

FIG. 15 shows only the first left rotary member 56L, the second left rotary member 57L, the first left support member 58L, the first left hydraulic fluid supply channel 61L, the second left hydraulic fluid supply channel 62L, the left connected part 63L, the braking left supply channel 69L, the first left sealing ring 64L, the second left sealing ring 65L, the first left bearing 66L, the second left bearing 67L, and the third left bearing 68L.

However, the hydraulic fluid supply channel 60 also includes a first right hydraulic fluid supply channel 61R, a second right hydraulic fluid supply channel 62R, a right connected part 63R, and a braking right supply channel 69R, which are connected to the right steering clutch 12R or the right steering brake 13R. The first right hydraulic fluid supply channel 61R, the second right hydraulic fluid supply channel 62R, the right connected part 63R, and the braking right supply channel 69R respectively have the same structure as the first left hydraulic fluid supply channel 61L, the second left hydraulic fluid supply channel 62L, the left connected part 63L, and the braking left supply channel 69L.

Also, the power transmission device 11 includes a first right rotary member 56R, a second right rotary member 57R, and a first right support member 58R, which are connected to the left steering clutch 12R or the right steering brake 13R. The first right rotary member 56R, the second right rotary member 57R, and the first right support member 58R have the same structure as the first left rotary member 56L, the second left rotary member 57L, and the first left support member 58L.

The power transmission device 11 includes a first right sealing ring 64R, a second right sealing ring 65R, a first right bearing 66R, a second right bearing 67R, and a third right bearing 68R, which are connected to the first right rotary member 56R, the second right rotary member 57R, or the first right support member 58R. The first right sealing ring 64R, the second right sealing ring 65R, the first right bearing 66R, the second right bearing 67R, and the third right bearing 68R respectively have the same structure as the first left sealing ring 64L, the second left sealing ring 65L, the first left bearing 66L, the second left bearing 67L, and the third left bearing 68L.

The left steering clutch 12L is a wet multi-plate type, and includes clutch disks 51 and a clutch piston 52. With the left steering clutch 12L, when the hydraulic pressure of the hydraulic fluid from the first left hydraulic fluid supply channel 61L is applied to the clutch piston 52, the clutch disks 51 are joined by hydraulic pressure and power is transmitted. Therefore, the left steering clutch 12L is engaged when hydraulic fluid supplied from the hydraulic fluid supply channel 60 to the left steering clutch 12L.

Saying that the left steering clutch 12L is engaged means that a pressure equal to or greater than a specific holding pressure, which is the pressure at which torque within the designed range can be transmitted without clutch slippage, is being supplied to the left steering clutch 12L. Normally, when the left steering clutch 12L is engaged, the pressure of the hydraulic fluid applied to the left steering clutch 12L is a first pressure that is equal to or greater than the holding pressure. The pressure exerted on the left steering clutch 12L (clutch pressure) increases in proportion to the hydraulic pressure supplied to the left steering clutch 12L. In FIG. 15, only the left steering clutch 12L is shown, but the right steering clutch 12R has the same structure.

The left steering brake 13L is a wet multi-plate type, and includes brake disks 53, a brake piston 54, and a plate spring 55. The left steering brake 13L is a so-called negative brake, with which the brake disks 53 are pressed and a braking state is produced by the biasing force of the plate spring 55 in a state in which the hydraulic pressure of the hydraulic fluid from the braking left supply channel 69L is not being applied to the brake piston 54.

When the hydraulic pressure of the hydraulic fluid from the braking left supply channel 69L is applied to the brake piston 54, the brake piston 54 causes the brake disks 53 to move apart against the biasing force of the plate spring. This puts the left steering brake 13L in a released state. In FIG. 15, only the left steering brake 13L is shown, but the right steering brake 13R has the same structure.

Here, when braking is produced by the left steering brake 13L, the left steering clutch 12L is released. At this point the second left rotary member 57L is stationary along with the support member. Therefore, the rotational speed of the first left sealing ring 64L and the second left sealing ring 65L is zero, and there is little hydraulic pressure applied to the first left sealing ring 64L and the second left sealing ring 65L. The PV value is the product of the surface pressure P applied to the rotary member and the slipping velocity V. The same can be the of the right steering brake 13R.

Meanwhile, when the left steering brake 13L is released and the left steering clutch 12L is engaged, the second left rotary member 57L rotates along with the first left rotary member 56L under the power from the transmission 17. The support member, however, is stationary. Therefore, the slipping velocities V of the first left sealing ring 64L and the second left sealing ring 65L respectively correspond to the product of multiplying the shaft diameters of the first left sealing ring 64L and the second left sealing ring 65L by the circumference ratio and the rotational speed of the second left rotary member 57L.

When no slip is occurring at the left steering clutch 12L, the rotational speed of the second left rotary member 57L is equal to the rotational speed of the first left rotary member 56L. Furthermore, since the left steering clutch 12L is engaged, the surface pressure P applied to the first left sealing ring 64L and the second left sealing ring 65L is normally the above-mentioned first pressure. When the rotational speed of the second left rotary member 57L rises, or when the clutch pressure of the left steering clutch 12L increases, there is an increase in the PV values of the first left sealing ring 64L and the second left sealing ring 65L. The same can be the of the right steering clutch 12R.

Configuration for Output Control

This bulldozer 1 has a controller 30 (see FIG. 14). The controller 30 includes a CPU or other such computation device, and a RAM, ROM, or other such memory device. The controller 30 is connected to a steering lever 46 and an upshift/downshift button 47, which are housed in the cab 7.

The steering lever 46 is used to switch the bulldozer 1 between forward and reverse movement and to switch its turning direction. The upshift/downshift button 47 is used by the operator to shift the gear of the transmission 17. The controller 30 receives a signal from the steering lever 46 or the upshift/downshift button 47 and shifts the gear of the transmission 17 and controls the pressure control valves 27L, 27R, 28L, and 28R.

The controller 30 decides the pressure of the hydraulic fluid in the hydraulic fluid supply channel 60. More specifically, the controller 30 decides the pressure PL of the hydraulic fluid inside first left hydraulic fluid supply channel 61L, the second left hydraulic fluid supply channel 62L, and the left connected part 63L. The controller 30 outputs a command corresponding to the decided pressure PL to the left steering clutch pressure control valve 27L. Thus, the controller 30 performs control so that the pressure of the hydraulic fluid inside the first left hydraulic fluid supply channel 61L, the second left hydraulic fluid supply channel 62L, and the left connected part 63L will be the decided pressure PL.

Similarly, the controller 30 decides the pressure PL of the hydraulic fluid inside first right hydraulic fluid supply channel 61R, the second right hydraulic fluid supply channel 62R, and the right connected part 63R. The controller 30 then outputs a command corresponding to the decided pressure PR to the right steering clutch pressure control valve 27R of the right steering clutch 12R. The steering clutch pressure control valves 27L and 27R receive the command from the controller 30 and control the pressure of the hydraulic fluid in the hydraulic fluid supply channel 60. Thus, the controller 30 performs control so that pressure of the hydraulic fluid inside the first right hydraulic fluid supply channel 61R, the second right hydraulic fluid supply channel 62R, and the right connected part 63R will be the decided pressure PR.

The controller 30 further connects the left rotational speed sensor 42L that senses the rotational speed of the left output shaft 21L, the right rotational speed sensor 42R that senses the rotational speed of the right output shaft 21R, and a monitor 49 that displays the speed of the bulldozer 1 and the state of various devices installed in the bulldozer 1. The power transmission device 11 includes the left rotational speed sensor 42L and the right rotational speed sensor 42R. In this embodiment, the controller 30 outputs information to notify the worker about replacing the sealing rings 64L, 65L, 64R, and 65R on the basis of the rotational speed of the left output shaft 21L and the rotational speed of the right output shaft 21R.

Figure 16:
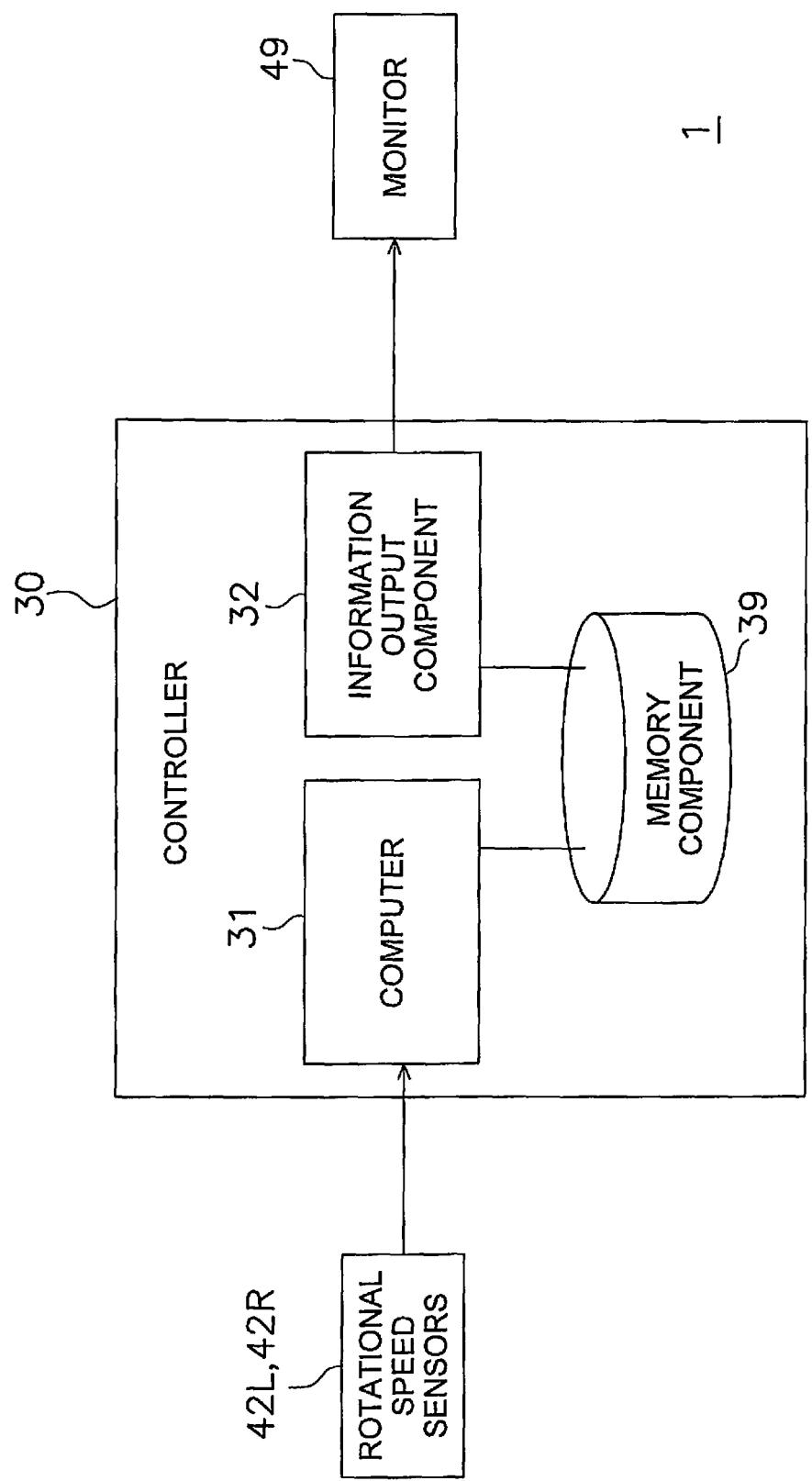
FIG. 16 is a block diagram of the controller according to the first embodiment.

FIG. 16 is a block diagram of the detailed configuration of the controller 30 according to the first embodiment. The controller 30 includes a computer 31, an information output component 32, and a memory component 39. Typically, programs and data for executing the various functions of the computer 31 and the information output component 32 are stored in the memory device. When the computation device executes the program, the controller 30 executes the various functions of the computer 31 and the information output component 32. The memory component 39 is realized by a part of the above described memory device. The controller 30 may also be realized by an integrated circuit.

The rotational speeds of the left and right rotational speed sensors 42L and 42R are inputted to the computer 31. The rotational speed $\phi L$ measured by the left rotational speed sensor 42L corresponds to the rotational speed of the first left sealing ring 64L and the second left sealing ring 65L. The rotational speed $\phi R$ measured by the right rotational speed sensor 42R corresponds to the rotational speed of the first right sealing ring 64R and the second right sealing ring 65R. The computer 31 further acquires the values for the pressures PL and PR decided by the controller 30. The pressure PL corresponds to the hydraulic pressure exerted on the sealing rings 64L and 65L. The pressure PR corresponds to the hydraulic pressure exerted on the sealing rings 64R and 65R.

The computer 31 finds determination basis data related to the hydraulic pressures PL and PR exerted on the sealing rings, the times when the pressure was controlled to the hydraulic pressures PL and PR, the rotational speeds $\phi L$ and $\phi R$ of the sealing rings 64L, 65L, 64R, and 65R, and the times when the pressure was controlled to the hydraulic pressures PL and PR while the sealing rings 64L, 65L, 64R, and 65R were rotating. This determination basis data is either data that includes the hydraulic pressures PL and PR, the rotational speeds $\phi L$ and $\phi R$, and the times when the pressure was controlled to the hydraulic pressures PL and PR while the sealing rings 64L, 65L, 64R, and 65R were rotating, or data that includes values derived from the above values.

The determination basis data may, for example, be a list that includes the hydraulic pressures PL and PR at various times, and the rotational speeds $\phi L$ and $\phi R$ of the sealing rings 64L, 65L, 64R, and 65R at these various times. The determination basis data may also, for example, be a list that includes the products of multiplying the hydraulic pressures PL and PR by the rotational speeds $\phi L$ and $\phi R$ of the sealing rings 64L, 65L, 64R, and 65R at various times. The determination basis data may also, for example, be a first integration value obtained by the time integration of the products of multiplying the hydraulic pressures PL and PR by the rotational speeds $\phi L$ and $\phi R$ at the same times as the hydraulic pressures PL and PR.

The computer 31 stores the determination basis data in the memory component 39. If the times when the pressure is controlled to the hydraulic pressures PL and PR and the times when the rotational speeds $\phi L$ and $\phi R$ are sensed are not synchronized, the computer 31 may separately find the hydraulic pressures PL and PR or the rotational speeds $\phi L$ and $\phi R$ that have been time synchronized by a linear interpolation or another such method. If a first integration value is found as determination basis data, the computer 31 may calculate the first integration value by adding a value stored in the memory component 39 to the product of multiplying the elapsed time since the time of the previous measurement by the product of the hydraulic pressure applied to each sealing ring and the rotational speed of each sealing ring.

The predicated amount of wear W of the sealing rings 64L, 65L, 64R, and 65R is calculated from the following formula (1).

$$W = k \cdot P \cdot V \cdot T \quad (1)$$

k: coefficient of friction (established according to the material, etc., of the sealing rings 64L, 65L, 64R, and 65R)
P: surface pressure, that is, the hydraulic pressure applied to the sealing rings 64L, 65L, 64R, and 65R
V: slipping velocity of the sealing rings 64L, 65L, 64R, and 65R
T: time Therefore, when the coefficient of friction, circumference ratio, and shaft diameter of the sealing rings 64L, 65L, 64R, and 65R are multiplied by the first integration value, the result is the predicated amount of wear of the sealing rings 64L, 65L, 64R, and 65R. The computer 31 may calculate the predicated amount of wear W as determination basis data.

The information output component 32 refers to the memory component 39 to find the predicated amount of wear from the first integration value or the determination basis data as needed, and if the predicated amount of wear exceeds a specific threshold, maintenance information about the sealing rings 64L, 65L, 64R, and 65R is outputted to the monitor 49. This maintenance information is information used for recommending that the sealing rings 64L, 65L, 64R, and 65R be replaced, or that the above-mentioned pressures PL and PR be checked to make sure they are normal or not. This threshold is preset on the basis of the usable amount of wear for the sealing rings 64L, 65L, 64R, and 65R and is stored in the memory component 39. The output method of the monitor 49 is not just displaying this information on a screen, and may also be audio output from a speaker attached to the monitor 49, or both screen output and audio output may be used.

Figure 17:
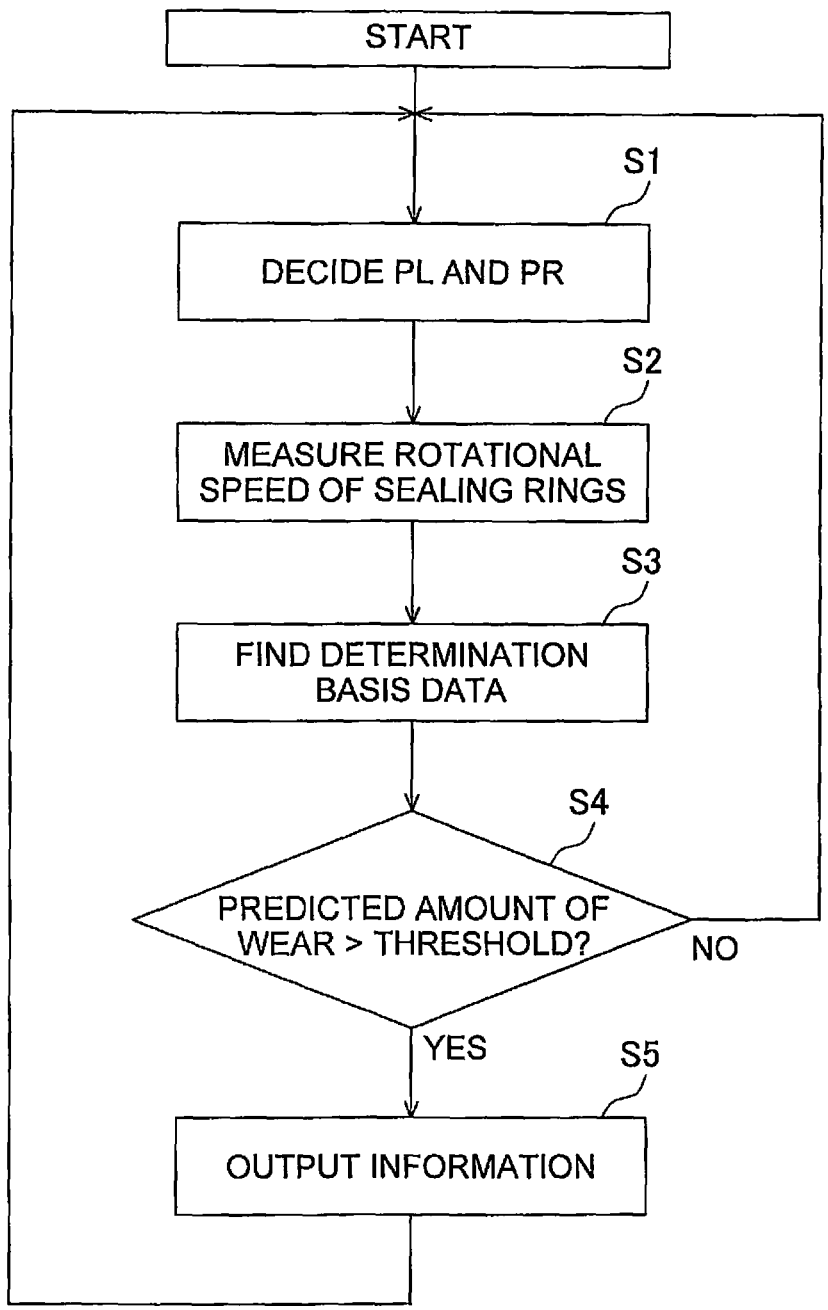
FIG. 17 is a flowchart of a method for monitoring the bulldozer in the first embodiment.

Next, a method for monitoring the bulldozer 1 will be described through reference to a flowchart. FIG. 17 is a flowchart of a method for monitoring the bulldozer in the first embodiment. First, in step 1, the controller 30 decides the pressure of the hydraulic fluid in the hydraulic fluid supply channel 60. More specifically, the controller 30 decides the pressure PL of the hydraulic fluid in a first left hydraulic fluid supply channel 61L. Similarly, the controller 30 decides the pressure PR of the hydraulic fluid in a first right hydraulic fluid supply channel 61R. The controller 30 outputs a command corresponding to the decided pressures PL and PR to the steering clutch pressure control valves 27L and 27R, and controls the pressure of the hydraulic fluid in the hydraulic fluid supply channel 60 so that it will be the decided pressures PL and PR.

In step 2, the left and right rotational speed sensors 42L and 42R measure the rotational speeds $\phi L$ and $\phi R$ of the sealing rings 64L, 65L, 64R, and 65R. The computer 31 acquires the measured rotational speeds $\phi L$ and $\phi R$ and the times at which these rotational speeds $\phi L$ and $\phi R$ were measured. In step 3, the computer 31 acquires the pressures PL and PR decided by the controller 30, and the times controlled by these pressures PL and PR. The computer 31 then finds the above-mentioned determination basis data.

In step 4, the information output component 32 determines whether or not the predicated amount of wear of the sealing rings obtained from the determination basis data exceeds a specific threshold. If the predicated amount of wear does not exceed the specific threshold (No in step 4), the flow returns to step 1. If the predicated amount of wear does exceed the specific threshold (Yes in step 4), in step 5 the information output component 32 outputs maintenance information about the sealing rings 64L, 65L, 64R, and 65R to the monitor 49. Upon completion of step 5, the flow returns to step 1.

Second Embodiment

In the first embodiment, the bulldozer 1 outputs maintenance information about the sealing rings 64L, 65L, 64R, and 65R to the monitor 49. However, maintenance information about the sealing rings 64L, 65L, 64R, and 65R may instead be outputted to an external monitoring device. In the second embodiment, a monitoring system that includes a monitoring device such as this will be described.

Figure 18:
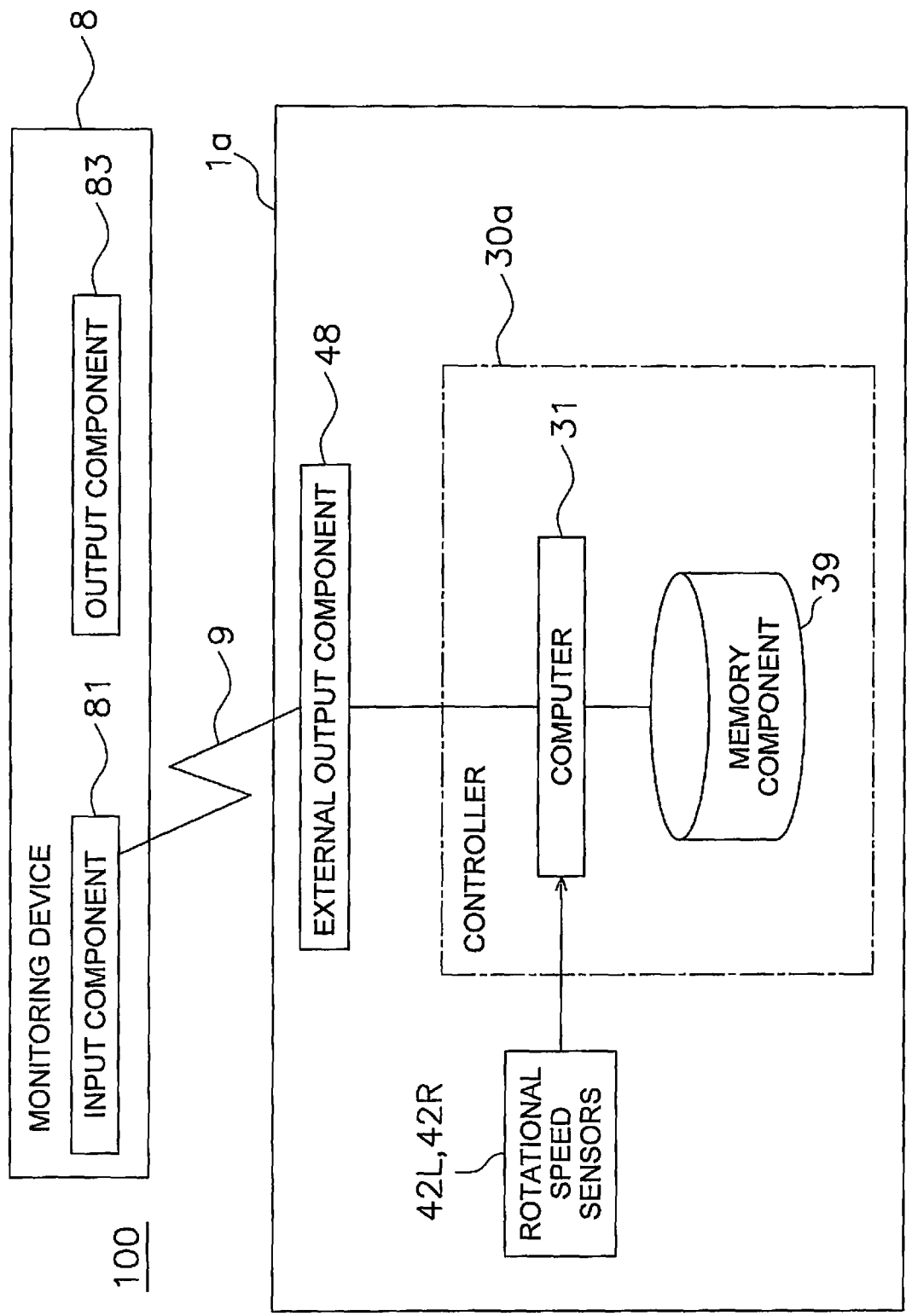
FIG. 18 is a diagram of the overall configuration of the monitoring system according to the second embodiment.

FIG. 18 shows the overall configuration of a monitoring system 100 according to the second embodiment. The monitoring system 100 includes a bulldozer 1a and a monitoring device 8. The bulldozer 1a is able to output information to the external monitoring device 8. The monitoring device 8 is provided on the outside of the bulldozer 1a and is able to input information from the bulldozer 1a. With the bulldozer 1a, the components other than the controller 30a and an external output component 48 (discussed below) are all the same as in the first embodiment, and will not be described again.

The bulldozer 1a according to the second embodiment includes the controller 30a instead of the controller 30, and further includes the external output component 48. The controller 30a differs from the controller 30 in that it does not include the information output component 32, but the rest of the configuration of the controller 30a is the same as that of the controller 30.

The external output component 48 outputs the determination basis data calculated by the computer 31 in a format that can be inputted by the monitoring device 8. The external output component 48 is, for example, a communication interface of a communication means 9 used for communicating with the monitoring device 8. The communication means 9 may involve wired communication, or wireless communication such as satellite communication or communication by a portable telephone network.

The external output component 48 may be such that, of the determination basis data, the data related to the hydraulic pressures PL and PR applied to the sealing rings is outputted separately from the data related to the rotational speeds φL and φR. Data related to the hydraulic pressures PL and PR applied to the sealing rings includes the hydraulic pressures PL and PR themselves and the times when the pressure was controlled to the hydraulic pressures PL and PR. Data related to the rotational speeds φL and φR includes the rotational speeds φL and φR themselves and the times when the rotational speeds φL and φR were sensed.

If there is no need for the times when the pressure was controlled to the hydraulic pressures PL and PR to be inputted to the monitoring device 8 because the times have been preset, or for some other such reason, then data related to the hydraulic pressures PL and PR applied to the sealing rings and outputted to the external output component 48 may not include the times when the pressure was controlled to the hydraulic pressures PL and PR. The same applies to data related to the rotational speeds φL and φR.

The monitoring device 8 is a computer or a dedicated terminal for remote monitoring. The monitoring device 8 includes a monitor for displaying information, a speaker for outputting information as sound, or the like. The monitoring device 8 notifies the operator of the state of the bulldozer 1a. The monitoring device 8 also includes an input component 81 and an output component 83. The input component 81 accepts the determination basis data outputted by the external output component 48. The input component 81 is, for example, a communication interface of the communication means 9.

If the determination basis data is neither the above-mentioned first integration value nor the predicated amount of wear, the output component 83 may calculate a first integration value from the determination basis data, and calculate the predicated amount of wear from Formula 1. In the determination basis data, if the times when the pressure was controlled to the hydraulic pressures PL and PR and the times when the rotational speeds φL and φR were sensed are not synchronized, then the output component 83 may use linear interpolation or another such method to separately find hydraulic pressures PL and PR or rotational speeds φL and φR that have been time synchronized. If the determination basis data is the above-mentioned first integration value, the output component 83 may calculate the predicated amount of wear on the basis of Formula 1 from the first integration value. If the predicated amount of wear exceeds a specific threshold, the output component 83 outputs the above-mentioned maintenance information about the sealing rings 64L, 65L, 64R, and 65R to the monitor, speakers, etc., of the monitoring device 8.

Figure 19:
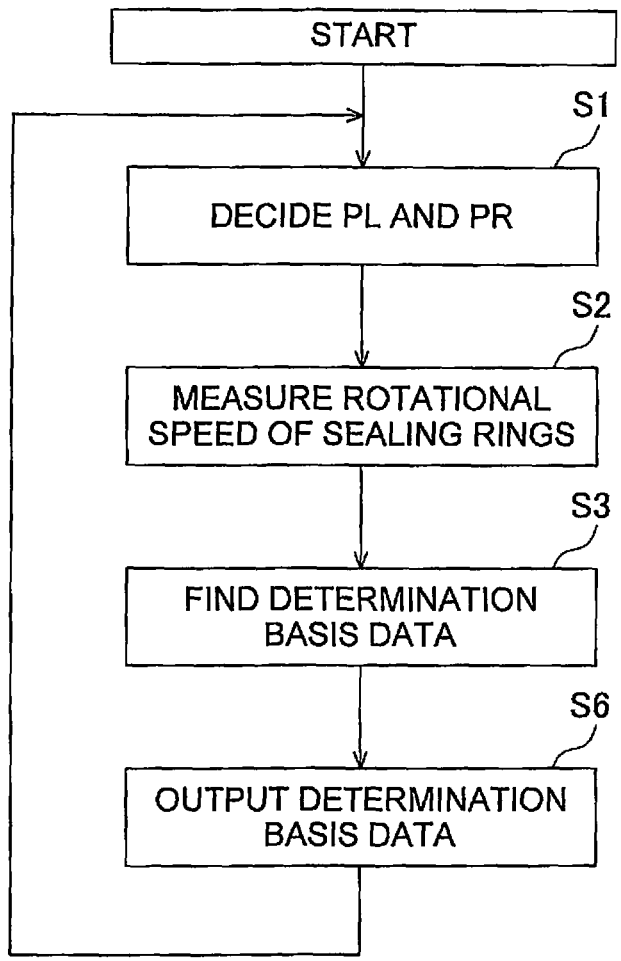
FIG. 19 is a flowchart of the bulldozer operation in the monitoring method used in the monitoring system according to the second embodiment.
Figure 20:
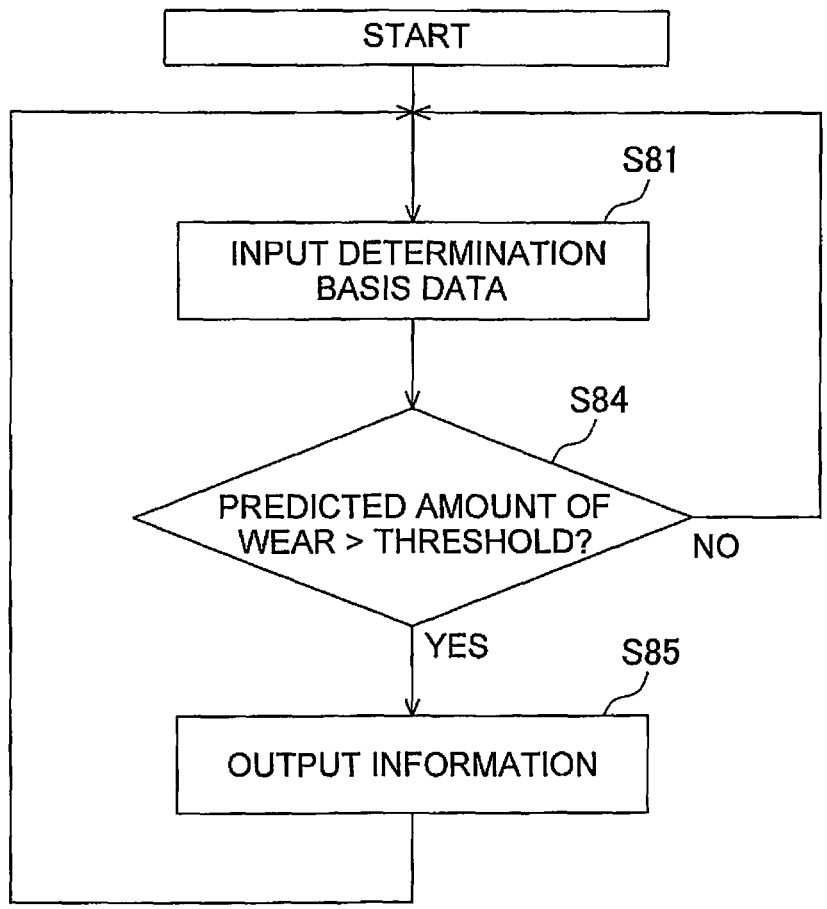
FIG. 20 is a flowchart of the monitoring device operation in the monitoring method used in the monitoring system according to the second embodiment.

Next, a method for monitoring the bulldozer 1a will be described through reference to a flowchart. FIG. 19 is a flowchart of the operation of the bulldozer 1a, out of the monitoring method with the monitoring system 100 according to the second embodiment. FIG. 20 is a flowchart of the operation of the monitoring device 8a, out of the monitoring method with the monitoring system 100 according to the second embodiment. Those steps that are the same as in the first embodiment will be numbered the same as in FIG. 17, and will not be described again. In step 6 in FIG. 19, the external output component 48 of the bulldozer 1a outputs the determination basis data found by the computer 31 in a format that can be inputted by the monitoring device 8. When step 6 is finished, the flow returns to step 1.

In step 81 in FIG. 20, the input component 81 of the monitoring device 8 accepts the determination basis data outputted by the external output component 48. In step 84, the output component 83 of the monitoring device 8 finds the predicated amount of wear of the sealing rings from the determination basis data as needed, and determines whether or not the predicated amount of wear exceeds a specific threshold.

If the predicated amount of wear does not exceed the specific threshold (No in step 84), the flow returns to step 81. If the predicated amount of wear does exceed the specific threshold (Yes in step 84), in step 85 the output component 83 of the monitoring device 8 outputs maintenance information about the sealing rings 64L, 65L, 64R, and 65R to the monitor of the monitoring device 8, a speaker, etc. When step 85 is finished, the flow returns to step 81.

Third Embodiment

In the first and second embodiments, an example was given in which the predicated amount of wear W of the sealing rings 64L, 65L, 64R, and 65R was proportional to the slipping velocity V and the surface pressure P, but an abnormal amount of friction will be produced if the PV value (the product of P and V) exceeds the maximum permissible value set by the manufacturer of the sealing rings 64L, 65L, 64R, and 65R. This abnormal amount of friction is a value that greatly exceeds the value found from Formula 1. If this abnormal friction state continues for an extended period, the replacement date for the sealing rings 64L, 65L, 64R, and 65R found from the predicated amount of wear W will deviate greatly from the ideal replacement date. In view of this, in the third embodiment we will describe a bulldozer that prevents this abnormal friction.

Figure 21:
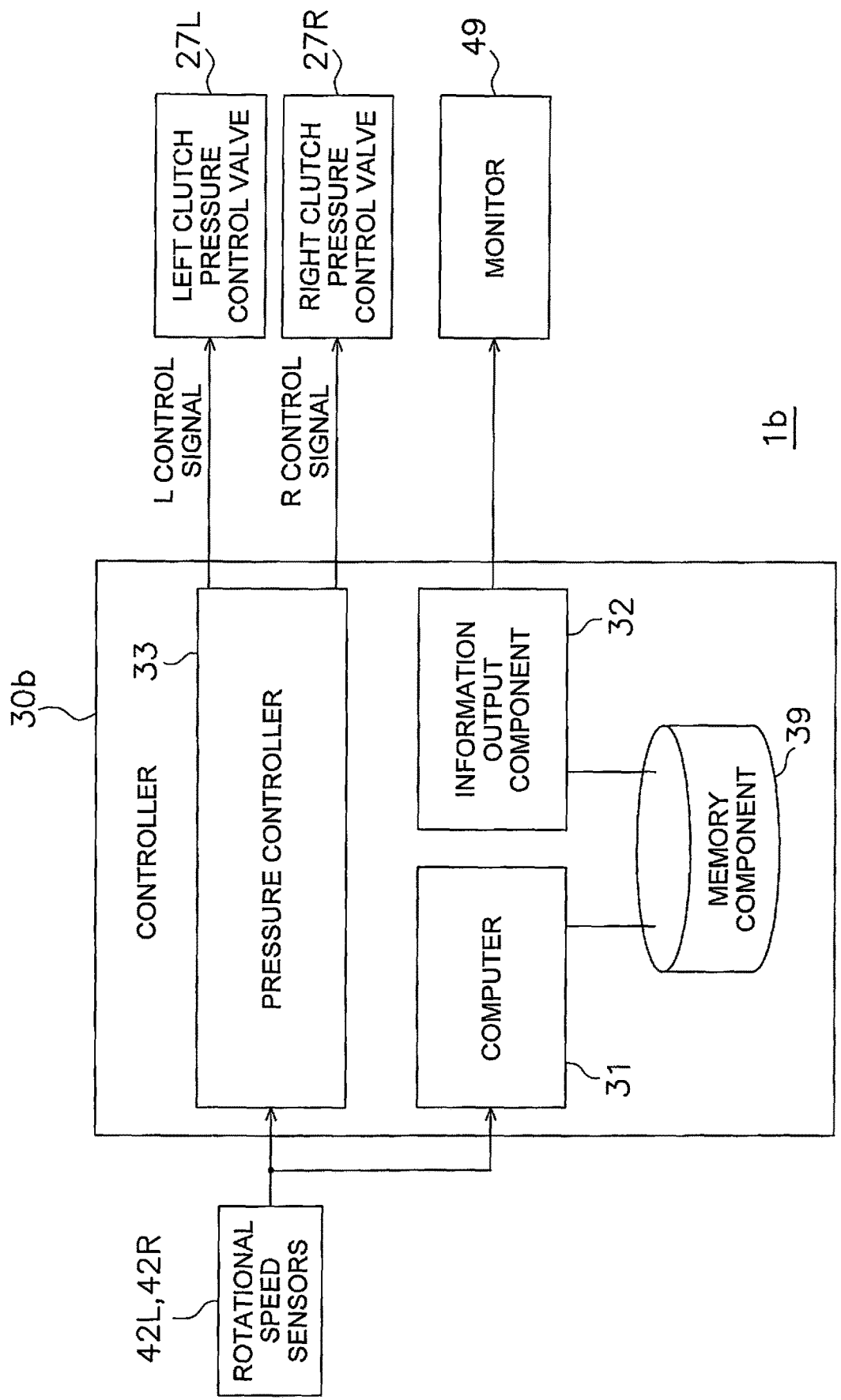
FIG. 21 is a block diagram of the controller according to a third embodiment.

FIG. 21 is a block diagram of a controller 30b of a bulldozer 1b according to the third embodiment. With the bulldozer 1b, the components other than the controller 30b are all the same as in the first embodiment, and will therefore not be described again. Also, the controller 30b is the same as the controller 30 according to the first embodiment except that it further includes a pressure controller 33. Therefore, only the pressure controller 33 will be described below. With the controller 30b, typically, a program and data for executing the functions of the pressure controller 33 are stored in a memory device. A computation device executes the program, and as a result the controller 30b executes the functions of the pressure controller 33. The controller 30b may be realized by an integrated circuit.

The rotational speeds of the above-mentioned left and right rotational speed sensors 42L and 42R are inputted to the pressure controller 33. The pressure controller 33 determines whether or not the rotational speed ΦL measured by the left rotational speed sensor 42L is greater than the specific rotational speed threshold ΦthL, and whether or not the rotational speed ΦR measured by the right rotational speed sensor 42R is greater than the specific rotational speed threshold ΦthR. The rotational speed threshold ΦthL is predetermined so as to satisfy the following Formula 2, and the rotational speed threshold ΦthR is predetermined so as to satisfy the following Formula 3.

$$\Phi thL \leq \text{Max } PVL/(DL \times P1) \qquad (2)$$

Max PVL: maximum permissible PV value of first left sealing ring first left sealing ring 64L and second left sealing ring 65L
DL: shaft diameter of first left sealing ring 64L and second left sealing ring 65L
P1: first pressure $$\Phi thR \leq \text{Max } PVR/(DR \times P1) \qquad (3)$$

Max PVR: maximum permissible PV value of first right sealing ring 64R and second right sealing ring 65R
DR: shaft diameter of first right sealing ring 64R and second right sealing ring 65R
P1: first pressure When the first left sealing ring 64L, the second left sealing ring 65L, the first right sealing ring 64R, and the second right sealing ring 65R are all the same sealing ring, the right side of Formula 2 and the right side of Formula 3 are equivalent. In this case, it is preferable if ΦthL=ΦthR.

In the above description, an example is given of a case in which the maximum permissible PV values of the first left sealing ring 64L and the second left sealing ring 65L are the same as the maximum permissible PV values of the first right sealing ring 64R and the second right sealing ring 65R, and the shaft diameters of the first left sealing ring 64L and the second left sealing ring 65L are the same as the shaft diameters of the first right sealing ring 64R and the second right sealing ring 65R.

However, there are also cases when the first left sealing ring 64L and the second left sealing ring 65L have different maximum permissible PV values. Or, the first left sealing ring 64L and the second left sealing ring 65L may have different shaft diameters. In such a case, Max PVL/(DL×P1) may be calculated for each of the first left sealing ring 64L and the second left sealing ring 65L, and the rotational speed threshold ΦthL set for the first left sealing ring 64L and the second left sealing ring 65L so as to be equal to or less than the lower of the calculated values.

Similarly, there are also cases when the first right sealing ring 64R and the second right sealing ring 65R have different maximum permissible PV values. Or, the first right sealing ring 64R and the second left sealing ring second right sealing ring 65R may have different shaft diameters. In such a case, Max PVR/(DR×P1) may be calculated for each of the first right sealing ring 64R and the second right sealing ring 65R, and the rotational speed threshold ΦthR set for the first right sealing ring 64R and the second right sealing ring 65R so as to be equal to or less than the lower of the calculated values.

The pressure controller 33 decides the pressure of the hydraulic fluid in the hydraulic fluid supply channel 60 so as to keep the PV value of the left and right steering clutches 12L and 12R within the permissible usage range. More specifically, the pressure controller 33 decides the pressure of the hydraulic fluid in the first left hydraulic fluid supply channel 61L, the second left hydraulic fluid supply channel 62L, and the left connected part 63L so as to keep the PV value of the left steering clutch 12L within the permissible usage range. The pressure controller 33 then outputs a command corresponding to the decided engagement pressure to the left steering clutch pressure control valve 27L. The pressure controller 33 performs control so that the clutch pressure of the left steering clutch 12L will be the decided pressure.

Similarly, the pressure controller 33 decides the pressure of the hydraulic fluid in the first right hydraulic fluid supply channel 61R, the second right hydraulic fluid supply channel 62R, and the right connected part 63R so as to keep the PV value of the right steering clutch 12R within the permissible usage range. The pressure controller 33 then outputs a command corresponding to the decided pressure to the right clutch pressure control valve 27R. The pressure controller 33 performs control so that the clutch pressure of the right steering clutch 12R will be the decided pressure. The left and right clutch pressure control valves 27L and 27R receive commands from the pressure controller 33, and control the pressure of the hydraulic fluid in the hydraulic fluid supply channel 60.

More specifically, if the rotational speed ΦL is equal to or less than the rotational speed threshold ΦthL, and the rotational speed CDR is equal to or less than the rotational speed threshold ΦthR, the pressure controller 33 outputs a command to the left and right clutch pressure control valves 27L and 27R to use the above-mentioned first pressure for the pressure of the hydraulic fluid in the hydraulic fluid supply channel 60. The pressure controller 33 performs control so that the pressure of the hydraulic fluid in the hydraulic fluid supply channel 60 will be the first pressure.

If the rotational speed ΦL is greater than the rotational speed threshold ΦthL, or if the rotational speed ΦR is less than the rotational speed threshold ΦthR, the pressure controller 33 outputs a command to the left and right clutch pressure control valves 27L and 27R to reduce the pressure of the hydraulic fluid in the hydraulic fluid supply channel 60 from the first pressure. The pressure controller 33 performs control so that the pressure of the hydraulic fluid in the hydraulic fluid supply channel 60 will be reduced from the first pressure.

More specifically, if the rotational speed ΦL is greater than the rotational speed threshold ΦthL, or if the rotational speed ΦR is less than the rotational speed threshold ΦthR, the pressure controller 33 performs control so that the pressure PL will be reduced so that the product of the rotational speed ΦL and the pressure PL exerted on the left steering clutch 12L will not exceed the specific upper limit UlimL.

Similarly, if the rotational speed ΦL is greater than the rotational speed threshold ΦthL, or if the rotational speed ΦR is less than the rotational speed threshold ΦthR, the pressure controller 33 performs control so that the pressure PR will be reduced so that the product of the rotational speed ΦR and the pressure PR exerted on the right steering clutch 12R will not exceed the specific upper limit UlimR. These specific upper limit UlimL and UlimR are determined from Formulas 4 and 5.

$$U \lim L = \Phi thL \times P1 \quad (4)$$

ΦthL: rotational speed threshold determined so as to satisfy Formula 2
P1: first pressure $$U \lim R = \Phi thR \times P1 \quad (5)$$

ΦthR: rotational speed threshold determined so as to satisfy Formula 3
P1: first pressure These upper limits UlimL and UlimR may be called a first product. The pressure controller 33 can make use of the first product UlimL to set the target hydraulic pressure PL applied to the left steering clutch 12L as in Formula 6. Similarly, the pressure controller 33 can make use of the first product UlimR to set the target hydraulic pressure PR applied to the right steering clutch 12R as in Formula 7. The pressure controller 33 outputs commands to the left and right clutch pressure control valves 27L and 27R to use the target hydraulic pressures PL and PR thus set.

$$PL = U \lim L / MAX(\Phi L, \Phi R) \quad (6)$$

MAX (ΦL, ΦR): rotational speed of the greater of ΦL and ΦR $$PR = U \lim R / MAX(\Phi L, \Phi R) \quad (7)$$

MAX (ΦL, ΦR): rotational speed of the greater of ΦL and ΦR

If the rotational speed ΦL of the left rotational speed sensor 42L is higher than the rotational speed threshold ΦthL, the pressure controller 33 may control the pressure PL of the hydraulic fluid on the left steering clutch 12L regardless of the rotational speed ΦR of the right rotational speed sensor 42R. Similarly, if the rotational speed ΦR of the right rotational speed sensor 42R is higher than the rotational speed threshold ΦthR, the pressure controller 33 may control the pressure PR of the hydraulic fluid on the right steering clutch 12R regardless of the rotational speed ΦL of the left rotational speed sensor 42L.

In this case, the pressure controller 33 preferably performs control so that the clutch pressure of the left steering clutch 12L will be the hydraulic pressure PL found from Formula 8. Similarly, the pressure controller 33 preferably performs control so that the clutch pressure of the right steering clutch 12R will be the hydraulic pressure PR found from Formula 9.

$$PL = \begin{cases} P1 & (VL \leq VthL のとき) \\ U \lim L / VL & (VL > VthL のとき) \end{cases} \quad (8)$$

$$PR = \begin{cases} P1 & (VR \leq VthR のとき) \\ U \lim R / VR & (VR > VthR のとき) \end{cases} \quad (9)$$

Figure 22:
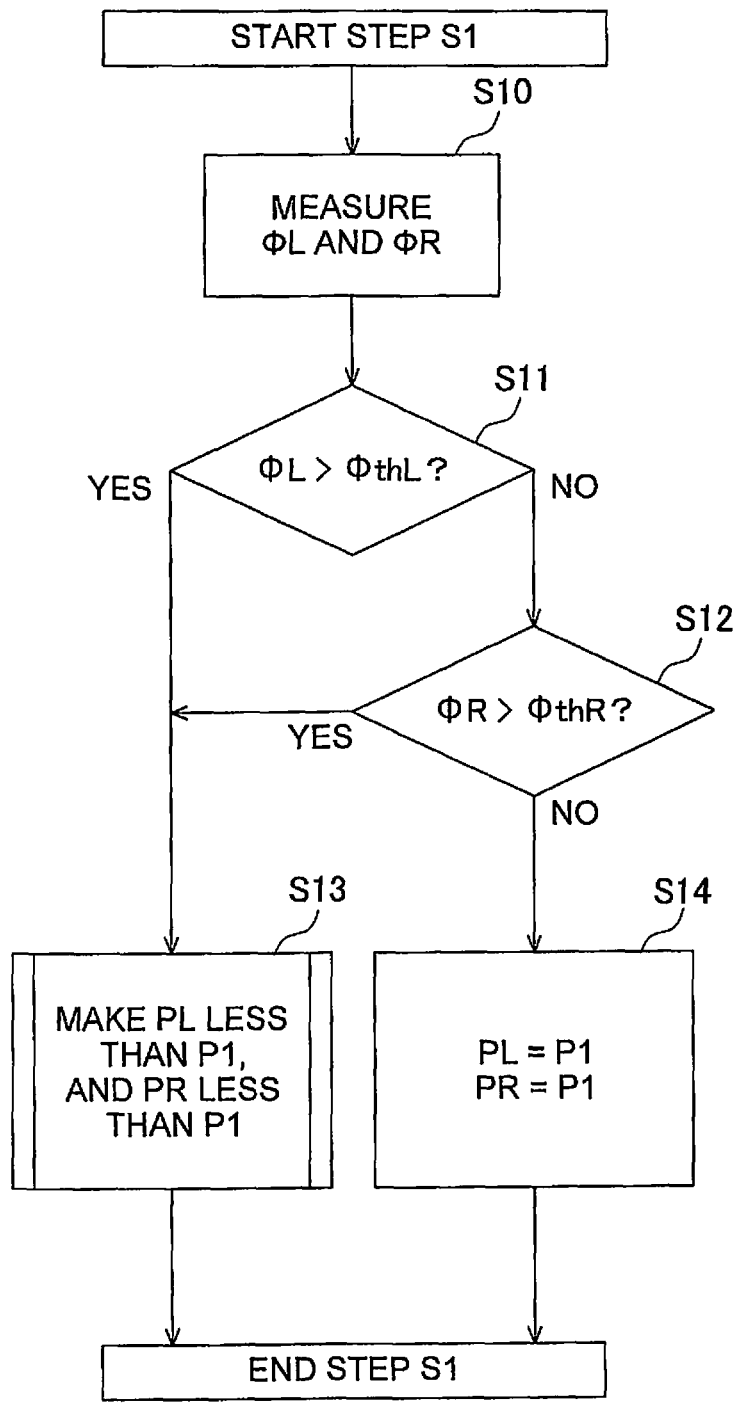
FIG. 22 is a flowchart of the detailed operation of step 1 in a bulldozer according to the third embodiment.

Next, a method for monitoring the bulldozer 1 according to this embodiment will be described through reference to a flowchart. The operation of the above-mentioned pressure controller 33 corresponds to the detailed operation in step 1 in the first embodiment. FIG. 22 is a flowchart of the detailed operation in step 1 with the bulldozer according to the third embodiment.

In step 10, the left rotational speed sensor 42L measures the rotational speed ΦL of the left sealing rings 64L and 65L, and the right rotational speed sensor 42R measures the rotational speed ΦR of the sealing rings 64R and 65R. In step 11, the pressure controller 33 determines whether or not the rotational speed ΦL measured by the left rotational speed sensor 42L is greater than the specific rotational speed threshold ΦthL. If the rotational speed ΦL is not greater than the rotational speed threshold ΦthL (No in step 11), in step 12 the pressure controller 33 determines whether or not the rotational speed ΦR measured by the right rotational speed sensor 42R is greater than the specific rotational speed threshold ΦthR.

If the rotational speed ΦL is greater than the rotational speed threshold ΦthL (Yes in step 11), or if the rotational speed ΦR is greater than the specific rotational speed threshold ΦthR (Yes in step 12), in step 13 the pressure controller 33 decides to reduce the clutch pressures PL and PR (the pressure inside the first/right left hydraulic fluid supply channels 61L and 61R) from the first pressure P1. The pressure controller 33 then performs control so that the pressure of the hydraulic fluid in the hydraulic fluid supply channel 60 will be the decided pressure.

More specifically, if the rotational speed ΦL is greater than the specific rotational speed threshold ΦthL, the pressure controller 33 decides to reduce the hydraulic pressure PL so that the product of the rotational speed ΦL and the hydraulic pressure PL exerted on the left steering clutch 12L will not exceed the upper limit value UlimL. The pressure controller 33 then controls the clutch pressure of the left steering clutch 12L to be the decided pressure.

Also, if the rotational speed ΦR is greater than the specific rotational speed threshold ΦthR, the pressure controller 33 decides to reduce the hydraulic pressure PR so that the product of the rotational speed ΦR and the hydraulic pressure PR exerted on the right steering clutch 12R will not exceed the upper limit value UlimR. The pressure controller 33 then controls the clutch pressure of the right steering clutch 12R to be the decided pressure.

Figure 23:
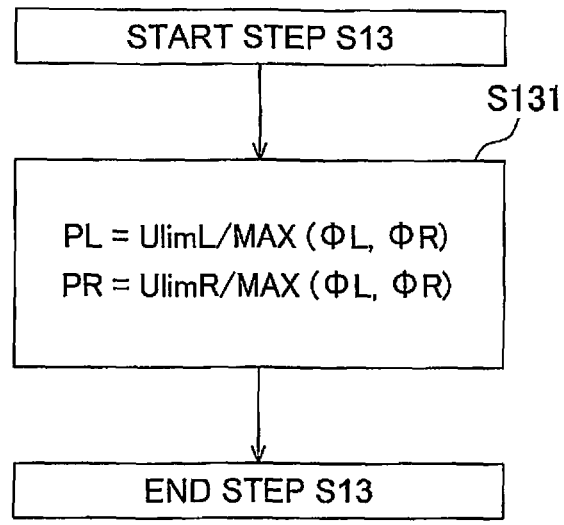
FIG. 23 is an example of a method for changing the clutch pressure in the third embodiment.

An example of specific processing is shown in FIG. 23. In step 131, the pressure controller 33 makes a decision so that the hydraulic pressure PL exerted on the left steering clutch 12L will be UlimL/MAX (ΦL, ΦR), and the hydraulic pressure PR exerted on the right steering clutch 12R will be UlimR/MAX (ΦL, ΦR). The pressure controller 33 then performs control so that the pressure of the hydraulic pressure in the hydraulic fluid supply channel 60 will be the decided pressure.

Figure 24:
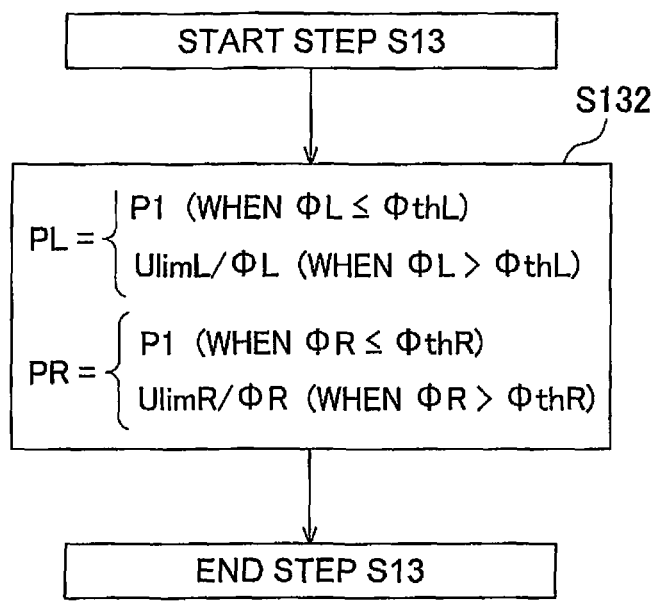
FIG. 24 is an another example of a method for changing clutch pressure in the third embodiment.

Another processing example is shown in FIG. 24. In step 132, when the rotational speed ΦL is equal to or less than the rotational speed threshold ΦthL, the pressure controller 33 decides that the hydraulic pressure PL will be the first pressure P1. When the rotational speed ΦL is greater than the rotational speed threshold ΦthL, the pressure controller 33 decides that the hydraulic pressure PL will be UlimL/ΦL. The pressure controller 33 then controls the clutch pressure of the left steering clutch 12L to be the decided pressure.

When the rotational speed ΦR is equal to or less than the rotational speed threshold ΦthR, the pressure controller 33 performs control so that the hydraulic pressure PR will be the first pressure P1. When the rotational speed ΦR is greater than the rotational speed threshold ΦthR, the pressure controller 33 decides that the hydraulic pressure PR will be UlimR/ΦR. The pressure controller 33 then controls the clutch pressure of the right steering clutch 12R to be the decided pressure.

If the rotational speed ΦR is not greater than the rotational speed threshold ΦthR (No in step 12 in FIG. 22), in step 14 the pressure controller 33 decides that clutch pressures PL and PR (the pressure in first left/right hydraulic fluid supply channels) will be the above-mentioned first pressure P1. The pressure controller 33 then performs control so that the pressure of the hydraulic fluid in the hydraulic fluid supply channel 60 will be the decided pressure.

Features (1) With the bulldozer 1 according to the first embodiment, the pressure of the hydraulic fluid in the hydraulic fluid supply channel 60 is decided, and determination basis data is found that is related to the hydraulic pressures PL and PR, the rotational speeds φL and φR, and the times when the rotational speeds controlled by the hydraulic pressures PL and PR during rotation of the sealing rings 64L, 65L, 64R, and 65R were sensed. The bulldozer 1 then outputs maintenance information about the sealing rings 64L, 65L, 64R, and 65R from the predicated amount of wear W obtained from the determination basis data. Consequently, the bulldozer 1 can notify a worker to suitably replace the sealing rings 64L, 65L, 64R, and 65R, etc., according to the usage state of the sealing rings 64L, 65L, 64R, and 65R.

(2) With the monitoring system 100 according to the second embodiment, the bulldozer 1a decides the pressure of the hydraulic fluid in the hydraulic fluid supply channel 60, and finds the above-mentioned determination basis data. The bulldozer 1a then outputs the determination basis data in a format that can be inputted by the monitoring device 8. The monitoring device 8 outputs maintenance information about the sealing rings 64L, 65L, 64R, and 65R from the predicated amount of wear W obtained from the determination basis data. Consequently, a worker can be suitably notified about replacement of the sealing rings 64L, 65L, 64R, and 65R, etc., according to the usage state of the sealing rings 64L, 65L, 64R, and 65R.

(3) In the third embodiment, when the rotational speeds ΦL and ΦR measured by the rotational speed sensors 42L and 42R are greater than the rotational speed thresholds ΦthL and ΦthR, the pressure controller 33 performs control to reduce the pressures PL and PR so that the products of the rotational speeds ΦL and ΦR and the hydraulic pressures PL and PR do not exceed the upper limit value UlimL and UlimR. More specifically, the pressure controller 33 performs control so that the pressure of the hydraulic fluid will be the quotient of dividing the first products UlimL and UlimR, which correspond to the products of the rotational speed thresholds ΦthL and ΦthR and the first pressure P1, by the rotational speeds ΦL and ΦR.

Therefore, the PV value of the sealing rings 64L, 65L, 64R, and 65R is reliably controlled so as not to reach the maximum permissible value. Therefore, abnormal wear of the sealing rings 64L, 65L, 64R, and 65R is prevented, and the replacement date for the sealing rings 64L, 65L, 64R, and 65R can be found more accurately.

Modification Examples

The present invention is not limited to or by the above embodiments, and various modifications and variations are possible without departing from the scope of the present invention.

(a) In the above embodiments, the information output component 32 or the output component 83 may output maintenance information about the sealing rings 64L, 65L, 64R, and 65R when a first integration value, rather than the predicated amount of wear, exceeds a threshold.

(b) In the above embodiments, an example was given in which two sealing rings were mounted per rotary member, but just one sealing ring, or three or more, may be mounted per rotary member.

(c) In the above embodiments, a bulldozer was used as an example of a work vehicle, but the present invention can be similarly applied to other work vehicles in which a steering clutch is provided to a power transmission device.

(d) In the above embodiments, the first left hydraulic fluid supply channel 61L may be formed in the first left rotary member 56L. In this case, the second left hydraulic fluid supply channel 62L is preferably connected to the first left rotary member 56L, and the first left sealing ring 64L and the second left sealing ring 65L are mounted on the surface of the first left rotary member 56L. Also, the first right hydraulic fluid supply channel 61R may be formed in the first right rotary member 56R. In this case, the second right hydraulic fluid supply channel 62R is preferably connected to the first right rotary member 56R, and the first right sealing ring 64R and the second right sealing ring 65R are mounted on the surface of the first right rotary member 56R.

(e) Also, the first left hydraulic fluid supply channel 61L may include a part of the supply channel in the left output shaft 21L or in the lateral shaft 20, and the first right hydraulic fluid supply channel 61R may include a part of the supply channel in the right output shaft 21R or in the lateral shaft 20. In this case, the second left hydraulic fluid supply channel 62L may be connected to the left output shaft 21L or the lateral shaft 20, and the first left sealing ring 64L and the second left sealing ring 65L may be mounted on the surface of the left output shaft 21L or the lateral shaft 20. The second right hydraulic fluid supply channel 62R may be connected to the right output shaft 21R or the lateral shaft 20, and the first right sealing ring 64R and the second right sealing ring 65R may be mounted on the surface of the right output shaft 21R or the lateral shaft 20.

(f) In the second embodiment, the external output component 48 may output determination basis data to a removable storage medium that can be written to by the bulldozer 1a and that can be read by the monitoring device 8. The storage medium is, for example, a CD-ROM, a DVD, a BD, or another such optical disk memory, a memory card, a USB memory, or another portable memory. In this case, the communication means 9 may be eliminated. Also, the determination basis data may be stored in the storage medium instead of being stored in the memory component 39.

(g) The external output component 48 may display determination basis data in a text format on the monitor 49 of the bulldozer 1a. Also, the input component 81 of the monitoring device 8 may be a keyboard, a mouse, a touch panel, or another such input device. In this case, a worker performing maintenance on the bulldozer 1a may read the determination basis data displayed on the monitor 49 and use the input component 81 to input the read determination basis data to the monitoring device 8. Here again, the communication means 9 may be omitted.

(h) In the third embodiment, an example was given in which the pressure controller 33 was added to the bulldozer 1 of the first embodiment, but the pressure controller 33 may also be added to the bulldozer 1a of the second embodiment.

(i) In the third embodiment, step 2 may be eliminated, and the rotational speeds ΦL and OR acquired in step 10 may be used instead to derive the determination basis data.

(C)

First Embodiment

Figure 25:
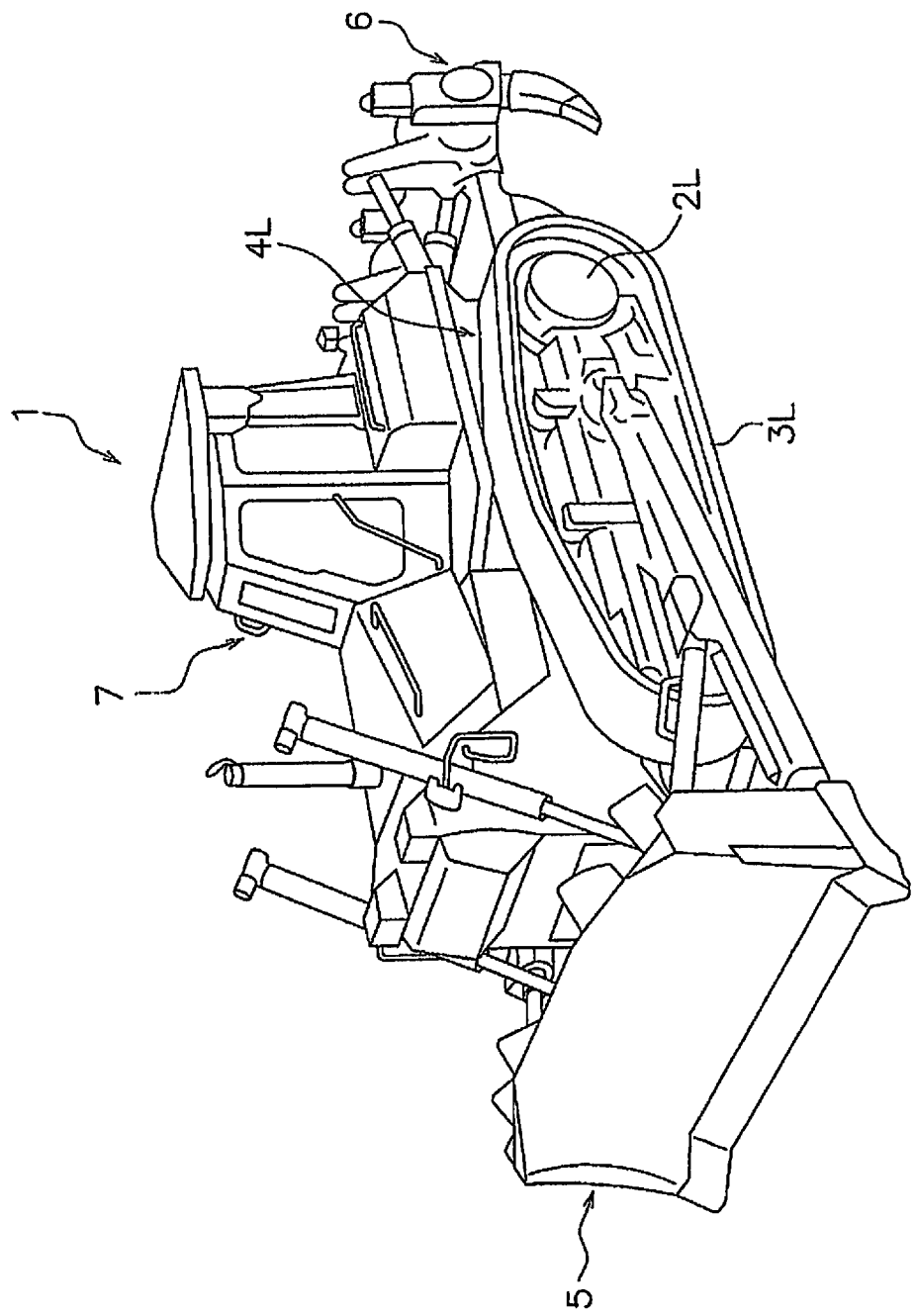
FIG. 25 is an oblique view of a bulldozer in an embodiment.
Figure 26:
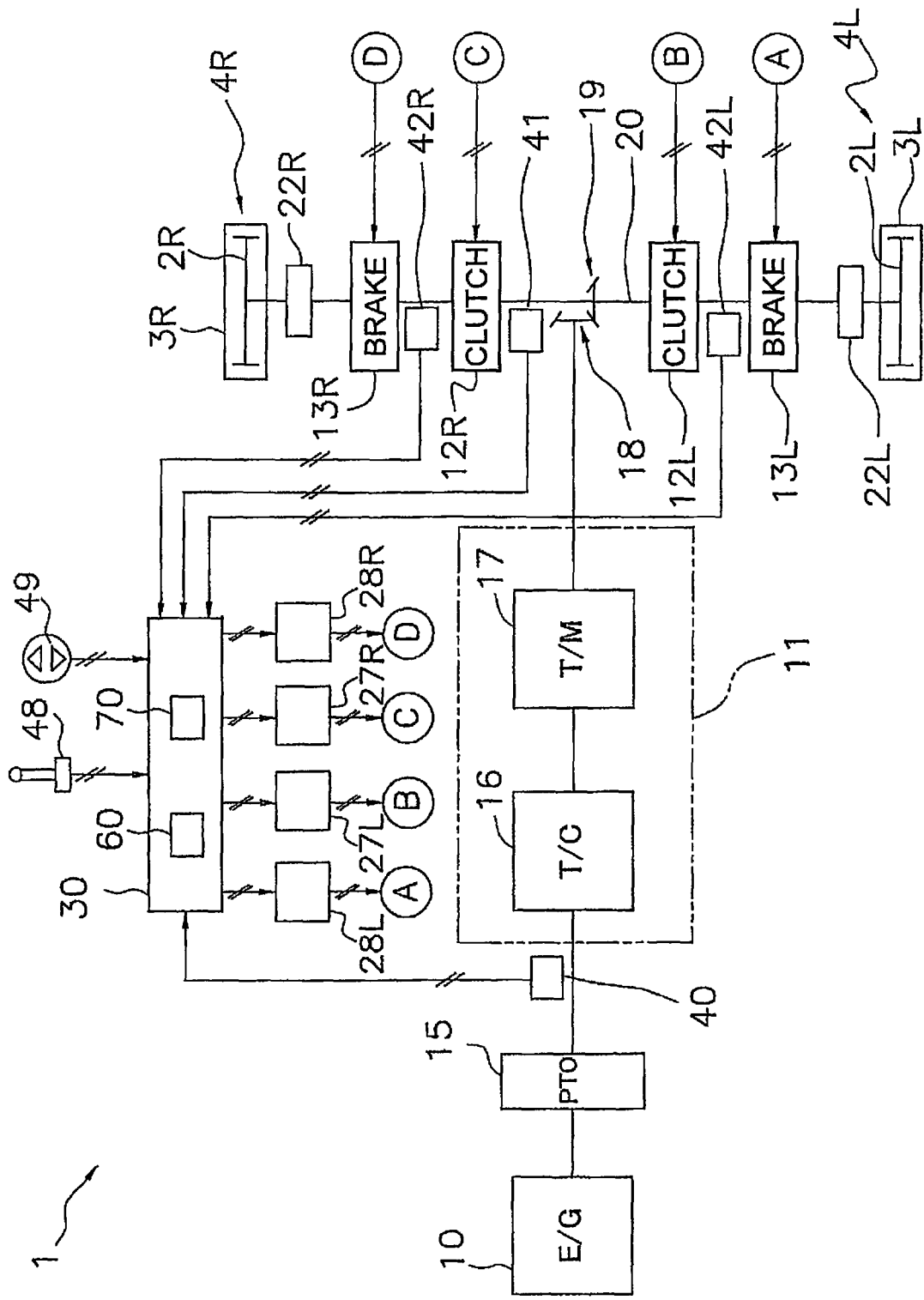
FIG. 26 shows the simplified configuration of the bulldozer shown in FIG. 25.

FIG. 25 shows a bulldozer 1 that is an example of a tracked work vehicle. As shown in FIGS. 25 and 26, the bulldozer 1 includes drive units 4L and 4R respectively having sprockets 2L and 2R and crawler belts 3L and 3R, a blade 5 provided at the front of the vehicle, and a ripper device 6 provided at the rear of the vehicle. This bulldozer 1 can perform work such as dozing with the blade 5, or work such as crushing or excavation with the ripper device 6.

The bulldozer 1 further includes a cab 7 above the left and right drive units 4L and 4R. The cab 7 is equipped with a seat in which the operator sits, various kinds of control lever, a vehicle speed setting switch, pedals, gauges, and so forth. In the following description, the "forward and backward direction" means the forward and backward direction of the bulldozer 1. In other words, the forward and backward direction means the forward and backward direction as seen by the operator seated in the cab 7. Also, the left and right direction or "to the side" refers to the vehicle width direction of the bulldozer 1. The left and right direction, the vehicle width direction, and "to the side" all refer to the left and right directions as seen by the above-mentioned operator.

Configuration of Power Transmission System

As shown in FIG. 26, this bulldozer 1 includes an engine 10, a power transmission device 11 that transmits power from the engine 10 to the left and right drive units 4L and 4R, left and right steering clutches 12L and 12R, and left and right steering brakes 13L and 13R. The power transmission device 11 includes a torque converter 16 and a transmission 17.

The power from the engine 10 is transmitted to a power takeoff 15. The power takeoff 15 diverts part of the power from the engine 10 to hydraulic pumps or the like that generate power for the blade 5 and the ripper device 6, and transmits the rest of the power to the torque converter 16. The torque converter 16 transmits power through a fluid. The output shaft of the torque converter 16 is linked to the input shaft of the transmission 17, and power is transmitted from the torque converter 16 to the transmission 17. The transmission 17 changes the speed of the rotary motion of the engine. The power outputted from the transmission 17 is transmitted through a first bevel gear 18 and a second bevel gear 19 to a lateral shaft 20.

The power transmitted to the lateral shaft 20 goes through the left steering clutch 12L and a left final reduction gear 22L and is transmitted to the left sprocket 2L. Also, the power transmitted to the lateral shaft 20 goes through the right steering clutch 12R and a right final reduction gear 22R and is transmitted to the right sprocket 2R. The crawler belts 3L and 3R are wound around the sprockets 2L and 2R. Therefore, when the sprockets are rotationally driven, the crawler belts 3L and 3R are driven, and this propels the bulldozer 1. In the following description, the sprockets 2L and 2R may be called drive wheels for the sake of description.

The left and right steering clutches 12L and 12R are disposed between the power transmission device 11 and the left and right sprockets 2L and 2R, respectively, and are hydraulic clutches that can be hydraulically switched between engaged and disengaged states. The supply and discharge of hydraulic fluid to and from these steering clutches 12L and 12R are controlled by steering clutch control valves 27L and 27R.

Saying that the left and right steering clutches 12L and 12R are engaged means that a pressure equal to or greater than a specific holding pressure, at which torque within the designed range can be transmitted without clutch slippage, is being supplied to the steering clutches 12L and 12R. The pressure applied to the steering clutches 12L and 12R (clutch pressure) rises in proportion to the hydraulic pressure supplied to the steering clutches 12L and 12R.

Here, if the left steering clutch 12L is in its engaged state, power from the second bevel gear 19 is transmitted to the left sprocket 2L. If the left steering clutch 12L is in its disengaged state, power from the second bevel gear 19 is cut off by the left steering clutch 12L and is not transmitted to the left sprocket 2L. If the right steering clutch 12R is in its engaged state, power from the second bevel gear 19 is transmitted to the right sprocket 2R. If the right steering clutch 12R is in its disengaged state, power from the second bevel gear 19 is cut off by the right steering clutch 12R and is not transmitted to the right sprocket 2R.

The left and right steering brakes 13L and 13R are disposed between the left and right steering clutches 12L and 12R and the left and right sprockets 2L and 2R, respectively, and are hydraulic brakes that can be hydraulically switched between a braking state and a non-braking state. The supply and discharge of hydraulic fluid to and from the left and right steering brakes 13L and 13R are controlled by brake control valves 28L and 28R.

The output rotation of the left steering clutch 12L, that is, the rotation of the left sprocket 2L, can be braked by putting the left steering brake 13L in a braking state. The output rotation of the right steering clutch 12R, that is, the rotation of the right sprocket 2R, can be braked by putting the right steering brake 13R in a braking state.

With the above configuration, in a state in which the left steering clutch 12L is disengaged and the left steering brake 13L is braking, if the right steering clutch 12R is engaged and the right sprocket 2R is rotationally driven, the bulldozer 1 will turn to the left. Conversely, in a state in which the right steering clutch 12R is disengaged and the right steering brake 13R is braking, if the left steering clutch 12L is engaged and the left sprocket 2L is rotationally driven, the bulldozer 1 will turn to the right.

Configuration for Output Control

This bulldozer 1 has a controller 30. The controller 30 includes a CPU or other such computation device, and a RAM, ROM, or other such memory device. The controller 30 is connected to a steering lever 48 and an upshift/downshift button 49, which are housed in the cab 7. The steering lever 48 is used to switch the bulldozer 1 between forward and reverse movement and to switch its turning direction. The upshift/downshift button 49 is used by the operator to shift the gear of the transmission 17.

The controller 30 receives a signal from the steering lever 48 or the upshift/downshift button 49 and shifts the gear of the transmission 17 and controls the control valves 27L, 27R, 28L, and 28R.

Figure 27:
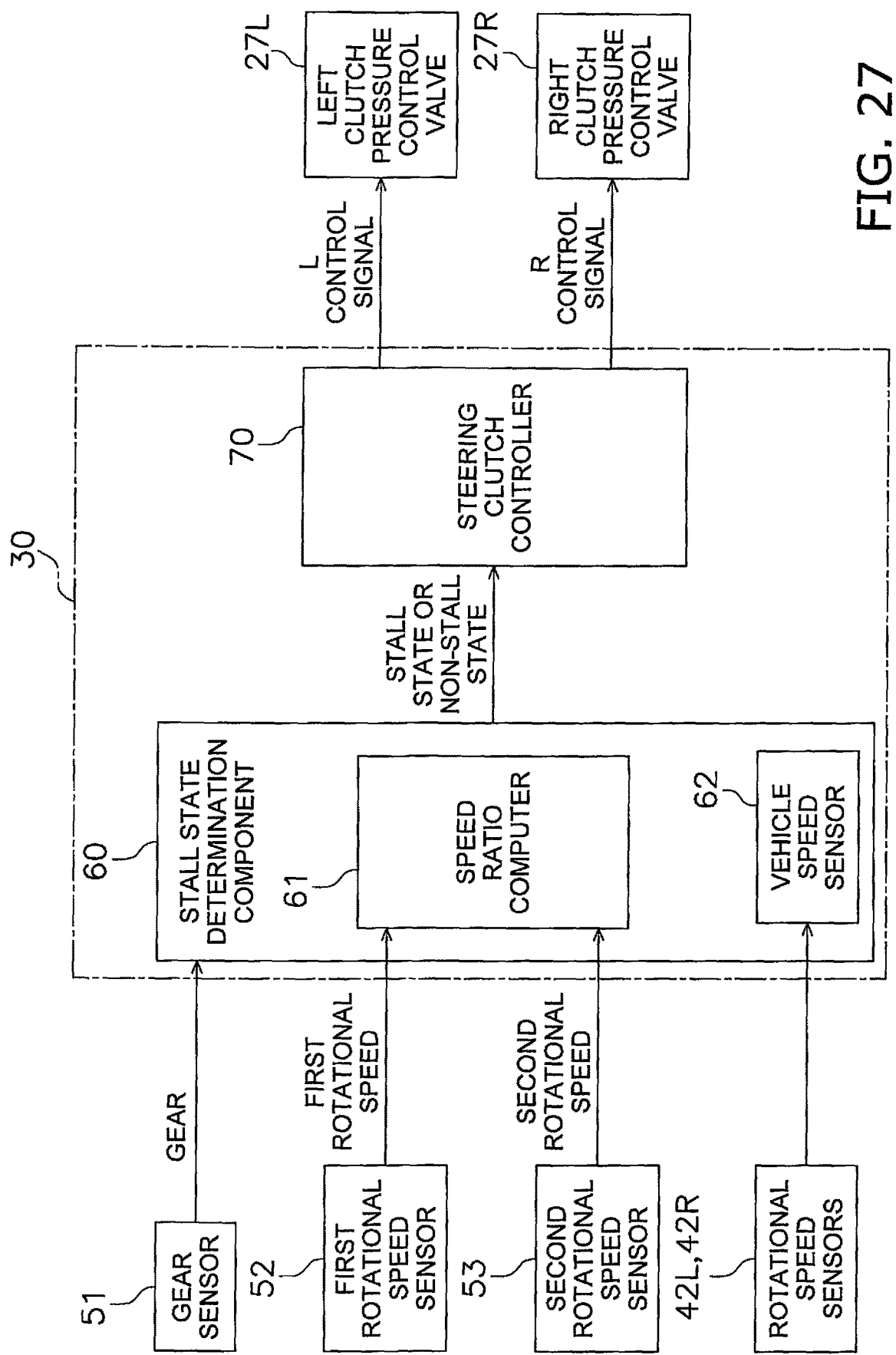
FIG. 27 is a block diagram of the bulldozer according to the first embodiment.

FIG. 27 is a block diagram of the detailed configuration of the controller 30 according to the first embodiment. The controller 30 has a stall state determination component 60 and a steering clutch controller 70. Typically, programs and data for executing the various functions of the stall state determination component 60 and the steering clutch controller 70 are stored in a memory device. When the computation device executes the program, the controller 30 executes the various functions of the stall state determination component 60 and the steering clutch controller 70. The controller 30 may also be realized by an integrated circuit.

The stall state determination component 60 determines whether or not one or both of the left and right sprockets 2L and 2L are in a stall state. "Stall state" refers to a state in which the sprockets 2L and 2R cannot be sufficiently rotated even though the crawler belts 3L and 3R are not slipping with respect to the ground. It means that when the clutch pressure of the steering clutches 12L and 12R is equal to or greater than a first pressure and the stall state determination component 60 determines that there is no stall state, the steering clutches 12L and 12R are both engaged and are not slipping. The first pressure is a pressure equal to or greater than the above-mentioned holding pressure. The first pressure will be discussed in detail below.

The stall state determination component 60 includes a speed ratio computer 61 and a vehicle speed sensor 62. A first rotational speed from a first rotational speed sensor 52, and a second rotational speed from a second rotational speed sensor 53 are inputted to the speed ratio computer 61.

The first rotational speed sensor 52 senses the first rotational speed, which is the rotational speed of the input shaft of the power transmission device 11. The input shaft of the power transmission device 11 is, for example, the input shaft of the torque converter 16. The first rotational speed sensor 52 is a rotational speed sensor 40 that senses the rotational speed of the input shaft of the torque converter 16 (see FIG. 26).

The second rotational speed sensor 53 senses the second rotational speed, which is the rotational speed of the output shaft of the power transmission device 11. The output shaft of the power transmission device 11 is, for example, the output shaft of the transmission 17. The second rotational speed sensor 53 is a rotational speed sensor 41 that senses the rotational speed of the output shaft of the transmission 17 (see FIG. 26). The second rotational speed sensor 53 may also be a rotational speed sensor that senses the rotational speed of the output shaft of the torque converter 16.

The speed ratio computer 61 computes the speed ratio, which is the ratio of the second rotational speed to the first rotational speed. If the second rotational speed sensor 53 is a rotational speed sensor that senses the rotational speed of the output shaft of the transmission 17, then the speed ratio computed by the speed ratio computer 61 is the product of multiplying the reduction ratio of the transmission 17 by the speed ratio of the input shaft and output shaft of the torque converter 16 (input/output speed ratio). If the second rotational speed sensor 53 is a rotational speed sensor that senses the rotational speed of the output shaft of the torque converter 16, then the speed ratio computed by the speed ratio computer 61 is the input/output speed ratio of the torque converter 16.

The vehicle speed sensor 62 senses the vehicle speed of the bulldozer 1. The rotational speeds of the rotational speed sensors 42L and 42R (see FIG. 26) that sense the rotational speeds of the output shafts of the steering clutches 12L and 12R, for example, are inputted to the vehicle speed sensor 62. The vehicle speed sensor 62 finds the movement speed VL of the left drive unit 4L by multiplying the circumference ratio and the diameter of the left sprocket 2L and the reduction ratio of the left final reduction gear 22L by the rotational speed of the output shaft of the left steering clutch 12L.

Similarly, the vehicle speed sensor 62 finds the movement speed VR of the right drive unit 4R by multiplying the circumference ratio and the diameter of the right sprocket 2R and the reduction ratio of the right final reduction gear 22R by the rotational speed of the output shaft of the right steering clutch 12R. The vehicle speed sensor 62 finds the average of the movement speed VL of the left drive unit 4L and the movement speed VR of the right drive unit 4R as the vehicle speed of the bulldozer 1.

The method for sensing the vehicle speed of the bulldozer 1 is not limited to the above example. For instance, the bulldozer 1 may be equipped with a GPS receiver, and the vehicle speed sensor 62 may sense the vehicle speed of the bulldozer 1 on the basis of the amount of change per unit of time in the position of the bulldozer 1 sensed by GPS. Also, the vehicle speed sensor 62 may sense the vehicle speed of the bulldozer 1 by means of a sensor attached to the left and right drive units 4L and 4R.

The gear sensed by a gear sensor 51 is also inputted to the stall state determination component 60. The gear sensor 51 is connected to the upshift/downshift button 49, and senses the gear of the power transmission device 11 set by operator input. Also, the controller 30 may shift the gear of the transmission 17 automatically. In this case, the gear sensor 51 preferably senses the gear of the transmission 17 that has been automatically shifted.

If the gear sensed by the gear sensor 51 is first gear, the speed ratio computed by the speed ratio computer 61 is equal to or less than a first speed ratio, and the vehicle speed is equal to or less than a specific first speed, the stall state determination component 60 determines that the sprockets 2L and 2R are both in a stall state. This first speed ratio and first speed are suitably established according to size of the bulldozer 1, the type of the engine 10, and so on.

If the second rotational speed sensor 53 is a rotational speed sensor that senses the rotational speed of the output shaft of the torque converter 16, then the first speed ratio may be set at 0.2, for example. If the second rotational speed sensor 53 is a rotational speed sensor that senses the rotational speed of the output shaft of the transmission 17, then the first speed ratio may be the product of multiplying the reduction ratio of the transmission 17 by 0.2, for example.

The drive torque exerted on the steering clutches 12L and 12R when the gear sensed by the gear sensor 51 is first gear, the speed ratio computed by the speed ratio computer 61 is a first speed ratio, and the vehicle speed is a first speed will be equal to or less than the clutch capacity of the steering clutches 12L and 12R when the above-mentioned first pressure is applied to the steering clutches 12L and 12R. The "clutch capacity" is the amount of torque that the clutches can transmit. Therefore, if the stall state determination component 60 determines that there is no stall state, no slippage occurs at the steering clutches 12L and 12R. The clutch capacity Tb of the steering clutches is calculated from the following Formula 1.

$$Tb = \mu \times P \times A \times R \times N \tag{1}$$

μ: coefficient of friction of friction material constituting steering clutch
P: hydraulic pressure of steering clutch at given time
A: clutch disk surface area
R: clutch disk average pressing diameter
N: number of surfaces of clutch disks (2×number of clutches)

The steering clutch controller 70 controls the clutch pressure of the steering clutches 12L and 12R. If the stall state determination component 60 determines that the sprockets 2L and 2R are not in a stall state, the steering clutch controller 70 controls the clutch pressure of the steering clutches 12L and 12R to be a first pressure, which is a pressure equal to or greater than the holding pressure. More specifically, the steering clutch controller 70 controls the steering clutch control valves 27L and 27R so that the clutch pressure of the steering clutches 12L and 12R will be the first pressure.

If the stall state determination component 60 determines that one or both of the sprockets 2L and 2R are in a stall state, the clutch pressure of the steering clutches 12L and 12R corresponding to the sprockets 2L and 2R determined to be in a stall state is raised to a second pressure that is higher than the above-mentioned first pressure.

In this embodiment, if it is determined that the sprockets 2L and 2R are both in a stall state, the steering clutch controller 70 raises the clutch pressure of the steering clutches 12L and 12R to the second pressure. The steering clutch controller 70 controls the steering clutch control valves 27L and 27R so that the clutch pressure of the steering clutches 12L and 12R will be the second pressure.

The clutch capacity of the steering clutches 12L and 12R when the second pressure is applied to the steering clutches 12L and 12R is preferably equal to or greater than the maximum drive torque outputted from the power transmission device 11. This will effectively prevent slippage from occurring in the steering clutches 12L and 12R even if one or both of the crawler belts are subjected to a high load.

Figure 28:
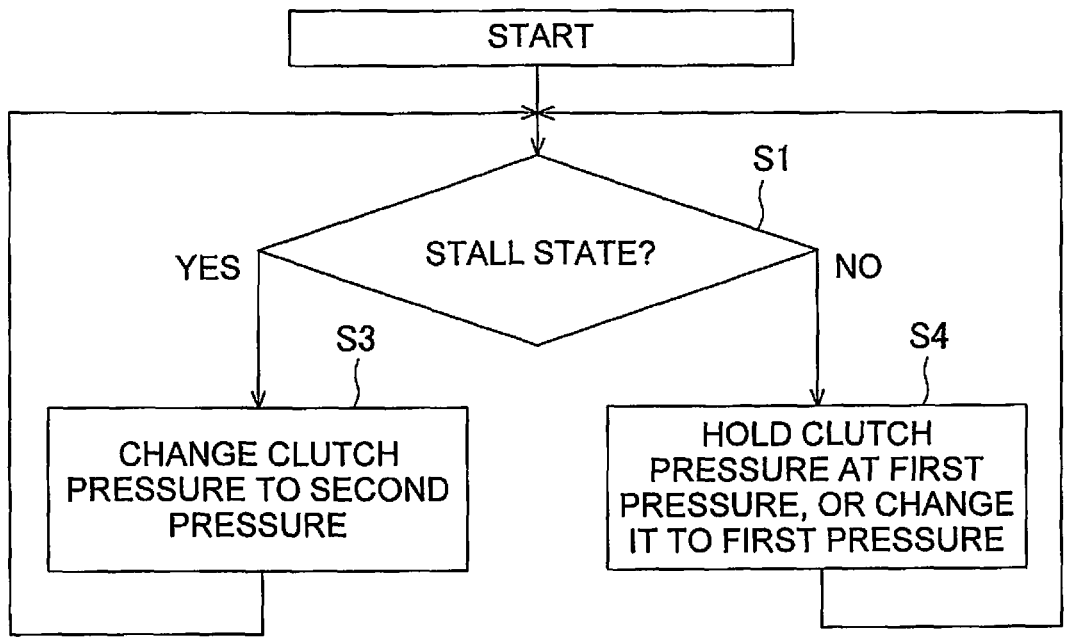
FIG. 28 is a flowchart of a method for controlling a steering clutch.
Figure 29:
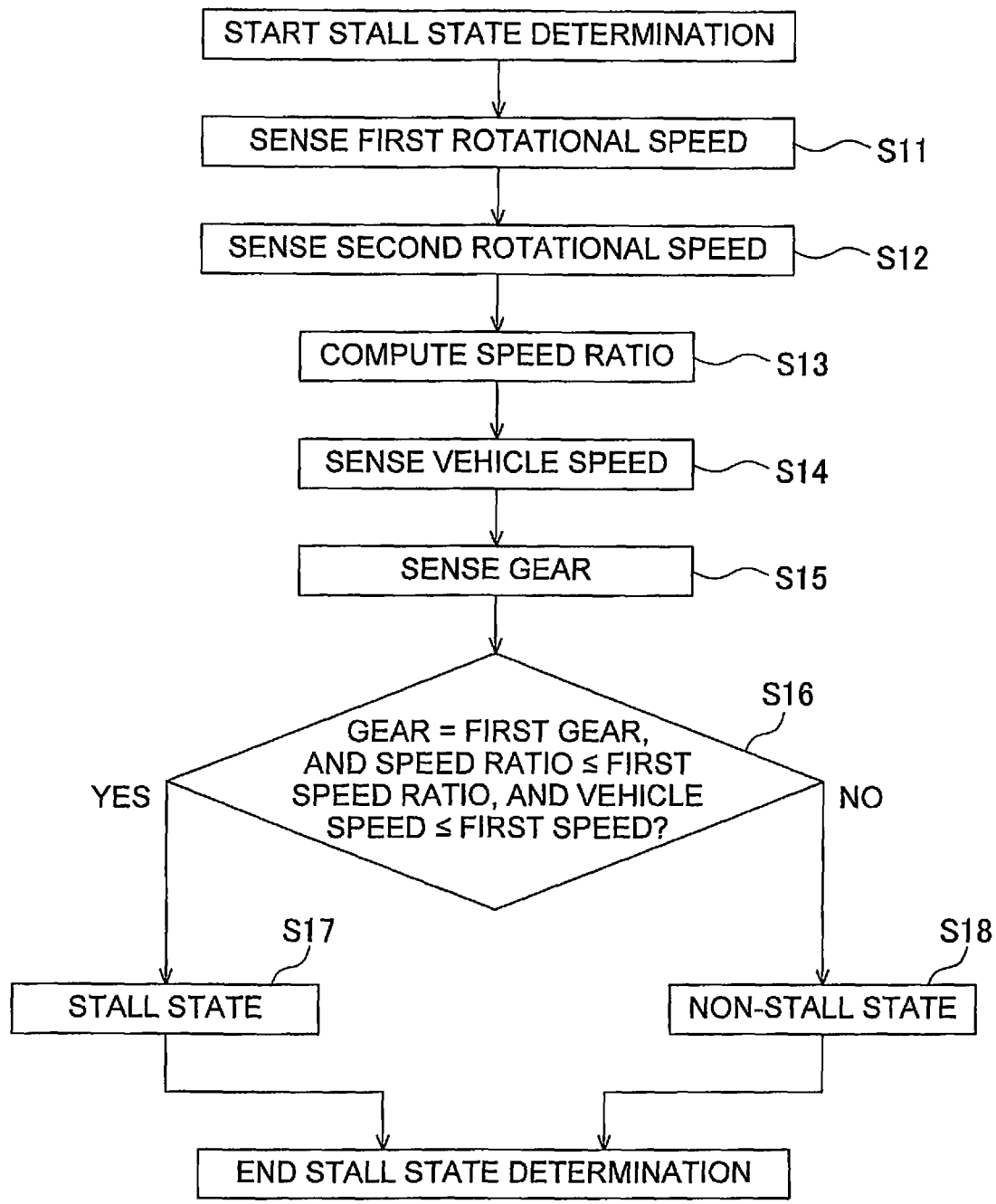
FIG. 29 is a flowchart of a method for determining a stall state according to the first embodiment.

A method for controlling the steering clutches 12L and 12R will now be described through reference to a flowchart. FIG. 28 is a flowchart of this method for controlling the steering clutches. FIG. 29 is a flowchart of a method for determining a stall state in the first embodiment.

First, in step 1, the stall state determination component 60 determines whether or not one or both of the left and right sprockets 2L and 2R are in a stall state. In this step, in step 11 in FIG. 29, the first rotational speed sensor 52 senses the first rotational speed, which is the rotational speed of the input shaft of the power transmission device 11. In step 12 the second rotational speed sensor 53 senses the second rotational speed, which is the rotational speed of the output shaft of the power transmission device 11. In step 13 the speed ratio computer 61 computes the speed ratio, which is the ratio of the second rotational speed to the first rotational speed. In step 14 the vehicle speed sensor 62 senses the vehicle speed of the bulldozer 1. In step 15 the gear sensor 51 senses the gear.

In step 16 the stall state determination component 60 determines whether or not the gear sensed by the gear sensor 51 is first gear, the speed ratio computed by the speed ratio computer 61 is equal to or less than a first speed ratio, and the vehicle speed is equal to or less than a specific first speed. If the gear sensed by the gear sensor 51 is first gear, the speed ratio computed by the speed ratio computer 61 is equal to or less than the first speed ratio, and the vehicle speed is equal to or less than the specific first speed (Yes in step 16), then the stall state determination component 60 determines that the sprockets 2L and 2R are on a stall state (step 17).

If the gear is second gear or higher, or the speed ratio is higher than the first speed ratio, or the vehicle speed is greater than the first speed (No in step 16), then the stall state determination component 60 determines that the sprockets 2L and 2R are in a non-stall state (step 18).

If the stall state determination component 60 determines that there is a stall state (Yes in step 1 in FIG. 28), then the steering clutch controller 70 raises the clutch pressure of the steering clutches 12L and 12R corresponding to the sprockets 2L and 2R determined to be in a stall state to the second pressure (step 3). Upon completion of step 3, the flow returns to step 1. If the stall state determination component 60 determines that there is a non-stall state (No in step 1 in FIG. 28), then the steering clutch controller 70 holds the clutch pressure of the steering clutches 12L and 12R at the first pressure or changes it to the first pressure (step 4). Upon completion of step 4, the flow returns to step 1.

Second Embodiment

The method for determining a stall state is not limited to the method in the above embodiment, and there are other methods. In the second embodiment, a stall state determination component 60a that differs from the stall state determination component 60 in the first embodiment will be described. In the second embodiment, components other than the stall state determination component 60a are all the same as in the first embodiment, and will therefore not be described again.

Figure 30:
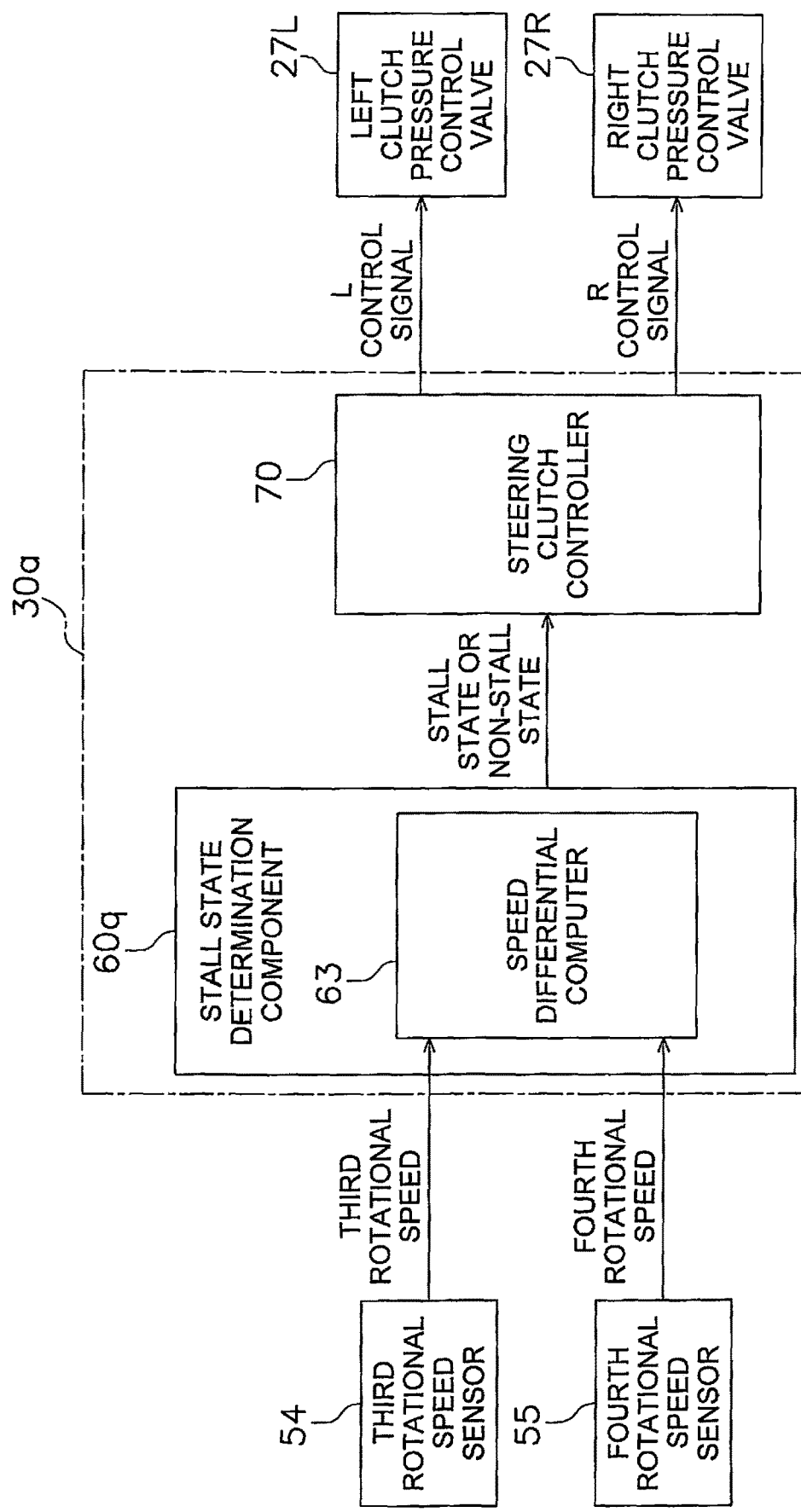
FIG. 30 is a block diagram of the controller according to the second embodiment.

FIG. 30 is a block diagram of the detailed configuration of a controller 30a according to the second embodiment. The controller 30a has the stall state determination component 60a and the steering clutch controller 70. Just as in the first embodiment, typically programs and data for executing the various functions of the stall state determination component 60a and the steering clutch controller 70 are stored in a memory device. When a computation device executes the program, the controller 30a executes the various functions of the stall state determination component 60a and the steering clutch controller 70. The controller 30a may also be realized by an integrated circuit.

The stall state determination component 60a includes a speed differential computer 63. A third rotational speed is inputted from a third rotational speed sensor 54, and a fourth rotational speed is inputted from a fourth rotational speed sensor 55 to the speed differential computer 63.

The third rotational speed sensor 54 senses the third rotational speed, which is the rotational speed of input-side rotary members of the steering clutches 12L and 12R These input-side rotary members are, for example, clutch disks that link to the above-mentioned lateral shaft 20. The third rotational speed sensor 54 is the rotational speed sensor 41 that senses the rotational speed of the lateral shaft 20 (see FIG. 26).

The fourth rotational speed sensor 55 senses the fourth rotational speed, which is the rotational speed of output-side rotary members of the steering clutches 12L and 12R. These output-side rotary members are, for example, clutch disks that link to the above-mentioned final reduction gears 22L and 22R. The fourth rotational speed sensor 55 is, for example, rotational speed sensors 42L and 42R that sense the rotational speed of the output shafts of the steering clutches 12L and 12R (see FIG. 26).

The speed differential computer 63 computes the speed differential between the third rotational speed and the fourth rotational speed at the steering clutches 12L and 12R. When the speed differential is greater than a specific threshold in one or both of the steering clutches 12L and 12R, the stall state determination component 60a determines the sprockets 2L and 2R corresponding to the steering clutches 12L and 12R with a speed differential above the specific threshold to be in a stall state.

In the second embodiment, the stall state determination component 60a determines whether or not the sprockets 2L and 2R are each in a stall state. The term "stall state" means that the steering clutches 12L and 12R are slipping. Therefore, the specific threshold should be one that allows a determination of whether or not the steering clutches 12L and 12R are slipping. Consequently, the specific threshold should be a value that is greater than the range of error of the rotation sensors.

Figure 31:
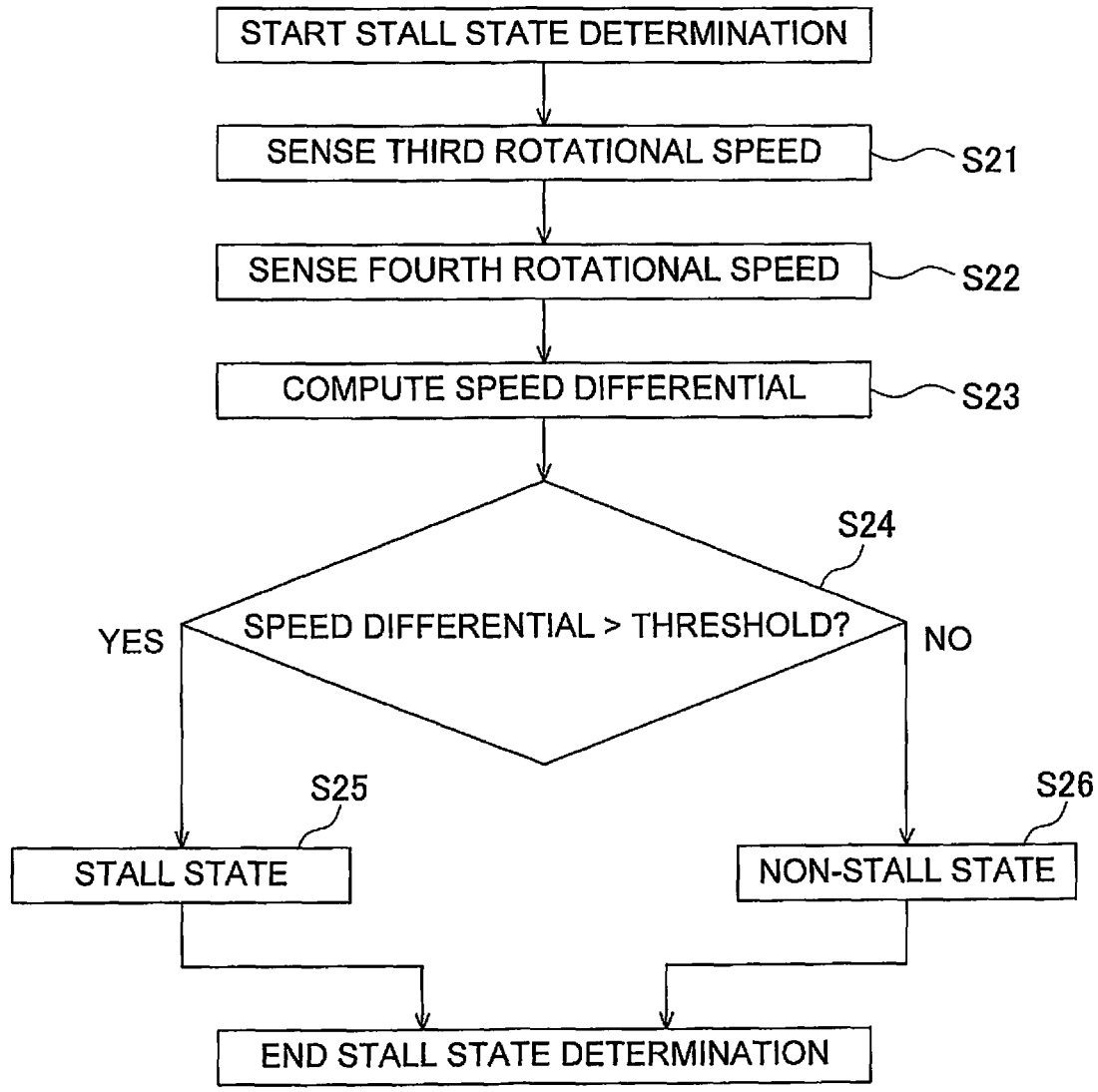
FIG. 31 is a flowchart of a method for determining a stall state according to the second embodiment.

The method for controlling the steering clutches 12L and 12R will now be described through reference to a flowchart. FIG. 31 is a flowchart of the method for determining a stall state in the second embodiment.

First, in step 21 the third rotational speed sensor 54 senses the third rotational speed, which is the rotational speed of the input-side rotary members of the steering clutches 12L and 12R. In step 22 the fourth rotational speed sensor 55 senses the fourth rotational speed, which is the rotational speed of the output-side rotary members of the left and right steering clutches 12L and 12R. In step 23 the speed differential computer 63 computes the speed differential between the third rotational speed and the fourth rotational speed for each of the steering clutches 12L and 12R.

In step 24 the stall state determination component 60a determines whether the speed differential is greater than a specific threshold for one or both of the steering clutches 12L and 12R. If the speed differential is greater than the specific threshold at the left steering clutch 12L (Yes in step 24), the stall state determination component 60a determines the left sprocket 2L to be in a stall state (step 25). Similarly, if the speed differential is greater than the specific threshold at the right steering clutch 12R (Yes in step 24), the stall state determination component 60a determines the right sprocket 2R to be in a stall state.

If the speed differential is equal to or less than the specific threshold at the left steering clutch 12L (No in FIG. 24), the stall state determination component 60a determines the left sprocket 2L to be in a non-stall state (step 26). Similarly, if the speed differential is equal to or less than the specific threshold at the right steering clutch 12R (No in step 24), the stall state determination component 60a determines the right sprocket 2R to be in a non-stall state (step 26).

In the second embodiment, the steering clutch controller 70 may raise the clutch pressure to the second pressure only for the steering clutch corresponding to the sprocket or sprockets determined by the stall state determination component 60a to be in a stall state.

Features (1) With the bulldozer 1 according to the first and second embodiments, if it is determined that one or both of the sprockets (drive wheels) 2L and 2R are in a stall state, the clutch pressure of the steering clutch or clutches corresponding to one or both sprockets 2L and 2R is raised to a second pressure that is higher than the first pressure, which is the normal engagement pressure. Therefore, the clutches are less likely to slip when the crawler belts are subjected to a high load. As a result, even if the crawler belts are subjected to a high load, the work can be carried out the same as usual, which avoids a decrease in work efficiency.

(2) In the first and second embodiments, the clutch capacity of the steering clutches 12L and 12R when the steering clutches 12L and 12R are subjected to the second pressure is equal to or greater than the maximum drive torque outputted from the power transmission device 11. Therefore, this effectively prevents slippage from occurring at the steering clutches 12L and 12R.

(3) In the first and second embodiments, the clutch pressure of the steering clutches 12L and 12R rises in proportion to the pressure of the hydraulic fluid supplied to the steering clutches 12L and 12R (hydraulic clutches). This allows the clutch pressure to be flexibly varied for the steering clutches 12L and 12R with a simple structure.

(4) In the first and second embodiments, the power transmission device 11 includes the torque converter 16 that transmits power through a fluid. Consequently, when the steering clutches 12L and 12R are subjected to a load, part of the output of the engine 10 is absorbed by the torque converter 16, making it less likely that an excessive load will be exerted on the steering clutches 12L and 12R.

(5) The stall state determination component 60 according to the first embodiment determines the sprockets (drive wheels) 2L and 2R both to be in a stall state when the gear sensed by the gear sensor 51 is first gear, the speed ratio is equal to or less than a first speed ratio, and the vehicle speed is equal to or less than a specific first speed. When the gear is first gear, the speed ratio is equal to or less than the first speed ratio, and the vehicle speed is equal to or less than the specific first speed, the tractive power of the bulldozer 1 is high, and a high torque is exerted on the steering clutches 12L and 12R. Therefore, the stall state determination component 60 can sense a state in which the steering clutches 12L and 12R are prone to slipping.

(6) The drive torque exerted on the steering clutches 12L and 12R when the gear is first gear, the speed ratio is the first speed ratio, and the vehicle speed is the first speed is equal to or less than the clutch capacity of the steering clutches 12L and 12R when the first pressure is applied to the steering clutches 12L and 12R. Therefore, when the stall state determination component 60 determines that there is no stall state, the steering clutches 12L and 12R will not slip.

(7) The stall state determination component 60a according to the second embodiment determines one or both of the sprockets (drive wheels) 2L and 2R to be in a stall state when the speed differential computed by the speed differential computer 63 for one or both sprockets 2L and 2R is greater than a specific threshold. Therefore, the stall state determination component 60 can detect a state in which the steering clutches 12L and 12R are slipping.

Modification Examples

The present invention is not limited to or by the above embodiments, and various modifications and variations are possible without departing from the scope of the present invention.

(a) In the above embodiments, the steering clutch controller 70 raises the clutch pressure of the steering clutches 12L and 12R from the first pressure to the second pressure when a stall state is determined. However, the steering clutch controller 70 may instead raise the clutch pressure of the steering clutches 12L and 12R in stages from the first pressure to the second pressure. Also, in the second embodiment, the steering clutch controller 70 may raise the clutch pressure of the steering clutches 12L and 12R according to the speed differential.

(b) The steering clutches 12L and 12R may be something other than hydraulic clutches, such as electromagnetic clutches.

(c) In the above embodiments, a bulldozer was used as an example of a tracked work vehicle, but the present invention can similarly be applied to another tracked work vehicle that is equipped with steering clutches.

INDUSTRIAL APPLICABILITY (A) There are disclosed a work vehicle having steering clutches that can be hydraulically engaged, wherein the PV value of the sealing rings does not reach the maximum permissible value, and a method for controlling the work vehicle.

(B) There are disclosed a monitoring system for a work vehicle, with which a worker can be notified about sealing ring replacement and the like as needed, according to the usage state of the sealing rings of a work vehicle having hydraulic clutches that can be hydraulically engaged, and a work vehicle with which the notification is possible.

(C) There is disclosed a tracked work vehicle with which it is less likely that there will be a drop in work efficiency when one or both crawler belts are subjected to a high load.

What is claimed is:

1. A work vehicle monitoring system comprising:
a work vehicle; and
a monitoring device provided on an exterior of the work vehicle, the monitoring device being configured to input information from the work vehicle,
the work vehicle including
an engine,
a transmission arranged to change a speed of rotary motion of the engine,
a steering clutch that transmits or cuts off power from the transmission, the steering clutch being engaged when supplied with hydraulic fluid,
a rotary member having a first hydraulic fluid supply channel arranged to supply the hydraulic fluid to the steering clutch, the rotary member being rotated by the power from the transmission when the steering clutch is engaged,
a drive unit driven by the rotary member,
a support member having a second hydraulic fluid supply channel arranged to supply the hydraulic fluid to the first hydraulic fluid supply channel, the support member rotatably supporting the rotary member,
a sealing ring disposed between the rotary member and the support member, the sealing ring being mounted adjacent to a connected part between the first hydraulic fluid supply channel and the second hydraulic fluid supply channel,
a rotational speed sensor that senses a rotational speed of the rotary member,
a controller that decides a pressure of the hydraulic fluid inside the first hydraulic fluid supply channel and the second hydraulic fluid supply channel, and performs control so that the pressure of the hydraulic fluid becomes the decided pressure, and
an external output component that outputs determination basis data related to the decided pressure, the rotational speed, and a time when the pressure is controlled by the decided pressure while the rotary member is rotating, in a format that can be inputted by the monitoring device, and
the monitoring device including an output component that outputs maintenance information about the sealing ring when a predicted wear amount of the sealing ring obtained from the determination basis data exceeds a specific threshold.

2. The work vehicle monitoring system according to claim 1, wherein
the monitoring device is a computer.

3. The work vehicle monitoring system according to claim 2, wherein
the monitoring device includes a monitor for displaying information and a keyboard for entering the determination basis data outputted by the external output component.

4. The work vehicle monitoring system according to claim 1, wherein
the determination basis data is a value obtained by integration of a product of the decided pressure and the rotational speed at a same time as the decided pressure.

5. The work vehicle monitoring system according to claim 1, wherein
the external output component outputs the determination basis data to a communication line or to a removable storage medium that can be written to by the work vehicle and that can be read by the monitoring device.

6. The work vehicle monitoring system according to claim 1, wherein
the controller
performs control to set the pressure to a specific first pressure when the rotational speed measured by the rotational speed sensor is no more than a specific rotational speed threshold, and
performs control to reduce the pressure from the first pressure so that a product of the rotational speed and the pressure of the hydraulic fluid will not exceed a specific upper limit when the rotational speed measured by the rotational speed sensor is greater than a specific rotational speed threshold.

7. The work vehicle monitoring system according to claim 6, wherein
the controller performs control to set the pressure of the hydraulic fluid to be a quotient of dividing a first product, which is a product of the first pressure and the rotational speed threshold, by the rotational speed when the rotational speed is greater than the rotational speed threshold.

8. The work vehicle monitoring system according to claim 6, wherein
the sealing ring seals a gap between the rotary member and the support member, and
the connected part is formed by the gap sealed by the sealing ring.

9. The work vehicle monitoring system according to claim 1, wherein
the sealing ring seals a gap between the rotary member and the support member, and
the connected part is formed by the gap sealed by the sealing ring.

10. A work vehicle configured to output information to an external monitoring device, the work vehicle comprising:
an engine;
a transmission arranged to change a speed of rotary motion of the engine;
a steering clutch that transmits or cuts off power from the transmission, the steering clutch being engaged when supplied with hydraulic fluid;
a rotary member having a first hydraulic fluid supply channel arranged to supply the hydraulic fluid to the steering clutch, the rotary member being rotated by the power from the transmission when the steering clutch is engaged;
a drive unit driven by the rotary member;
a support member having a second hydraulic fluid supply channel arranged to supply the hydraulic fluid to the first hydraulic fluid supply channel, the support member rotatably supporting the rotary member;
a sealing ring disposed between the rotary member and the support member, the sealing ring being mounted adjacent to a connected part between the first hydraulic fluid supply channel and the second hydraulic fluid supply channel;
a rotational speed sensor that senses a rotational speed of the rotary member;
a controller that decides a pressure of the hydraulic fluid inside the first hydraulic fluid supply channel and the second hydraulic fluid supply channel, and performs control so that the pressure of the hydraulic fluid becomes the decided pressure; and
an external output component that outputs determination basis data related to the decided pressure, the rotational speed, and a time when the pressure is controlled by the decided pressure while the rotary member is rotating, in a format that can be inputted by the monitoring device.

11. The work vehicle according to claim 10, wherein the determination basis data is a value obtained by integration of a product of the decided pressure and the rotational speed at a same time as the decided pressure.

12. The work vehicle according to claim 10, wherein the external output component outputs the determination basis data to a communication line or to a removable storage medium that can be written to by the work vehicle and that can be read by the monitoring device.

13. The work vehicle according to claim 10, wherein the controller
performs control to set the pressure to a specific first pressure when the rotational speed measured by the rotational speed sensor is no more than a specific rotational speed threshold, and
performs control to reduce the pressure from the first pressure so that a product of the rotational speed and the pressure of the hydraulic fluid will not exceed a specific upper limit when the rotational speed measured by the rotational speed sensor is greater than a specific rotational speed threshold.

14. The work vehicle according to claim 13, wherein
the controller performs control to set the pressure of the hydraulic fluid to be a quotient of dividing a first product, which is a product of the first pressure and the rotational speed threshold, by the rotational speed when the rotational speed is greater than the rotational speed threshold.

15. The work vehicle according to claim 10, wherein
the sealing ring seals a gap between the rotary member and the support member, and
the connected part is formed by the gap sealed by the sealing ring.

* * * * *